United States Patent
Sentelle et al.

(10) Patent No.: US 9,316,727 B2
(45) Date of Patent: Apr. 19, 2016

(54) MOVING-ENTITY DETECTION

(71) Applicant: L-3 Communications CyTerra Corporation, Orlando, FL (US)

(72) Inventors: Christopher Gary Sentelle, Orlando, FL (US); Donald Charles Wright, Orlando, FL (US); Felix M. Fontan, Ocoee, FL (US); Juan Antonio Torres-Rosario, Waltham, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 0 days.

(21) Appl. No.: 14/330,771

(22) Filed: Jul. 14, 2014

(65) Prior Publication Data

US 2015/0309166 A1   Oct. 29, 2015

Related U.S. Application Data

(62) Division of application No. 12/971,387, filed on Dec. 17, 2010, now Pat. No. 8,779,965.

(60) Provisional application No. 61/287,981, filed on Dec. 18, 2009.

(51) Int. Cl.
*G01S 13/88* (2006.01)
*G01V 3/12* (2006.01)
(Continued)

(52) U.S. Cl.
CPC ............. *G01S 13/04* (2013.01); *G01S 7/414* (2013.01); *G01S 13/32* (2013.01); *G01S 13/42* (2013.01); *G01S 13/56* (2013.01); *G01S 13/887* (2013.01);
(Continued)

(58) Field of Classification Search
CPC ............... G01S 13/885–13/888; G01V 3/12; G01V 8/005
USPC ........................................................... 342/22
See application file for complete search history.

(56) References Cited

U.S. PATENT DOCUMENTS

| 5,345,240 A | 9/1994 | Frazier |
| 5,357,253 A | 10/1994 | Van Etten et al. |

(Continued)

FOREIGN PATENT DOCUMENTS

| GB | 2249448 | 5/1992 |
| WO | 2008/001092 | 1/2008 |

(Continued)

OTHER PUBLICATIONS

International Search Report and Written Opinion for International Application No. PCT/US2010/061005, mailed Feb. 17, 2011, 16 pages.

(Continued)

*Primary Examiner* — Peter Bythrow
(74) *Attorney, Agent, or Firm* — Fish & Richardson P.C.

(57) ABSTRACT

A stepped-frequency radar signal is transmitted through a barrier. A transmitter of the stepped-frequency radar is on a first side of the barrier, a first object is on a second side of the barrier, and a second object that is distinct from the first object is on the second side of the barrier. A signal including a reflection of the transmitted signal from the first object and a reflection of the transmitted signal from the second object is sensed. The sensed signal is analyzed to determine that a first detection is associated with the first object and a second detection is associated with a second object.

16 Claims, 47 Drawing Sheets

(51) Int. Cl.
*G01V 8/00* (2006.01)
*G01S 13/04* (2006.01)
*G01S 13/32* (2006.01)
*G01S 13/56* (2006.01)
*G01S 7/41* (2006.01)
*G01S 13/42* (2006.01)
*G01S 7/40* (2006.01)

(52) U.S. Cl.
CPC ............... *G01S 13/888* (2013.01); *G01V 3/12* (2013.01); *G01V 8/005* (2013.01); *G01S 7/4021* (2013.01)

(56) References Cited

U.S. PATENT DOCUMENTS

| | | | |
|---|---|---|---|
| 5,446,461 A | 8/1995 | Frazier | |
| 5,457,394 A | 10/1995 | McEwan | |
| 5,512,834 A | 4/1996 | McEwan | |
| 5,570,099 A | 10/1996 | DesJardins et al. | |
| 5,592,170 A | 1/1997 | Price et al. | |
| 5,861,837 A | 1/1999 | Richardson et al. | |
| 5,905,455 A | 5/1999 | Heger | |
| 6,215,888 B1* | 4/2001 | Eslambolchi | G01V 3/02 324/326 |
| 6,278,401 B1 | 8/2001 | Wigren | |
| 6,359,582 B1 | 3/2002 | MacAleese et al. | |
| 6,417,797 B1 | 7/2002 | Cousins et al. | |
| 6,466,155 B2 | 10/2002 | Taylor et al. | |
| 6,512,976 B1 | 1/2003 | Sabatino et al. | |
| 6,657,582 B2 | 12/2003 | Seki et al. | |
| 6,690,319 B2 | 2/2004 | Matsui et al. | |
| 6,970,128 B1 | 11/2005 | Dwelly et al. | |
| 7,057,383 B2* | 6/2006 | Schlapp | G01V 3/088 324/326 |
| 7,120,564 B2* | 10/2006 | Pacey | G01V 3/08 340/854.8 |
| 7,180,441 B2 | 2/2007 | Rowe et al. | |
| 7,212,149 B2 | 5/2007 | Abatzoglou et al. | |
| 7,307,575 B2 | 12/2007 | Zemany | |
| 7,345,618 B1 | 3/2008 | Cole et al. | |
| 7,356,421 B2* | 4/2008 | Gudmundsson | G01V 3/081 324/207.11 |
| 7,443,154 B1* | 10/2008 | Merewether | G01V 3/104 324/326 |
| 7,920,088 B2 | 4/2011 | Thompson et al. | |
| 8,188,745 B2* | 5/2012 | Overby | G01V 3/12 324/326 |
| 8,515,689 B2* | 8/2013 | Li | G01R 29/085 324/67 |
| 2003/0085835 A1 | 5/2003 | Matsui et al. | |
| 2004/0232329 A1 | 11/2004 | Biggs | |
| 2005/0128123 A1 | 6/2005 | Greneker et al. | |
| 2005/0128124 A1 | 6/2005 | Greneker et al. | |
| 2005/0248482 A1 | 11/2005 | Goodman et al. | |
| 2005/0270219 A1 | 12/2005 | Dwelly et al. | |
| 2005/0285774 A1 | 12/2005 | Mosher et al. | |
| 2006/0025897 A1 | 2/2006 | Shostak et al. | |
| 2006/0028369 A1 | 2/2006 | Rausch et al. | |
| 2006/0036376 A1* | 2/2006 | Gudmundsson | G01V 3/081 702/38 |
| 2006/0055584 A1* | 3/2006 | Waite | G01S 13/86 342/22 |
| 2006/0061504 A1 | 3/2006 | Leach et al. | |
| 2006/0170584 A1 | 8/2006 | Romero et al. | |
| 2006/0250294 A1 | 11/2006 | Zemany et al. | |
| 2006/0284757 A1 | 12/2006 | Zemany | |
| 2007/0024487 A1 | 2/2007 | Zemany et al. | |
| 2007/0024488 A1 | 2/2007 | Zemany et al. | |
| 2007/0171119 A1 | 7/2007 | Dwelly et al. | |
| 2007/0205937 A1 | 9/2007 | Thompson et al. | |
| 2008/0077015 A1 | 3/2008 | Boric-Lubecke et al. | |
| 2008/0191925 A1 | 8/2008 | Martin et al. | |
| 2009/0087029 A1 | 4/2009 | Coleman et al. | |
| 2009/0128156 A1* | 5/2009 | Li | G01R 29/085 324/326 |
| 2009/0195435 A1 | 8/2009 | Kapilevich et al. | |
| 2009/0262005 A1 | 10/2009 | McNeill et al. | |
| 2009/0262006 A1 | 10/2009 | McNeill et al. | |
| 2009/0295618 A1 | 12/2009 | Beeri et al. | |
| 2010/0141261 A1* | 6/2010 | Overby | G01V 3/12 324/329 |

FOREIGN PATENT DOCUMENTS

| | | |
|---|---|---|
| WO | 2009/115818 | 9/2009 |
| WO | 2009/139940 | 11/2009 |
| WO | 2009/139941 | 11/2009 |

OTHER PUBLICATIONS

Tavakolian, K., et al., "Development of a Novel Contactless Mechanocardiograph Device," International Journal of Telemedicine and Applications, vol. 2008, Aritcle ID 436870, 5 pages, Hindawi Pulblishing Corporation, Mar. 3, 2008.

Supplementary European Search Report for European Application No. 09747027, mailed Feb. 5, 2012, 3 pages.

Supplementary European Search Report for European Aplication No. 10838288.8 mailed Mar. 11, 2013.

Communication Pursuant to Article 94(3) EPC mailed Mar. 26, 2013.

Zhang, Y., et al., "A Novel Approach for Multiple Moving Target Localization Using Dual-Frquency Radars and Time-Frequency Distributions," Conference Record of the Forty-First Asilomar Conference on Signals, Systems & Computers, Nov. 4-7, 2007 pp. 1817-1821.

Chang, SH, et al., "An MHT Algorithm for UWB Radar-Based Multiple Human Target Tracking," IEEE International Conference on Ultra-Wideband, Sep. 9, 2009, Piscataway, NK, pp. 459-463.

Office Action for U.S. Appl. No. 12/971,387, mailed Sep. 6, 2013.

Office Action for U.S. Appl. No. 12/391,909, mailed Aug. 13, 2013.

Liang et al., "Sense-Through-Wall Channel Modeling Using UWB Noise Radar," GLOBECOM Workshops. 2009 IEEE, IEEE, Nov. 30, 2009, pp. 1-5.

Extended European Search Report issued in European Application No. 15155127.2 on Oct. 23, 2015, 9 pages.

* cited by examiner

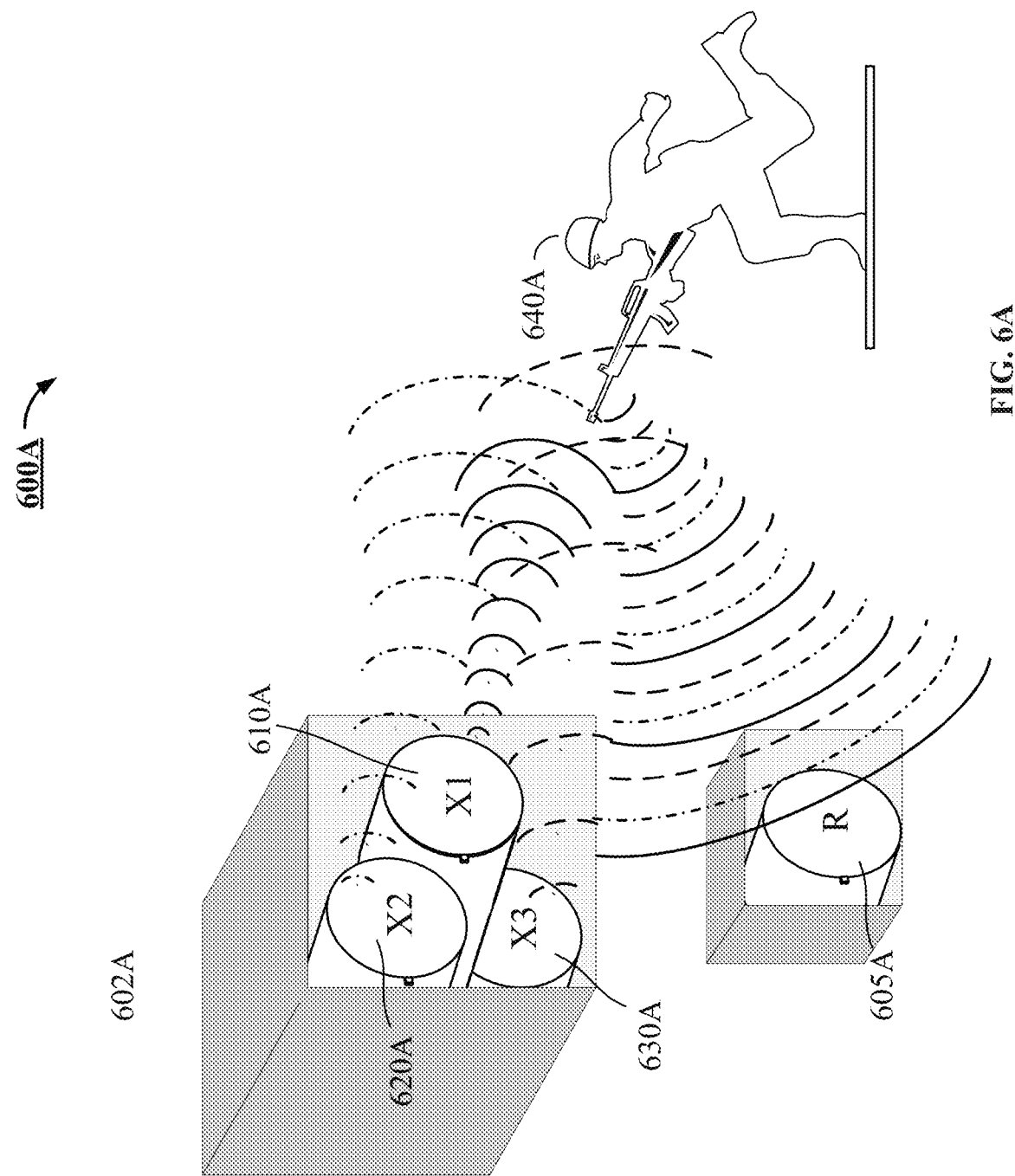

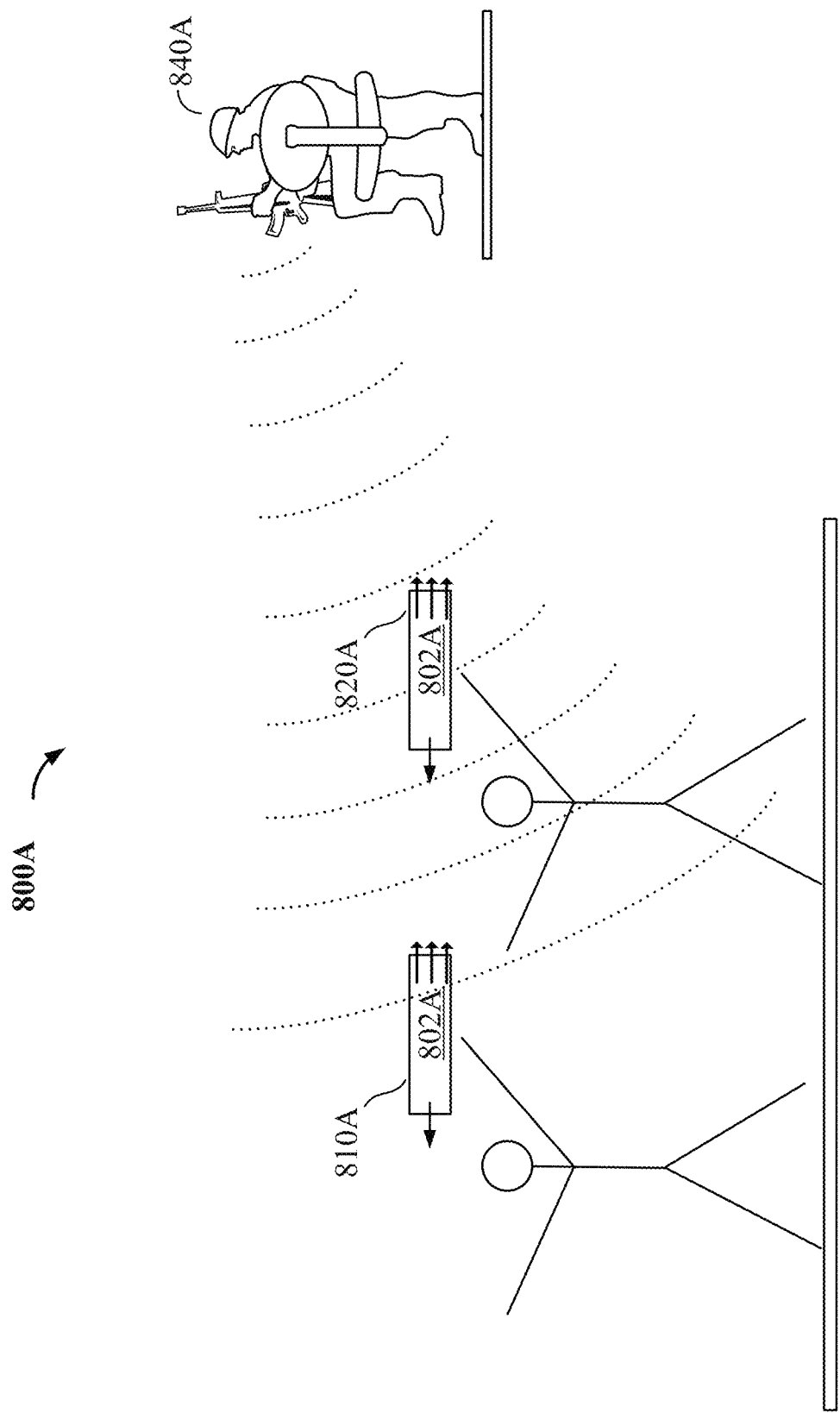

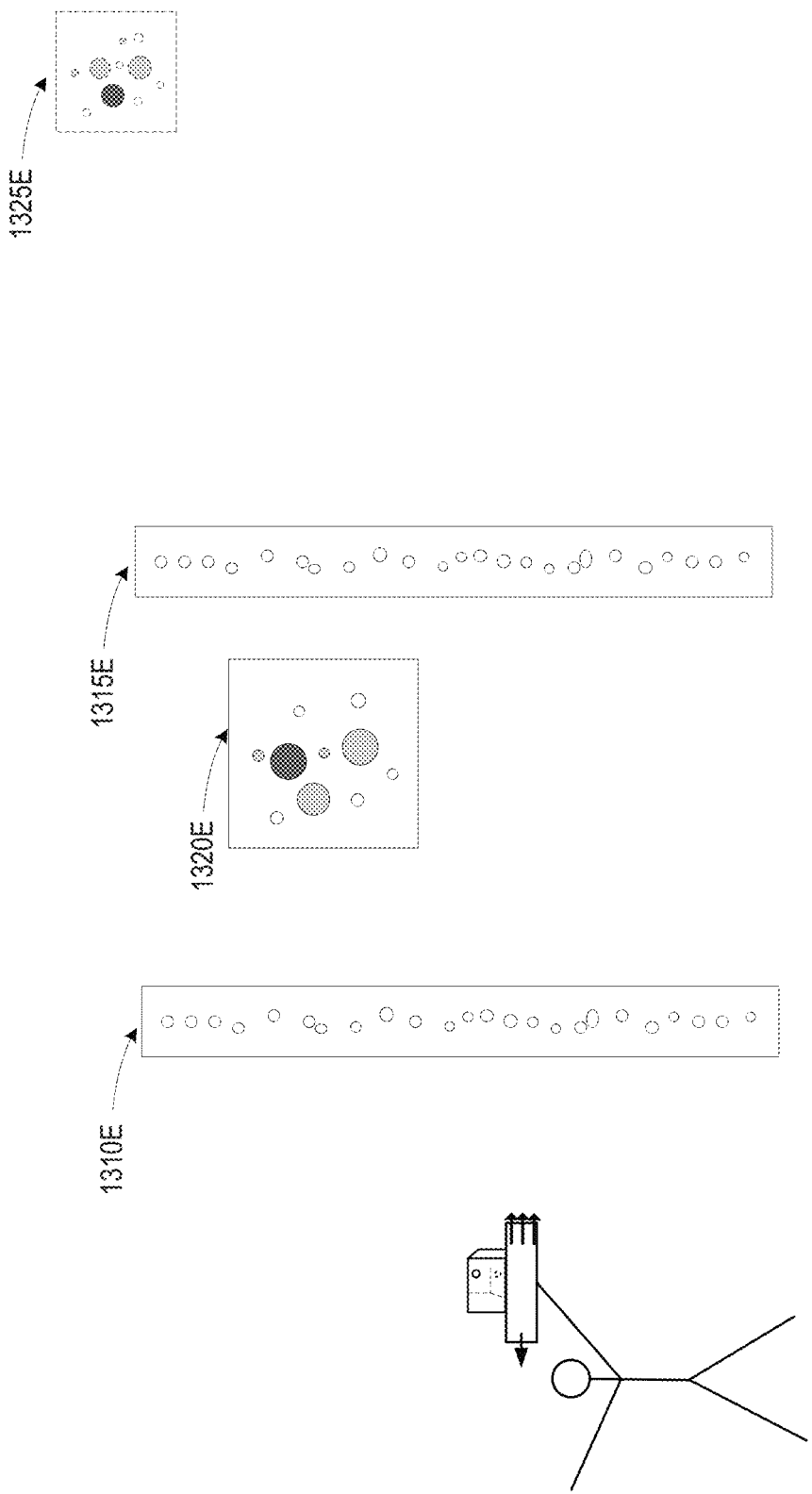

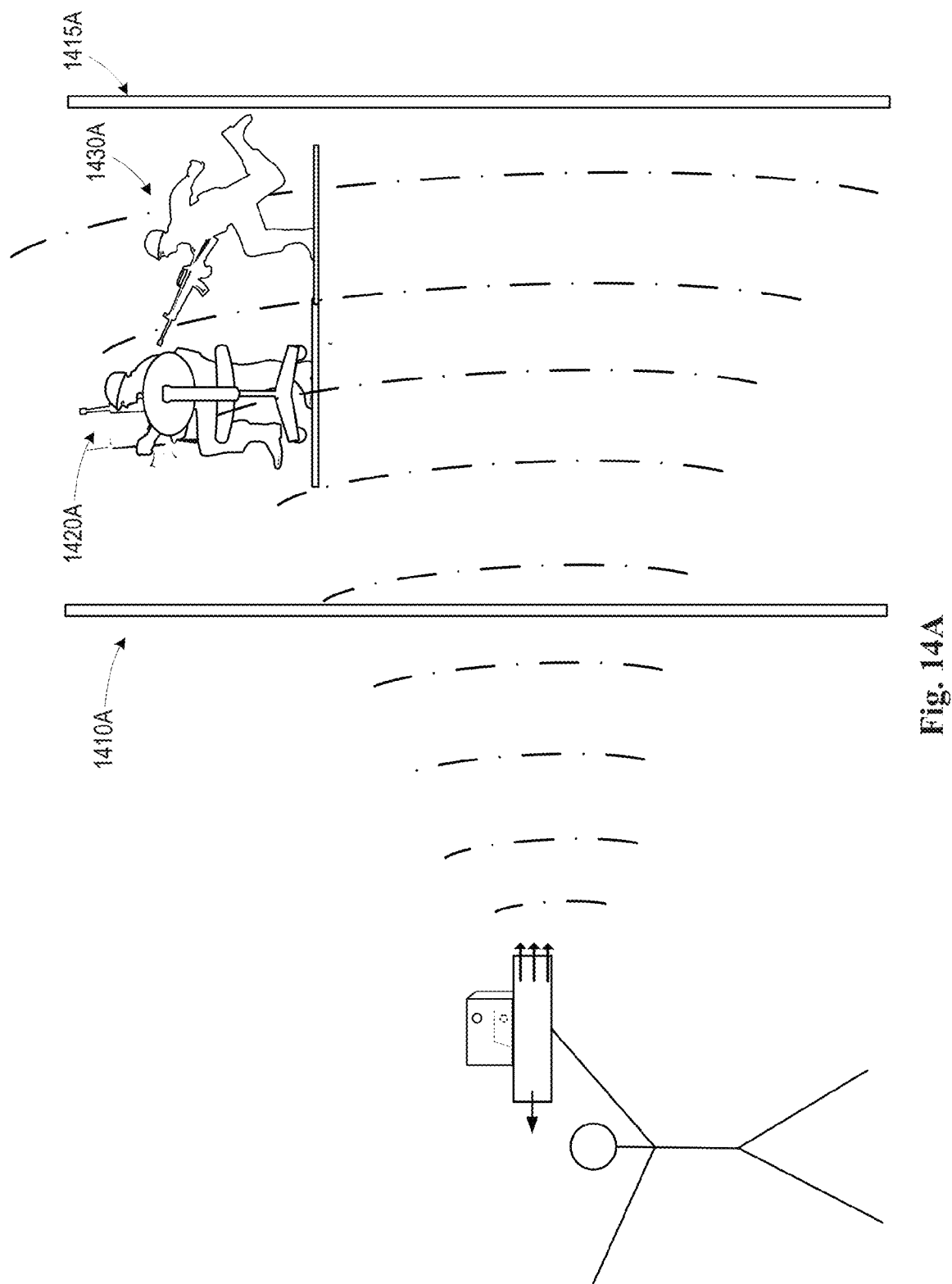

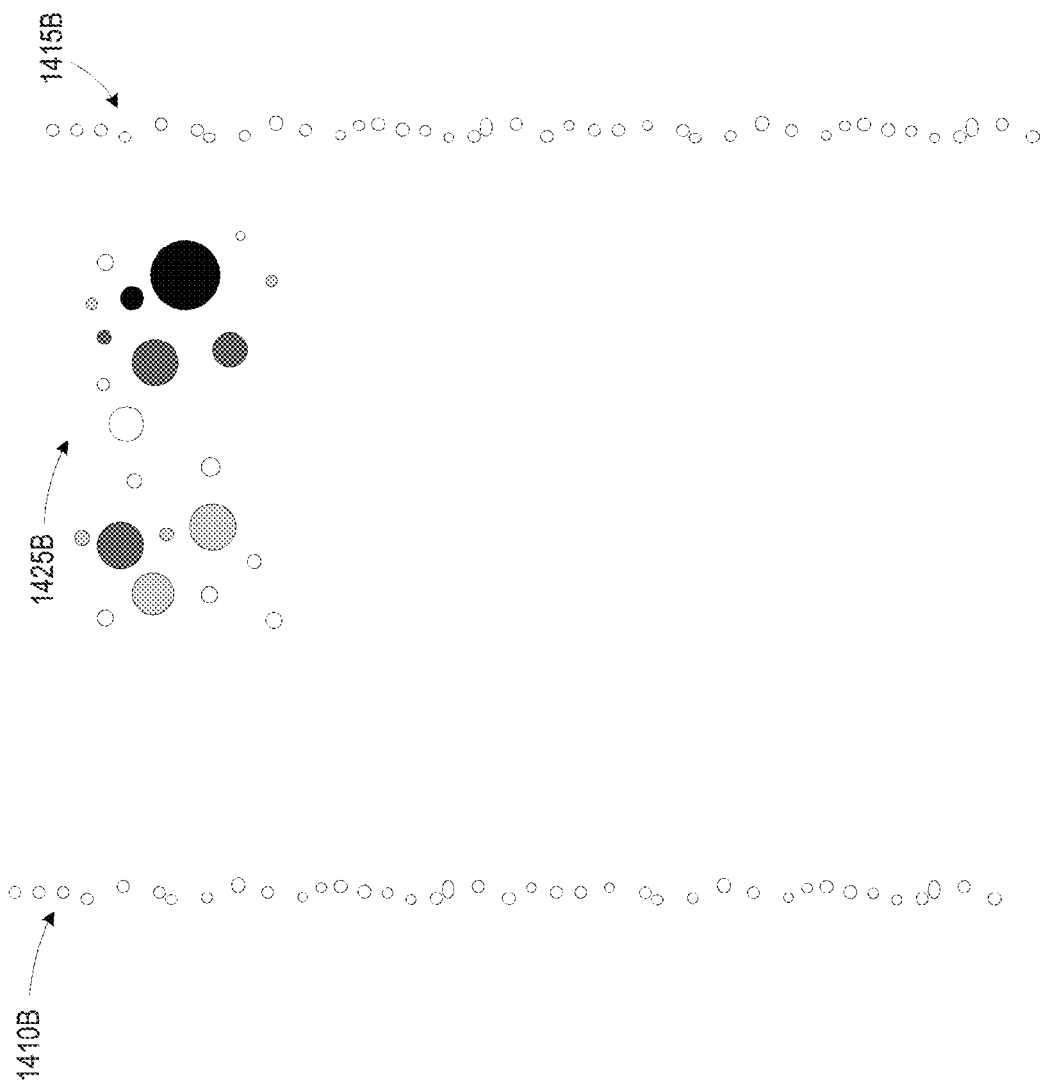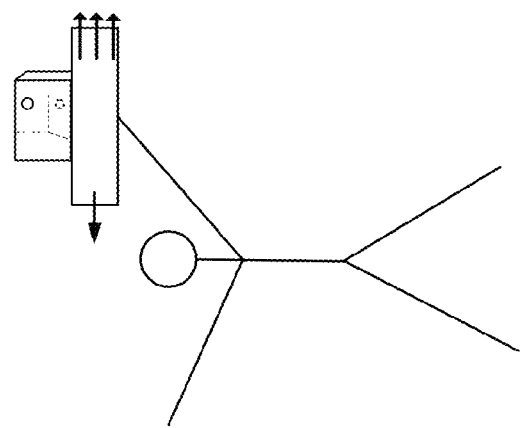
Fig. 14B

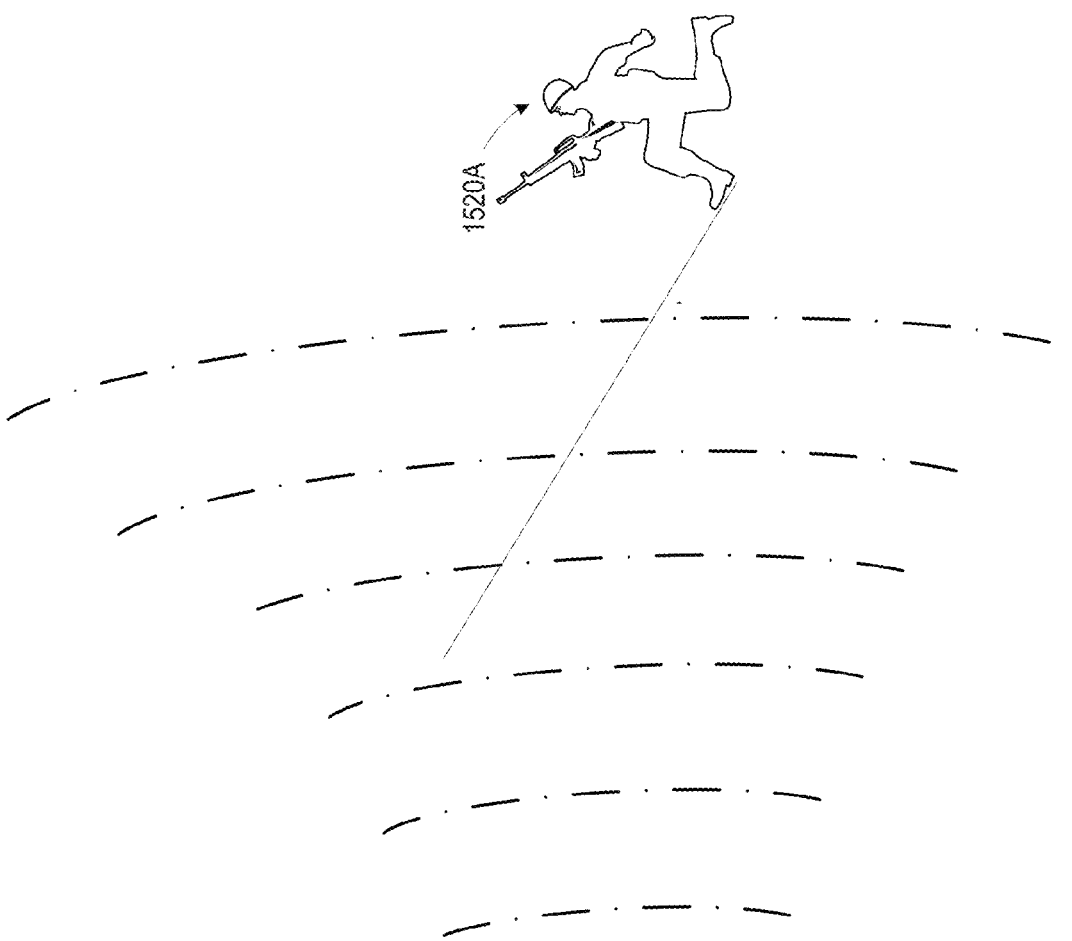
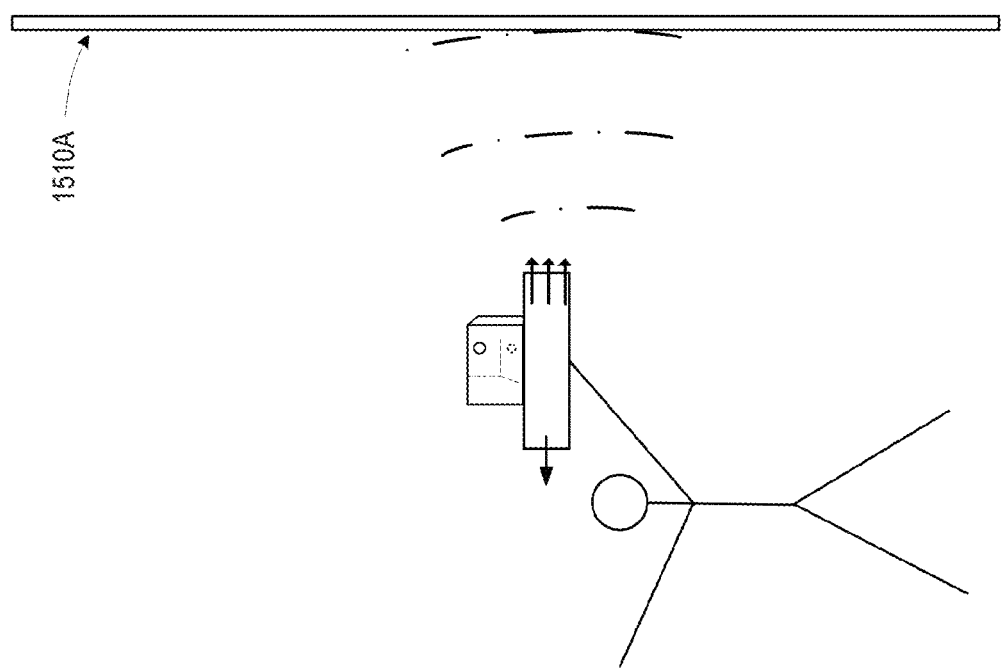
Fig. 15A

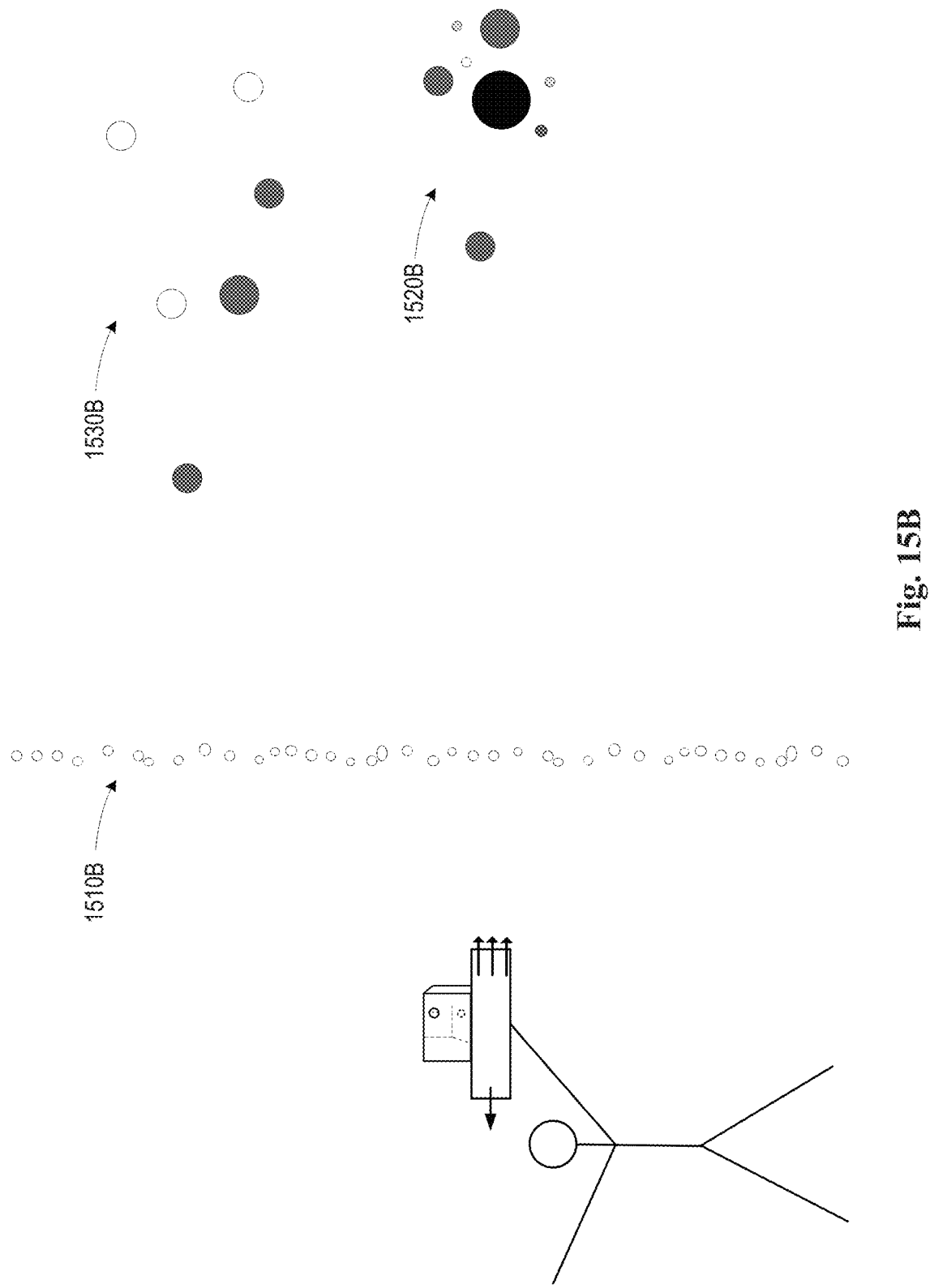

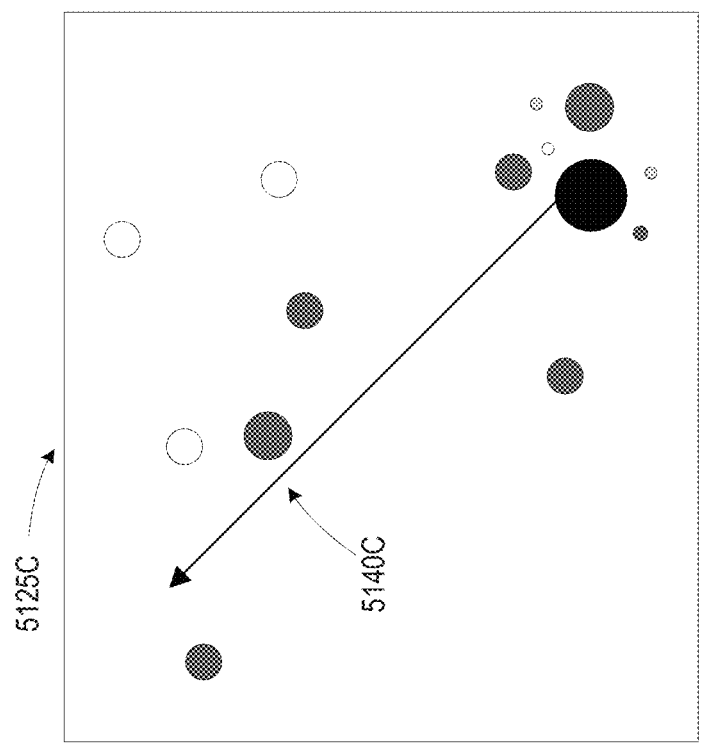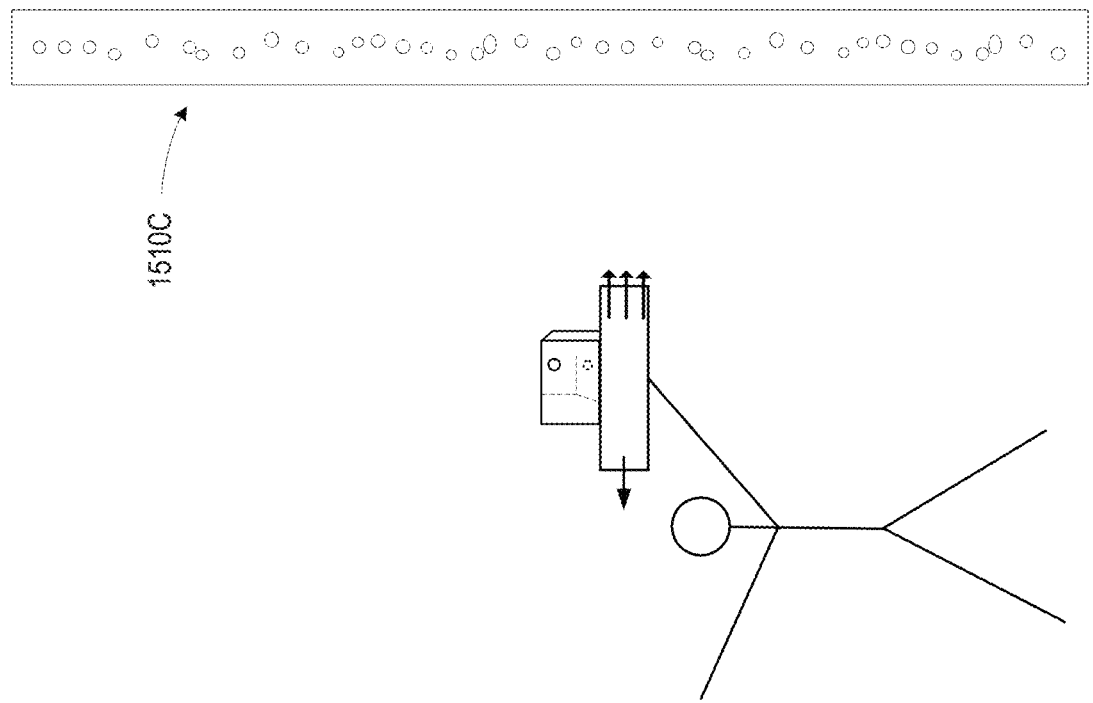
Fig. 15C

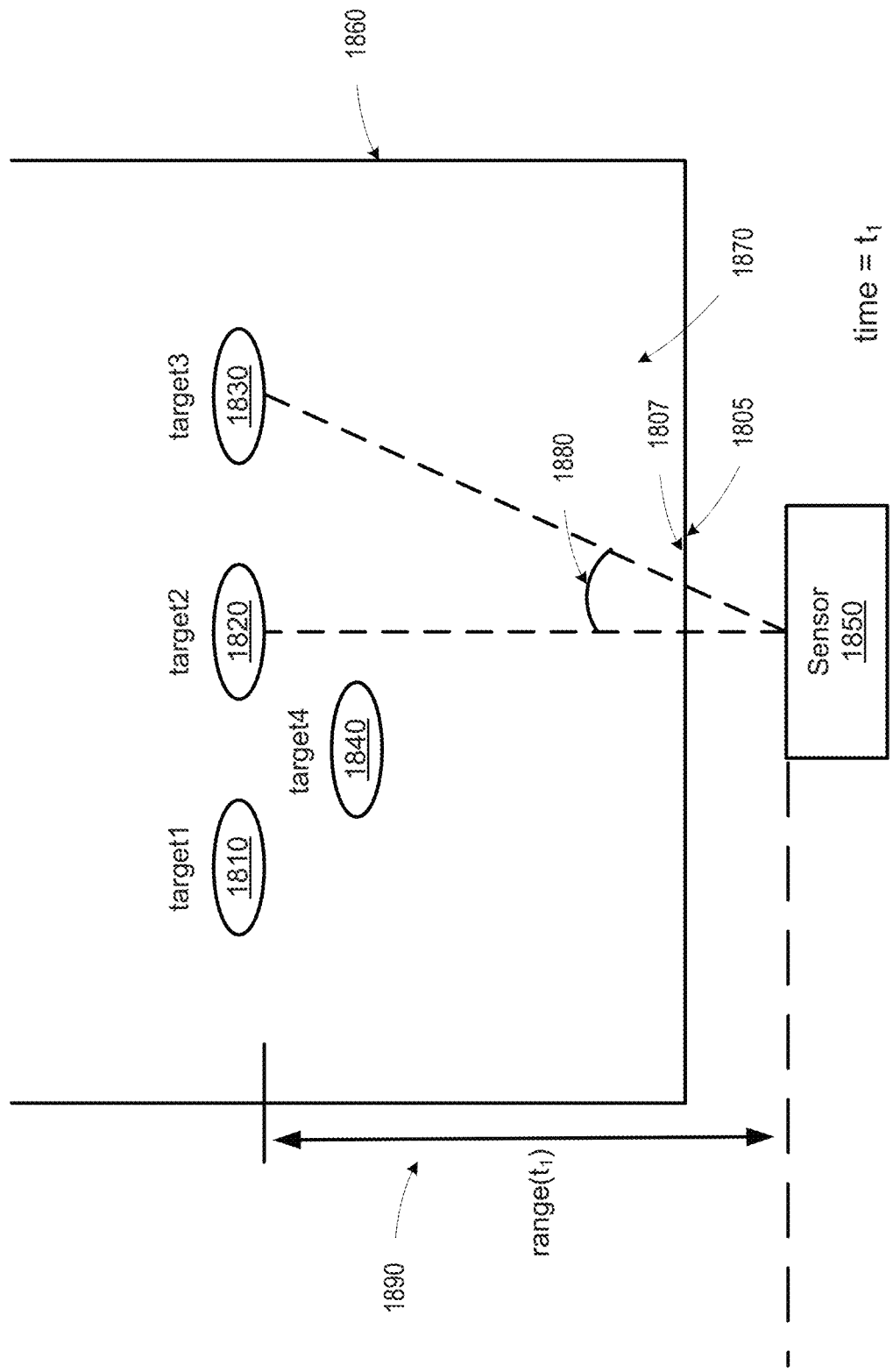

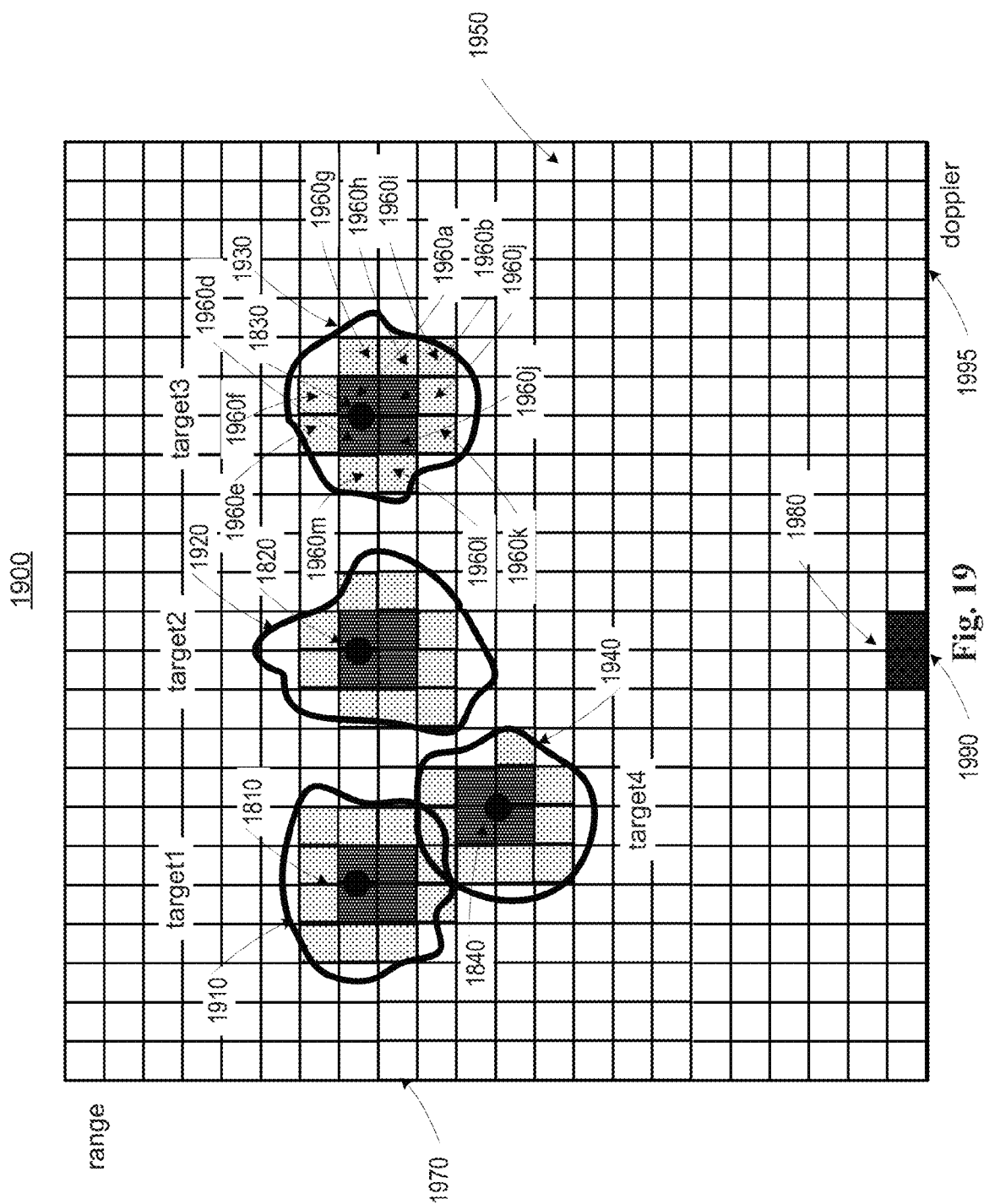

2000

```
Transmit a stepped-frequency radar signal through a
barrier
2010
```

↓

```
Sense a signal that includes a reflection of the
transmitted signal from a first object and a
reflection of the transmitted signal from a second
object
2020
```

↓

```
Analyze the sensed signal to determine that a first
detection is associated with the first object and a
second detection is associated with a second object
2030
```

Fig. 20

MOVING-ENTITY DETECTION

CROSS-REFERENCE TO RELATED APPLICATIONS

This application is a divisional application of and claims priority to U.S. application Ser. No. 12/971,387, titled MOVING-ENTITY DETECTION, and filed on Dec. 17, 2010, which claims priority to U.S. Provisional Application Ser. No. 61/287,981, titled MOVING-ENTITY DETECTION, and filed on Dec. 18, 2009, which is incorporated by reference in its entirety.

TECHNICAL FIELD

This description relates to detecting moving entities, such as detecting the presence of a moving person concealed behind a wall in a building.

BACKGROUND

Detection sensors may be used to determine the presence of objects when visual recognition is difficult.

SUMMARY

In one general aspect, a method includes transmitting a stepped-frequency radar signal through a barrier, where a transmitter of the stepped-frequency radar is on a first side of the barrier, a first object is on a second side of the barrier, and a second object that is distinct from the first object is on the second side of the barrier; sensing a signal including a reflection of the transmitted signal from the first object and a reflection of the transmitted signal from the second object; and analyzing the sensed signal to determine that a first detection is associated with the first object and a second detection is associated with a second object.

Implementations may include one or more of the following features. The barrier may be a wall of a building, and the first object and the second object are in an interior of the building. The first detection and the second detection may be identified in the sensed signal. The first detection associated with the first object may include multiple detections, and the second detection associated with the second object may include multiple detections. The first detection and the second detection may be displayed. A visual representation of the first detection and the second detection may be produced. It may be determined that the first detection is associated with the first object and the second detection is associated with the second object by applying fuzzy c-means clustering to the multiple detections of the first detection and the multiple detections of the second detection. The first detection may include multiple detections and the second detection may include multiple detections, and determining that the first detection is associated with the first object and the second detection is associated with the second object may include determining, from the sensed signal, at least one parameter for each of the multiple detections of the first detection and the second detection, the parameter being one or more of a range value, a Doppler value, or an angle of arrival, comparing the determined parameter of one of the multiple detections to the determined parameter of another of the multiple detections, and determining that the one of the multiple detections and the other of the multiple detections are both associated with the first object based on the comparison.

In some implementations, the stepped-frequency radar signal may be transmitted through the barrier at a first time, and a second stepped-frequency radar signal may be transmitted through the barrier at a second time, a second signal including a second reflection of the transmitted signal from the first object and a reflection of the transmitted signal from the second object may be sensed, and the second sensed signal may be analyzed to determine that a third detection is associated with the first object and that a fourth detection is associated with the second object. A first track that approximates the motion of the first object relative to the transmitter may be determined based on the first detection and the third detection, and a second track that approximates the motion of the second object relative to the transmitter may be determined based on the second detection and the fourth detection. A fifth detection may be received, and at least one parameter of the fifth detection may be compared to at least one detection associated with the first track, and whether the fifth detection is associated with the first track may be determined based on the comparison. At least one parameter of the fifth detection may be analyzed, prior to the comparison, to determine whether the fifth detection is a candidate for association with the first track, and it may be determined whether the fifth detection is associated with the first track only when the fifth detection is a candidate for association. It may be determined whether the fifth detection is a candidate for association may include determining whether the parameter of the fifth detection is within a preset range of values. The first object may include a person, and the motion of the person arises from a portion of the person moving relative to the transmitter between the first time and the second time due to breathing of the person. The position of the first object relative to the transmitter may be different at the second time than at the first time due to one or more of the motion of the first object from a first position within an interior region defined by the barrier to a second position within the interior region or motion of the transmitter.

In another general aspect, a method includes generating a representation of a space that includes a barrier that defines an interior region and an object in the interior region; determining a parameter that defines reflections of a radar signal that propagates through the barrier and into the interior region and irradiates portions of the barrier and the object; accessing a parameter of a candidate detection of the object; comparing the parameter that defines the reflections of the radar signal to a parameter of the candidate detection; and classifying the candidate detection as an actual detection or a false alarm based on the comparison.

Implementations may include one or more of the following features. The candidate detection may be presented only when the candidate detection is classified as an actual detection. A track that approximates a motion of an object may be accessed, the candidate detection may be determined to be associated with the track, and it may be determined that the candidate detection is an actual detection based on the association. The potential target may be presented only when the candidate detection is classified as an actual target.

In some implementations, when the parameter that defines the reflections of the radar signal is substantially equal to the parameter of the candidate detection the candidate detection is classified as a false alarm. The parameter that defines the reflections of the radar signal may include one or more of an angle of arrival of the reflection, a range of the reflection, and a Doppler of the reflection, and the parameter of the candidate detection may include one or more of an angle of arrival of the candidate detection, a range of the candidate detection, and a Doppler of the candidate detection.

In another general aspect, a device includes a transceiver configured to receive and transmit multiple radar signals, each radar signal associated with a frequency, through a barrier and into a region defined by the barrier; and a processor coupled to an electronic storage, the electronic storage storing instructions that, when executed, cause the processor to perform operations including sensing a signal including a reflection of the transmitted signals from a first object in the region and a reflection of the transmitted signals from a second object in the region; and analyzing the sensed signal to determine that a first detection is associated with the first object and a second detection is associated with a second object.

Implementations may include one or more of the following features. The device may include an interface configured to provide the first detection and the second detection to a remote system.

In another general aspect, a system includes a sensor system, a processing system, and a display. The sensor system includes a transceiver configured to receive and transmit multiple radar signals, each signal associated with a frequency through a barrier and into a region defined by the barrier. The processing is in communication with the sensor system, and the processing system includes a processor coupled to an electronic storage, the electronic storage storing instructions that, when executed, cause the processor to perform operations including sensing a signal including a reflection of the transmitted signals from a first object in the region and a reflection of the transmitted signals from a second object in the region; and analyzing the sensed signal to determine that a first detection is associated with the first object and a second detection is associated with a second object. The display is configured to visually present the first and second detections.

In another general aspect, a method includes transmitting a first stepped-frequency radar signal through a barrier, where a transmitter of the stepped-frequency radar is on a first side of the barrier; sensing a first signal including a reflection of the first transmitted signal from the object; analyzing the first sensed signal to identify a first detection of the object; transmitting a second stepped-frequency radar signal through the barrier; sensing a second signal including a reflection of the second transmitted signal from an object located on a second side of the barrier; analyzing the second sensed signal to identify a second detection of the object; forming a track representative of a motion of the object through a region defined by the boundary based on the first detection and the second detection; transmitting a third stepped-frequency radar signal through the barrier; sensing a third signal from the region; analyzing the third signal to identify a candidate detection; comparing a parameter of the candidate detection to a parameter of at least one of the first and second detections; determining, based on the comparison, whether the candidate detection is a false alarm or an actual detection; and if the candidate detection is a false alarm, presenting the first and second detections without the candidate detection, and if the candidate detection is an actual detection, presenting the first and second detections with the candidate detection.

Implementations of the techniques discussed above may include a method or process, a system or apparatus, or computer software on a computer-accessible medium.

DESCRIPTION OF DRAWINGS

FIG. 6A is a diagram illustrating use of multi-static motion detection with a scanning device.

FIG. 8A is a diagram illustrating use of synthetic aperture radar imaging with a scanning device.

FIGS. 13D-13E are example diagrams illustrating use of a scanning device in distinguishing between direct and indirect reflections from moving objects.

FIGS. 14A-14C are diagrams illustrating example use of a scanning device to determine the existence of moving objects from a cluster of reflections.

FIGS. 15A-15C are diagrams illustrating example use of a scanning device to predict motion of a moving object.

FIG. 18 is an illustration of a space observed by the WPPDS.

FIG. 19 is a diagram illustrating an example range-Doppler map for the targets in FIG. 18.

FIG. 20 is a flow chart of an example process to detect multiple objects.

Like reference symbols in the various drawings indicate like elements.

DETAILED DESCRIPTION

In order to detect the presence of entities through movement when visual detection is blocked (e.g., by a wall), a device, such as a handheld scanner, includes a stepped-frequency radar transmitter. The transmitter emits a radar based signal that includes different frequencies. The emitted signal strikes objects and is partially reflected. The reflected signal may be affected by environmental characteristics (e.g., movement of an object or entity or distance to the object or entity). For example, if an object is moving closer to the device, signals reflected from the object will exhibit a frequency shift (for example, a Doppler shift) that may be observed and processed by the device. Also, the distance a signal travels before or after being partially reflected affects the phase of the reflected signal at the receiver.

Various processing methodologies and hardware configurations can be used by the device to analyze characteristics of reflected signal for useful information. For example, processing information received from multiple receives can be used to determine a location in two or three spatial dimensions of detected movement. Also, detecting differing rates of movement may require separate processing algorithms and/or separate characteristics of the transmitted signal. For example, in one implementation, a shorter duration (e.g., a few seconds) of signal transmission at a set of frequencies may be transmitted to detect fast moving objects, such as an individual running while a longer duration (e.g., less than 10 seconds) signal transmission may be employed to detect slower moving objects, such as the chest cavity of an individual breathing.

The device may be used to aid in military or search and rescue missions. For example, soldiers may use the device to detect the presence of unknown individuals that may be hiding behind walls. A soldier may activate the device while aiming the transmitter such that the signal is pointed at a closed door. The signal may penetrate walls and doors, and partially reflect when striking an individual (e.g., an enemy soldier). The reflected portion of the signal may exhibit a frequency shift detectable by the device at multiple receivers. The device receives and processes the reflected signal from the receivers, and may determine a presence in three spatial dimensions of one or more entities. Also, the device may be used to detect the presence of individuals buried in piles of rubble based on subtle movement, such as breathing.

Figure 1A:
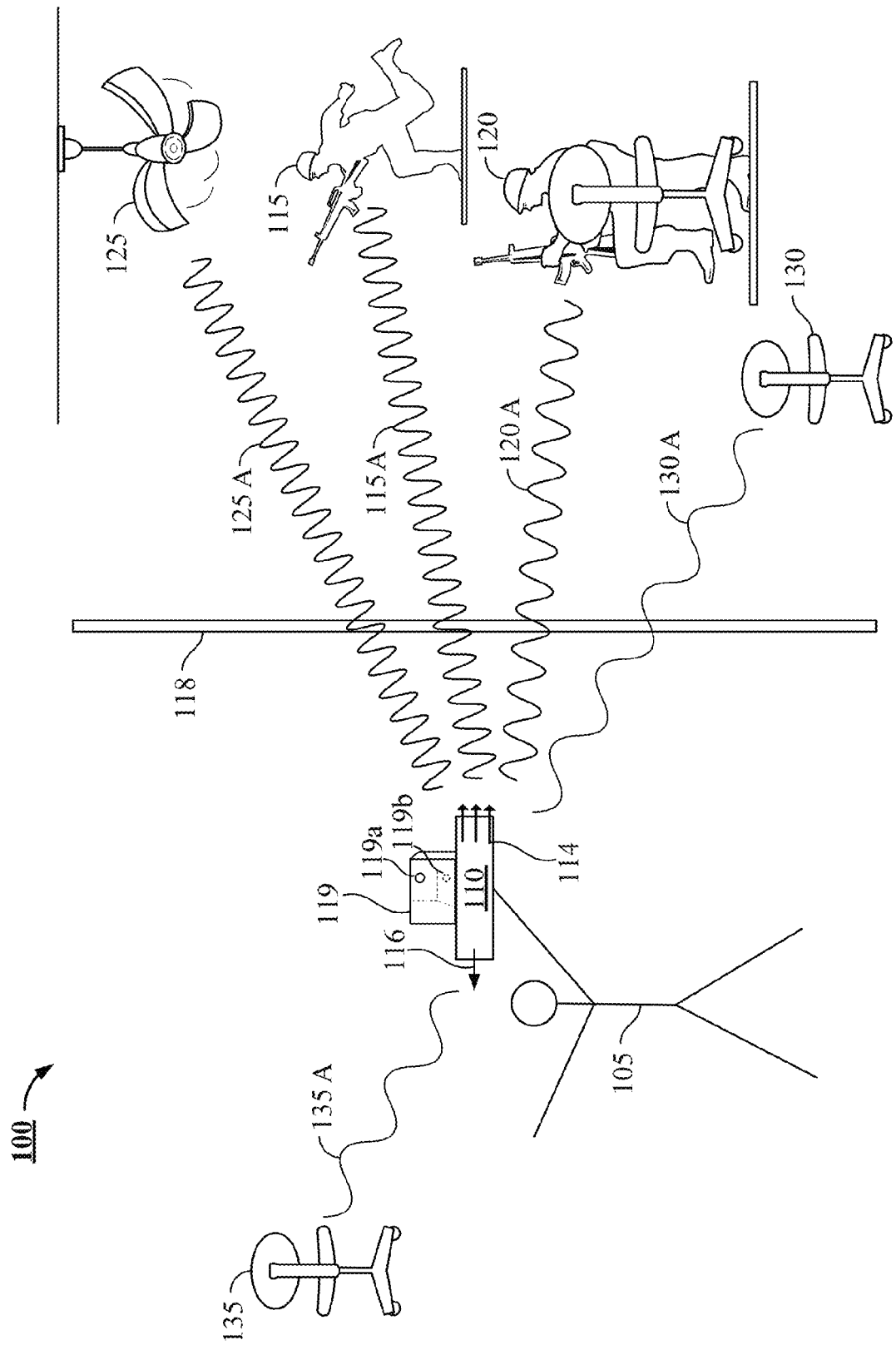
FIG. 1A is a diagram illustrating use of a scanning device for detecting moving entities.

FIG. 1A shows a diagram 100 illustrating use of a scanning device for detecting moving entities. In the diagram 100, a user 105 holds an activated handheld stepped-frequency sensor device 110, which transmits stepped-frequency radar signals.

As shown, the device 110 includes several forward looking antennas 114 and a backward looking antenna 116 (shown as arrows). This configuration is one example, various implementations of the device 110 and its arrangement of antennas are discussed in FIGS. 5A-7. Also, a single transmitted signal from the device 110 is described for simplicity, although multiple signals can be transmitted as discussed in FIGS. 6A-7. The device 110 may differentiate between signals received from the forward looking antennas 114 and those received from the backward looking antenna 116 to determine information associated with the location of detected movement (e.g., whether the movement occurs in front of or behind the device).

In the diagram 100, the device 110 has been operated to transmit a signal either with one of more of the antennas as transceivers or with a separate transmitter. The signal (not shown) propagates outwards, strikes objects, and is reflected as a reflected or partially reflected signal 115A, 120A, 125A, 130A, and 135A. As received by the device 110, the reflected signal exhibits a frequency shift proportional to the magnitude of the object's movement towards or away from the device.

In particular, the signal may penetrate a wall 118 and be partially reflected by a running individual 115, a sitting individual 120, a spinning ceiling fan 125, and a stationary chair 130 on the opposite side of the wall. The signal also is partially reflected by a nearby stationary chair 135 that is on the same side of the wall 118 as the user 105. The signal 120A reflected by the sitting individual 120 exhibits a small frequency shift due to the breathing movement of the individual's chest cavity. The signal 115A reflected by the running individual 115 exhibits a larger frequency shift than the partially reflected signal 120A from the sitting individual 120, with this frequency shift being due to the more pronounced movement of the body of the running individual 115. The signal 125A reflected by the spinning ceiling fan 125 exhibits a frequency shift that is characteristic of a repeated mechanical movement. The signals 130A and 135A that are reflected by the stationary chair 130 and the nearby stationary chair 135 exhibit no frequency shift.

The device 110 receives and processes the frequency and phase information from the partially-reflected signals 115A, 120A, 125A, 130A, and 135A. The signals may be received using a single antenna or using forward and backward looking antennas. In an initial scan function, the device 110 may calibrate against data associated with partially-reflected signals that exhibit no frequency shift 130A and 135A or that exhibit only a frequency shift due to mechanically repeated movement 125. The processed data indicates movement reflective of both breathing and running. In some implementations, the device 110 provides indications of detected moving objects by lighting separate lights or providing other types of visual indicators. In other implementations, the device 110 can provide the results of the scan on a display screen 119 along with various information determined by processing.

In this example, the device uses three forward looking antennas to determine the location of objects in three spatial dimensions (as discussed in FIGS. 5A-5B) and provides a visual display of the relative location of two detected moving objects. Although reflected signal from the running individual 115, the sitting individual 120, the spinning ceiling fan 125, and the stationary chairs 130 and 135 have all indicated the existence of objects, only two are shown on the display screen 119. Using processing techniques discussed below, the device 110 has removed the fully stationary objects (e.g., the chairs 130 and 135) and the objects exhibiting characteristics of repetitious mechanical movement (e.g., spinning ceiling fan 125) from consideration. Also, processing techniques of the device 110 have determined the sitting individual 120 to be exhibiting movement indicative of a stationary person (e.g., only subtle breathing movement) and the running individual 115 to be exhibiting movement indicative of an active person. Therefore, of the detected objects, only the two individuals are represented on the display screen 119.

The significance of the movement and its location in space relative to the device are shown. Specifically, the running individual 115 is represented on the display screen with a larger, more pronounced indication 119a to signify the significant level of movement whereas the sitting individual 120 is represented on the display screen with a smaller, less pronounced indication 119b to signify the less significant movement. Other implementations may show (or include options to show) all detected objects or a subset thereof (e.g., show objects with repeated mechanical movement, show stationary objects, show any object detected that is between a detected moving object and the device 110).

Figure 1B:
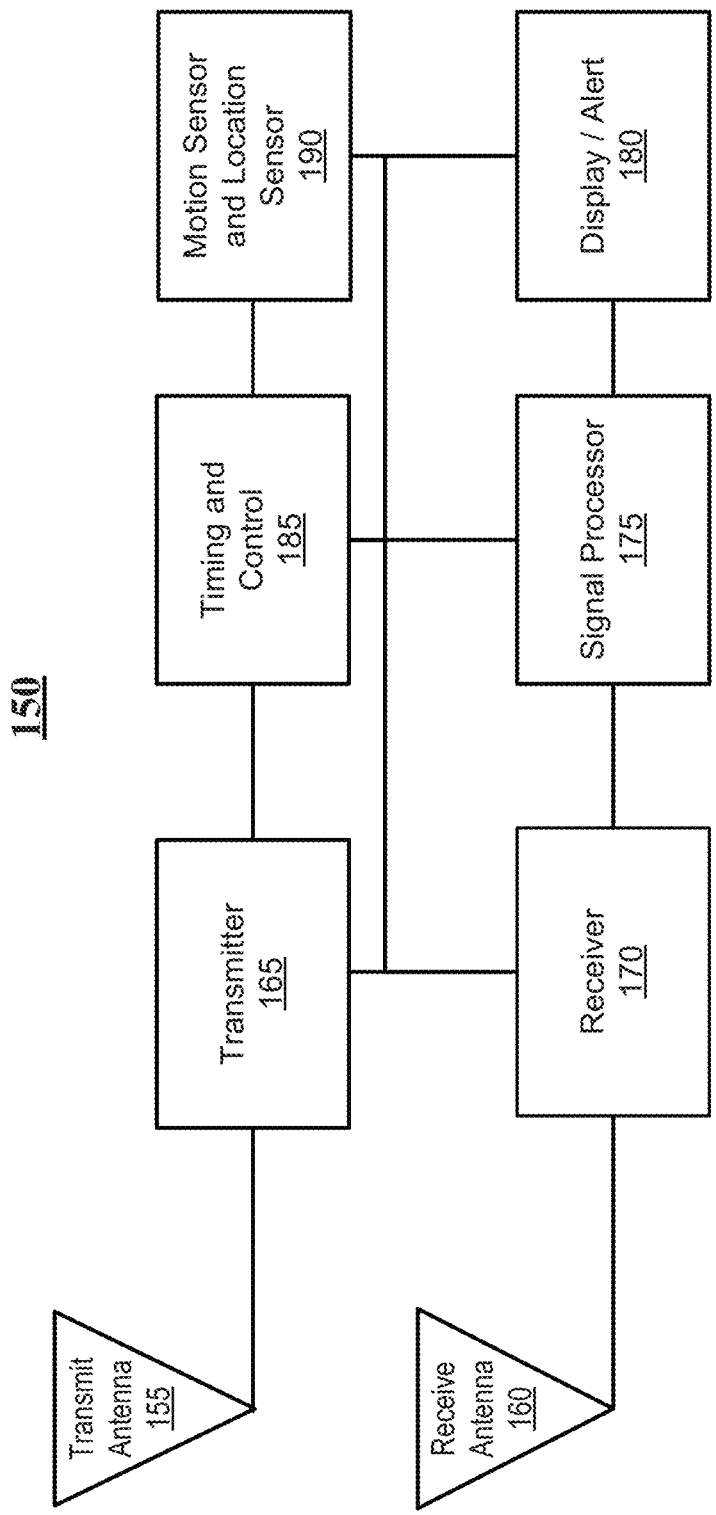
FIG. 1B is a block diagram of a stepped-frequency scanning device configured to detect moving entities.

FIG. 1B is a block diagram of a stepped-frequency scanning device 150 configured to detect moving entities. Although discussed in terms of a device, the elements can be used as a system or apparatus of commonly located or separated elements. The device 150 includes antennas 155 and 160 for transmitting and receiving a stepped-frequency radio frequency signal (an "RF signal") to detect moving entities. The device 150 is shown as a bistatic radar, in that there are separate antennas for transmitting and receiving the RF signal. In particular, a transmit antenna 155 is connected to a radar transmitter and transmits an RF signal toward a target, and a receive antenna 160 is connected to a radar receiver and receives a portion of the RF signal that is reflected by the target. In other implementations, the device 150 may be a monostatic radar that uses a single antenna as a transceiver to both transmit and receive the RF signal. Also, various implementations may use multiple transmit antennas 155 and/or multiple receiving antennas 160.

The transmit antenna 155 is connected to a radar transmitter 165 that transmits an RF signal toward a target. Implementations using more than one concurrent transmission (discussed below) may use one or more transmit antennas 155 which can be coupled to either a single shared/multiplexed radar transmitter 165 or multiple dedicated radar transmitters 165. The transmitted RF signal can include frequencies that cover a bandwidth in increments of frequency steps. For example, the signal may include a nominal frequency operating with a center frequency in the UHF, L, S or X bands.

The receive antenna 160 is connected to a radar receiver 170 and receives the reflected RF signal from the target. For simplicity, the receive antenna 160 is discussed in terms of the implementation including a single antenna. Nevertheless, the receive antenna 160 may represent two or more antennas as shown by the forward looking antennas 114 of FIG. 1A. Implementations employing multiple antennas may each have a dedicated receiver which is shared or otherwise multiplexed, or may include multiple dedicated receivers.

The receiver 170 is coupled to a signal processor 175 that processes received RF signals from the receiving antenna 160. The signal processor 175 is coupled to a display 180 and a timing and control module 185. The display 180 provides audible and/or visual information or alerts of objects detected by the device, such as those described with the display screen 119 of FIG. 1A. The timing and control module 185 may be connected to the transmitter 165, the receiver 170, the signal processor 175, and the display 180. The timing and control module provides signals, such as a clock signal and control signals, to the other components of the device 150. Implementations may employ detection processes for slow or fast movement that run in real-time on an embedded processor. Implementations also may employ interference detection processes.

The signal processor 175 can include an interferometer/ interferometer processing. The interferometer can process received signal to enable location of entities or targets within a given environment. The interferometer also can provide simultaneous stationary object mapping capability. In particular, the interferometer may receive channel signals, use a low-pass filter to provide stationary object mapping, and use a high-pass filter for moving target angle estimation.

The device 150 also includes a motion sensor 190 which may include an internal inertial sensor and/or global positioning system (GPS) sensor or other location sensors. Detection of moving and/or breathing targets during handheld and/or on-the-move operation of the device 150 is supported through use of the motion sensor's measurement and resulting compensation during processing. In various implementations, an inertial measurement sensor, with or without the use of a global positioning sensor, can be incorporated with the motion sensor 190 to provide sensor motion measurement, thereby supporting motion compensation processing to factor out device 150 motion (as discussed below). Alternatively, or in conjunction, adaptive processing of the radar return can be used by the motion sensor 190 and/or the signal processor 175 to estimate the sensor motion independent of measurements by the motions sensor 190. Such adaptive processing can be employed by using the phase change of stationary scattering present in the scene to estimate the sensor motion.

Figure 2A:
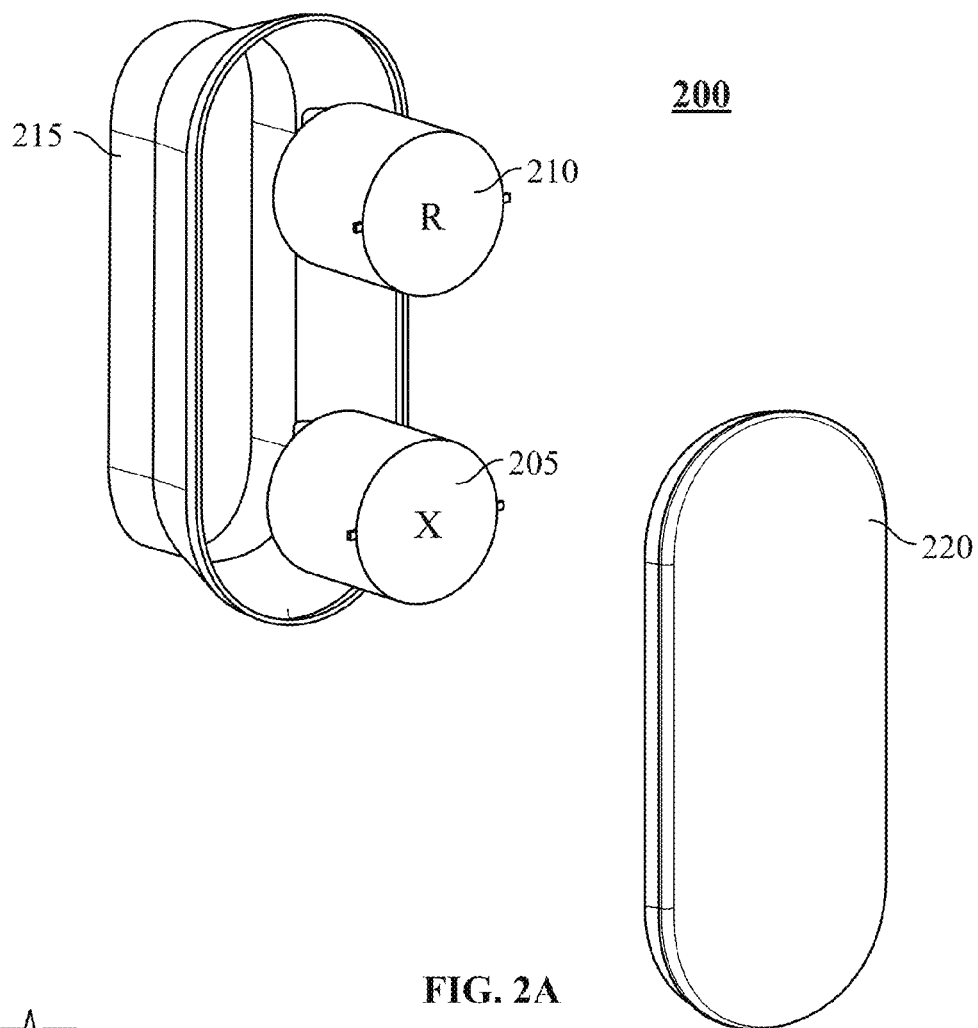
FIGS. 2A and 2B are perspective views of an antenna design for the device of FIG. 1B.

FIG. 2A illustrates an antenna design 200 employed in one implementation of the device of FIG. 1B. The design 200 employs separate transmit and receive antennas 205 and 210 to simplify the electronics, provide spatial separation and reduce very shallow reflections. The antennas 205 and 210, which may serve as particular implementations of the antennas 114 and 116 of FIG. 1B, may be placed in a housing 215, and a cover 220 may be placed over the antennas. The cover 220 may be made of a suitable radome material.

Figure 2B:
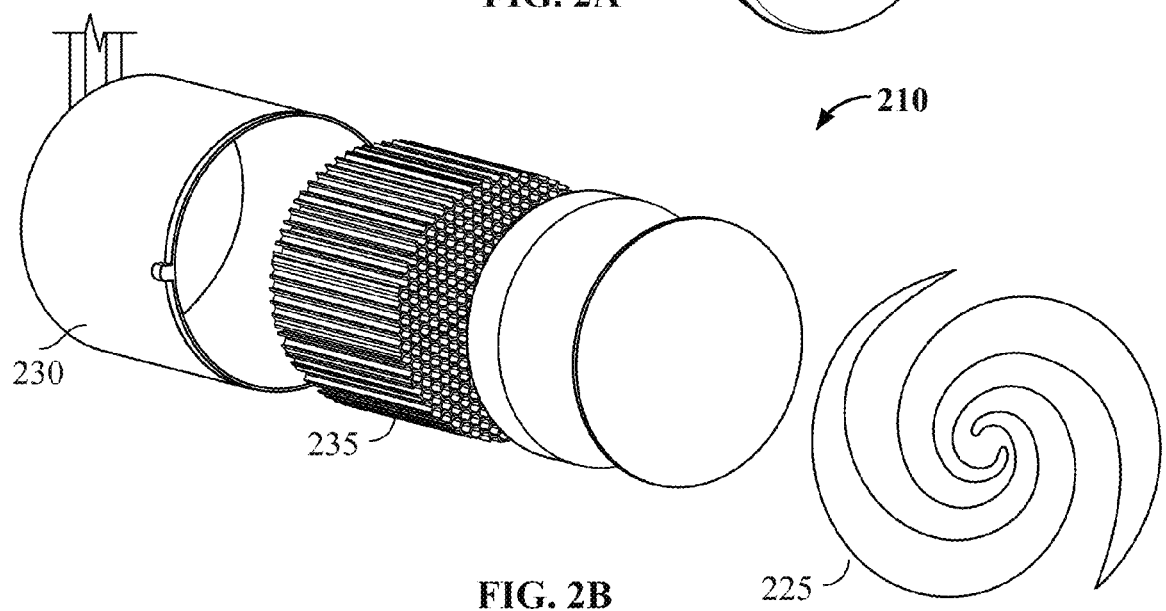

FIG. 2B further illustrates aspects of the design 200 discussed above with respect to FIG. 2A. Although the following discussion refers to the receive antenna 210, it is equally applicable to transmit antenna 205 or other antennas. As shown, the design 200 employs a spiral antenna as the receive antenna 210 to permit significant size reduction. For an antenna to be an efficient radiator, it must normally have a dimension of at least one-half wavelength. The spiral radiates efficiently when it has an outer circumference of at least one wavelength. This means that the antenna needs a maximum diameter of about one-third wavelength. The upper frequency limit for efficient spiral radiation is set by the size of the feed point attachments, and the lower frequency limit is set by the outer diameter of the spiral structure. Within these limits, the spiral radiates efficiently in a frequency-independent manner. The input impedance and the radiation patterns may vary little over this frequency range.

The receive antenna 210 may be constructed by etching a spiral pattern on a printed circuit board. A planar, printed circuit, spiral antenna radiates perpendicularly to the plane of the spiral. The spiral 225 itself is located at the end of a cylindrical metal cavity 230 (the cavity back) to provide isolation from neighboring elements and electronics. Typically, an absorber 235 is used on the back side of the spiral inside the cavity 230 to make sure the element responds only forward.

The previous description provides an example implementation of an antenna design. Other implementations may include different antennas, such as an endfire waveguide antenna. Such a configuration may be slightly larger than the spiral configuration. The endfire waveguide antenna reduces the measurement spot size, thus making a more precise position of a concealed object easier to locate. Other suitable types of wideband antennas may also be used.

Figure 3:
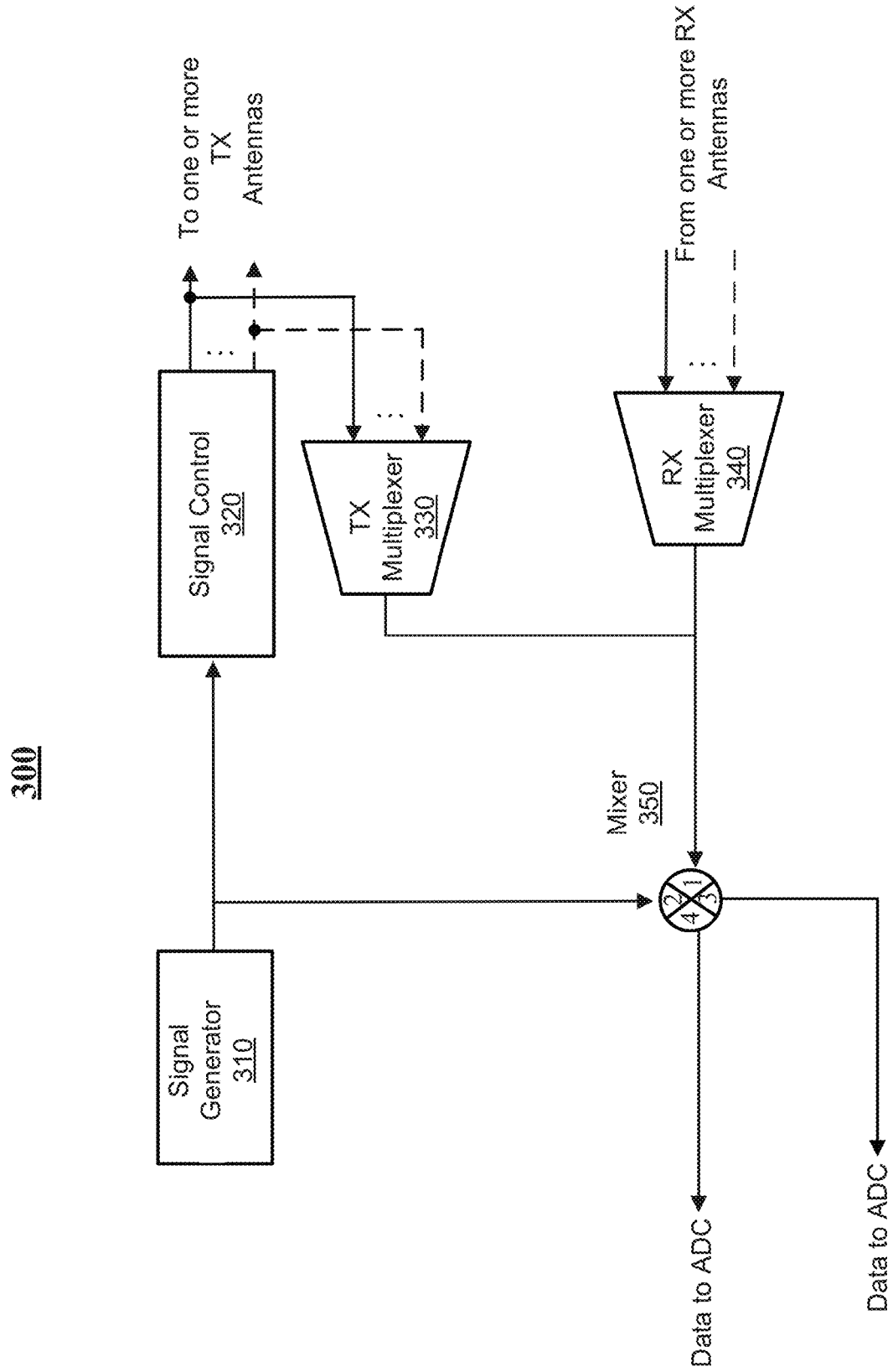
FIG. 3 is a diagram of an example conversion circuit in a scanning device.

FIG. 3 is a diagram of an example conversion circuit 300 in a scanning device. The circuit 300 can be used as portions of the transmitter 165 and receiver 170 of FIG. 1B. Also, the circuit 300 includes a signal generator 310, a signal control 320, a transmission multiplexer 330, a receive multiplexer 340, and a mixer 350, which may be in the form of a quadrature demodulator. In the circuit 300, one or more transmission signals are generated and transmitted through one or more transmit antennas. Reflected portions of the transmitted signal are received through one or more receive antennas, which may optionally be the same antennas as the one or more transmit antennas. The received signal and the signal generated by the signal generator 310 are input to the mixer 350, which outputs an in-phase signal and an out-of-phase (quadrature) signal.

Specifically, the signal generator 310 generates a signal to be transmitted by the one or more transmit antennas. The signal generator 310 may include a phase lock loop synchronized by an oscillator. In one implementation, a temperature controlled crystal oscillator is used to synchronize a voltage controlled oscillator. The signal generated by the signal generator 310 may be input to a mixer 350 and to a signal control 320. The signal control 320 may amplify or otherwise condition the signal to enable transmission by the one or more transmit antennas. The signal control 320 inputs the signal to the one or more transmit antennas and to a transmission multiplexer 330. The signal control 320 includes one or more signal outputs, each dedicated to one of the one or more transmit antennas and coupled to the transmission multiplexer 330. The transmission multiplexer 330 enables sequential sampling of the one or more signal outputs of the signal control 320 to provide feedback of the transmission signal to the mixer 350. The transmission multiplexer 330 may function as a single pole double throw (SPDT) switch for each of the signal outputs of the signal control 320.

The one or more transmit antennas emit the transmission signal, which encounters objects in the environment. Portions of the transmission signal may be reflected. The reflected portions, which may exhibit a frequency and phase shift, are received by the one or more receive antennas. Each receive antenna inputs received signal to a receive multiplexer 340. The receive multiplexer 340 enables sequential sampling, by the mixer 350, of the signal received by each of the one or more receive antennas. The receive multiplexer 340 may function as a SPDT switch for each of the signals received by the one or more receive antennas.

Some implementations may use other mechanisms, such as a control system, in place of the transmission multiplexer 330 and the receive multiplexer 340. In one implementation, the one or more receive antennas are input directly to a mixer without a multiplexer.

The mixer 350 receives the signal from the signal generator 310 at a first input. Based on the transmission multiplexer 330 and the receive multiplexer 340, either the transmission signal or the received signal is provided to the mixer 350 at a second input. The mixer 350 converts input signals to a form that is more easily processed, such as, for example, an in-phase and an out of phase component at a baseband frequency. As shown, the mixer 350 is a quadrature demodulator, though other signal conversion systems may be used. The quadrature demodulator outputs "I" and "Q" data (referred to as IQ data) which can be sent to an analog-to-digital (A/D) converter. In some implementations, separate IQ data may be generated for each transmitted frequency.

The previous description is an example implementation of the transmit and receive circuit. Other implementations may include different components. For example, in various implementations, a single transmit antenna and a single receive antenna are each coupled to a switch rather than the transmission multiplexer 330 and the receive multiplexer 340.

Figure 4A:
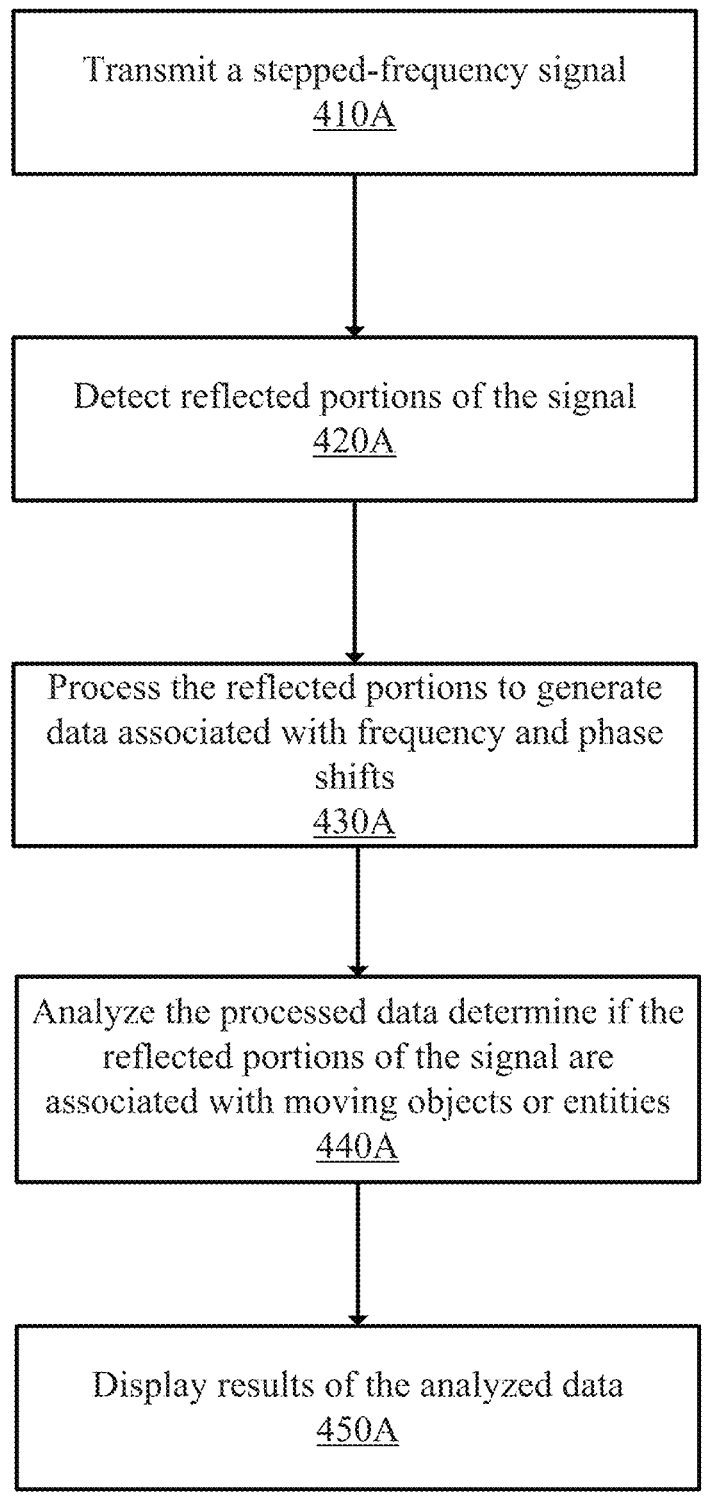
FIG. 4A is a flow chart of an example of a process to detect moving entities using a transmitted stepped-frequency signal with a scanning device.

FIG. 4A is a flow chart of an example of a process 400A to detect moving entities using a transmitted stepped-frequency signal with a scanning device. The process 400A may be implemented with the device 150 of FIG. 1B or with other devices. Also, the process 400A may be implemented in conjunction with the processes described below.

The process 400A begins when a stepped-frequency signal is transmitted by a device (410A). The stepped-frequency signal may be an RF radar signal including multiple frequencies and phases that are transmitted concurrently or consecutively. In one implementation, each transmission includes cycling through a frequency band such that multiple frequencies are transmitted. Specifically, while cycling through the band, each frequency is transmitted for a period of time, followed by the next frequency, until the bandwidth has been crossed. Although multiple frequencies may be sent, one after another, the transmitted and received signals are discussed here and elsewhere as a single signal to simplify discussion. After transmission, the signal strikes an object and is partially reflected.

Some implementations use multiple concurrent transmission for multi-static motion detection. Specifically, the multiple transmissions of the stepped frequency signal (410A) may include use of multiple transmit antennas simultaneously to form a multi-static radar. The transmit antennas may be located on a single device or across multiple devices. The combined measurements of signals can be received from the multiple transmissions by one or more receivers and can be used in processing to reduce interference and enhance detection of movement or location thereof. In some implementations, the transmit frequencies of the antennas are made different to avoid mutual transmission-interference. Also, the antennas can be networked (on a single device or between multiple devices) such that their transmit times are coordinated and the subsequent pre-processed data from each antenna can be processed in a central location. For implementations using multiple devices, the distances between antennas can be determined through static location survey or by using position measurement sensors.

Also, randomized frequency ordering and wide bandwidth of the transmissions may be utilized to disguise the coherent nature or minimize the effects of intentional or incidental jamming. For example, various implementations utilize a stepped-frequency pulse in which certain pulse frequencies are omitted in processing to screen out radio frequency interference from surrounding incidental or intentional sources. Also, a non-uniformly spaced, monotonically ordered, stepped-frequency waveform may be used. Further, a non-monotonically ordered stepped-frequency waveform or a frequency-hopped tonal waveform also may be used. The transmitted waveform frequency steps can be transmitted in an order dictated by a quadratic congruential sequence. Two or more antennas can be operated simultaneously using mutually orthogonal stepped-frequency transmit sequences, such as, for example Bellegardia Sequences or Quadratic Congruences.

In addition, some implementations enhance the effective aperture of the radar by moving the transmitting antenna along a pre-determined or motion-sensed line segment using a synthetic aperture radar (SAR) imaging operation mode. In particular, the stepped-frequency signal is transmitted by the device (410A) while the device is linearly moved. The known movement is combined with the received reflections and taken into account during processing to form a SAR image. During such operation, information provided by a device's inertial measurement and/or location sensors can be used to assist the user in providing a proper motion or by the processor in correcting for imperfections in the motion.

The device detects the reflected portion of the signal (420A). This detection can be accomplished using a transceiver, a separate antenna, or multiple separate antennas (e.g., a forward looking and backward looking antennas or multiple forward looking antennas). In one implementation, a single transceiver transmits the stepped-frequency signal and receives reflected portions therefrom. The detected signal includes a frequency that may have been altered by movement of the struck object and a phase that may be affected by the distance to the object.

Other implementation use multiple antennas for detection to enable more specific determination as to the location of an object (or entity). Using multiple antennas spaced at known distances and positioned to receive signals in a similar direction can enable a more accurate two or three dimensional identification of an entity. In particular, processing the measurements from two or more antennas, separated in a horizontal direction may be conducted to provide an estimate of azimuth angle-of-arrival. Moreover, elevation angle-of-arrival estimation may be provided by processing measurements from two or more antennas that are separated in a vertical direction. Simultaneous azimuth and elevation interferometry can enable estimation of each target's location in three spatial dimensions. The device's existing receiver can be multiplexed between multiple receiving antennas and/or additional receivers can be added to the device to receive the signals from multiple antennas simultaneously.

The device processes the reflected portions of the signal to generate data associated with frequency and phase shifts (430A). The processing, for example, may identify information associated with frequency and phase shifts that may be indicative of the presence of moving objects or objects at a distance. The processing may include a calibration step to calibrate the data or processing steps based on conditions detected for a particular use of the device. Calibration may include removing or altering parts of the signal indicative of clutter, repeated mechanical movement, signal leakage, or reflections near or behind the device. Processing may also include calibration of the analysis steps, such as integration time.

To improve stationary object mapping and to reduce the subsequent dynamic range of the received signal data, leakage cancellation can be used in the calibration processing. Specifically, various components of the transmit-to-receive leakage signal can be adaptively located and removed from the received signal. Such components can generally be orders of magnitude higher than the highest reflected signal. Their cancellation can provide a reduced dynamic range of the subsequent signal data, and also can suppress the range sidelobes of the leakage signal which otherwise may obscure lower amplitude stationary targets.

In some implementations, the device uses a motion and/or location sensor to calibrate information from the reflected portions of the signal during or prior to processing. Specifically, motion or location information can be used to support motion compensation processing to factor out device motion. Also, adaptive processing of the radar return can be used by the device to estimate device motion. Such adaptive processing can be employed by using the phase change of stationary scattering present in the scene to estimate the sensor motion.

The device analyzes the data to determine if the reflected portions of the signal are associated with moving objects or entities (440A). The analysis of the data (440A) may include use of a short-time Fourier Transform to estimate the Doppler shift of the return signals as one of multiple Fourier Transformation integration times. In particular, the analysis may include using a low-pass filter to provide data for stationary object mapping and using a high-pass filter to provide data for moving target angle estimation. In various implementations, other techniques may be used to accomplish this estimation. In particular, processing techniques such as Maximum Likelihood Method, Maximum Entropy Method, or Music Method, may offer greater resolution for micro-Doppler detection using shorter observation times. Such methods can be used as parametric techniques to hypothesize a particular (often autoregressive) parametric signal model enabling greater resolution in the Doppler domain with shorter observation times.

Similarly methods such as Singular Spectrum Analysis (SSA) and Higher-order statistics based techniques (e.g., Bispectral Analysis) can also be used to better resolve very closely spaced independent target returns than is possible with direct Fourier methods. These methods can be considered in a tradeoff between greater computational cost than Fast Fourier Transform (FFT) methods versus improved resolution under certain circumstances. Moreover, other methods that focus on reducing the computational cost relative to the FFT methods can be used to create the frequency (Doppler) spectrum, such as, Discrete Cosine Transform, Fast Hartley Transform, and Walsh-Hadamard Transform. These methods may employ simpler basis functions for the orthogonal decomposition than the more complex exponentials in the FFT methods. Each of the above described processing techniques can be used in the analysis of the data (440A) and may be chosen depending on the specifics of the target application and desired specialization for optimizing implementation cost versus needed detection resolution and sensitivity.

The process 400A can configure the transmitted waveform internal structure, bandwidth extent, and duration to better match and reveal certain target characteristics and fine-grained structure. For example, the detection and identification of small movements of machinery (e.g., clock mechanisms, slow speed rotating pumps) or human motions (e.g., voluntary and involuntary facial movements and life sign processes such as breathing, heart beat and blood flow within the arterial cavities) can be targeted by the analysis of the data (440A). These targets, when re-examined with the properly designed transmitted waveform, can reveal their nature in the form of very small displacements over time that impart micro-Doppler structure on the returned signals. For example, in various implementations, movement of 50-70 microns and less can be detected through adjustments to the transmit waveform characteristics and receiver processing algorithm parameters.

Results of the analyzed data are then displayed (450A). In some implementations, the results can be displayed using a series of indicators or lights. For example, movement detected as significant (e.g., from a running individual) can result in activation of a first light while movement detected as less significant (e.g., from an individual sitting and breathing) can result in activation of a second light. In other implementations, a display screen is used to illustrate two or three dimension positions of movement with or without additional information about the movement. For example, a visual display of the relative location of multiple detected moving objects can be shown as locations on a three dimensional graph or representation of a space. The significance or level of movement of the detected moving objects can be indicated by, for example, size, shape, color, or animation of the indications. Additionally, the device can derive information of the area using information from the received reflections (e.g., derive existence of stationary objects such as walls) or by loading preexisting data (e.g., load a geographical map of an area or representation of the outlay of a building) and can populate the indications of detected movement upon the derived or loaded information.

Other information can be shown using the display screen. For example, in some implementations, the device is configured to determine the relative positions of other devices. For example, the device can locate other devices by detecting a unique broadcast signature during transmission (e.g., a particular sequence of frequency steps) or by wireless network communications. Also, individuals without a scanner may include other RF identification tags that can be similarly located and identified. The device can display the position of other located devices/individuals on the display screen by rendering a unique indication. For example, such located other devices/individuals can be displayed with a first color indication while identified unknown moving objects can be displayed with a second color indication. This can enable a unit of soldiers to, for example, identify whether a target in another room is likely a non-threat (e.g., a "friendly") or a threat (e.g., a "hostile").

Also, devices can be configured to share results of analysis with other nearby devices using wireless communication. From this shared information, the device can display results computed from other devices. For example, if a first device determines there is a moving object 3 meters in front of it that is likely a non-threat it can transmit this determination to a second device. The second device receives this information and determines the location of the non-threatening object. For example, the second device may first determine that the first device is located, for example, 4 meters left of the device. Thereafter, the second device determines that the non-threatening object is 5 meters diagonally front and left of the device based on the first device's relative location to the second device and the non-threatening object's relative location to the first device, and renders an appropriate indication on the display screen.

The process 400A is an example implementation of a process to sense moving entities using, for example, a stepped-frequency scanning device. Some implementations may include additional or alternative steps. For example, processing and analyzing the data (430A and 440A) may be conducted together.

Figure 4B:
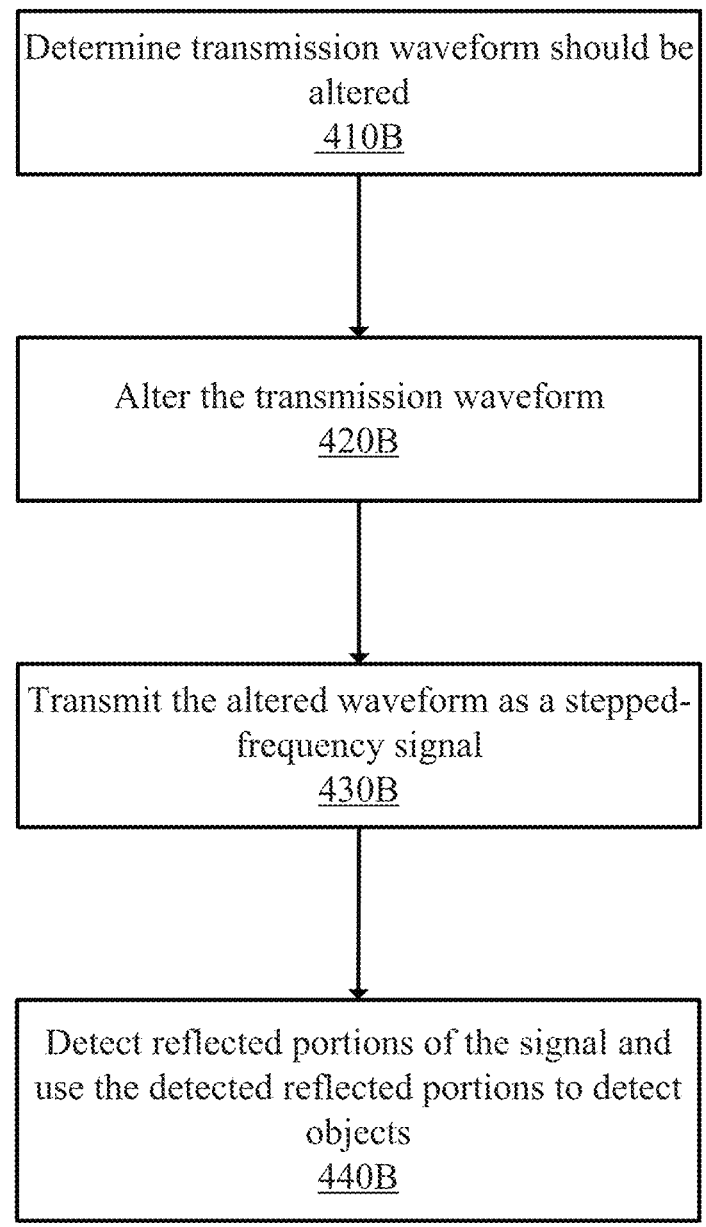
FIG. 4B is a flow chart of an example of a process to detect moving entities including altering transmitted waveforms used by a scanning device.

FIG. 4B is a flow chart of an example of a process 400B to detect moving entities including altering transmitted waveforms used by a scanning device. The process 400B may be implemented with the device 150 of FIG. 1B or other devices. The process 400B can be used along with or separate from the process 400A of FIG. 4A. By altering the transmitted waveform, a device may be able to compensate for the effects of noise or interference, and may be able to avoid or overcome the presence of signal jamming.

Initially, it is determined that the transmission waveform should be altered (410B). The determination may be made by a user or by the device. For example, in one implementation, the device includes an input option to randomize the waveform frequencies or to select alternative frequency stepping. In particular, if a previous scan yields poor results (e.g., the results seem incorrect to the user, such as excessive detections), the user can activate a manual alteration input (e.g., a button on the device). In response, the device is triggered to adjust the transmission waveform used in subsequent transmission. Also, a user may determine that alteration is needed prior to any transmission, such as, if the user suspects that an identifiable transmission may result in directed jamming By using a manual alteration input to preemptively randomize the transmitted waveform, the coherent nature and wide bandwidth of the subsequent transmissions can be disguised or minimized, possibly preventing detection or jamming.

In various implementations, the device is configured to determine that the transmission waveform should be altered (410B) without additional user input as a result of various conditions. For example, the device can be configured to trigger alteration of the transmission waveform in response to a determination of poor results during processing and analysis of data, such as, if saturation or degraded performance is detected (discussed below). In addition, the device can be configured to determine that the transmission waveform should be altered (410B) in response to a determination that frequencies are jammed or otherwise have high levels of interference. In one implementation, the device detects signals present prior to transmission (prior to each transmission or during device power on). If a frequency is found to be unavailable due to jamming or interference, the device alters the waveform to remove frequency steps in or near the unavailable frequency.

The device proceeds to alter the transmission waveform (420B). The altering may include removing specific frequencies, changing the step pattern of the frequency steps, randomizing frequency steps, or otherwise generating a non-uniformly spaced, monotonically ordered stepped-frequency waveform. The altering may include accessing a stored transmission waveform of a series of discrete stepped-frequencies for transmission, altering one or more of the discrete stepped-frequencies or order thereof, and storing the altered transmission waveform in permanent or temporary storage (e.g., random access memory) for use during subsequent transmission.

Thereafter, the altered waveform is transmitted by the device as a stepped-frequency signal (430B). The frequency steps of the altered waveform can be transmitted in an order dictated by a quadratic congruential sequence. Also, in some implementations, two or more transmit antennas can be operated simultaneously using mutually orthogonal stepped-frequency transmit sequences, such as, for example Bellegardia Sequences or Quadratic Congruences. Reflected portions of the signal are detected and used to detect objects (440B). Multiple receiving antennas can be used. The reflected portions of the signal can be processed to generate data associated with frequency and phase shifts, analyzed, and used to display results using, for example, the techniques described above with respect to elements 430A-450A of FIG. 4A.

Figure 5A:
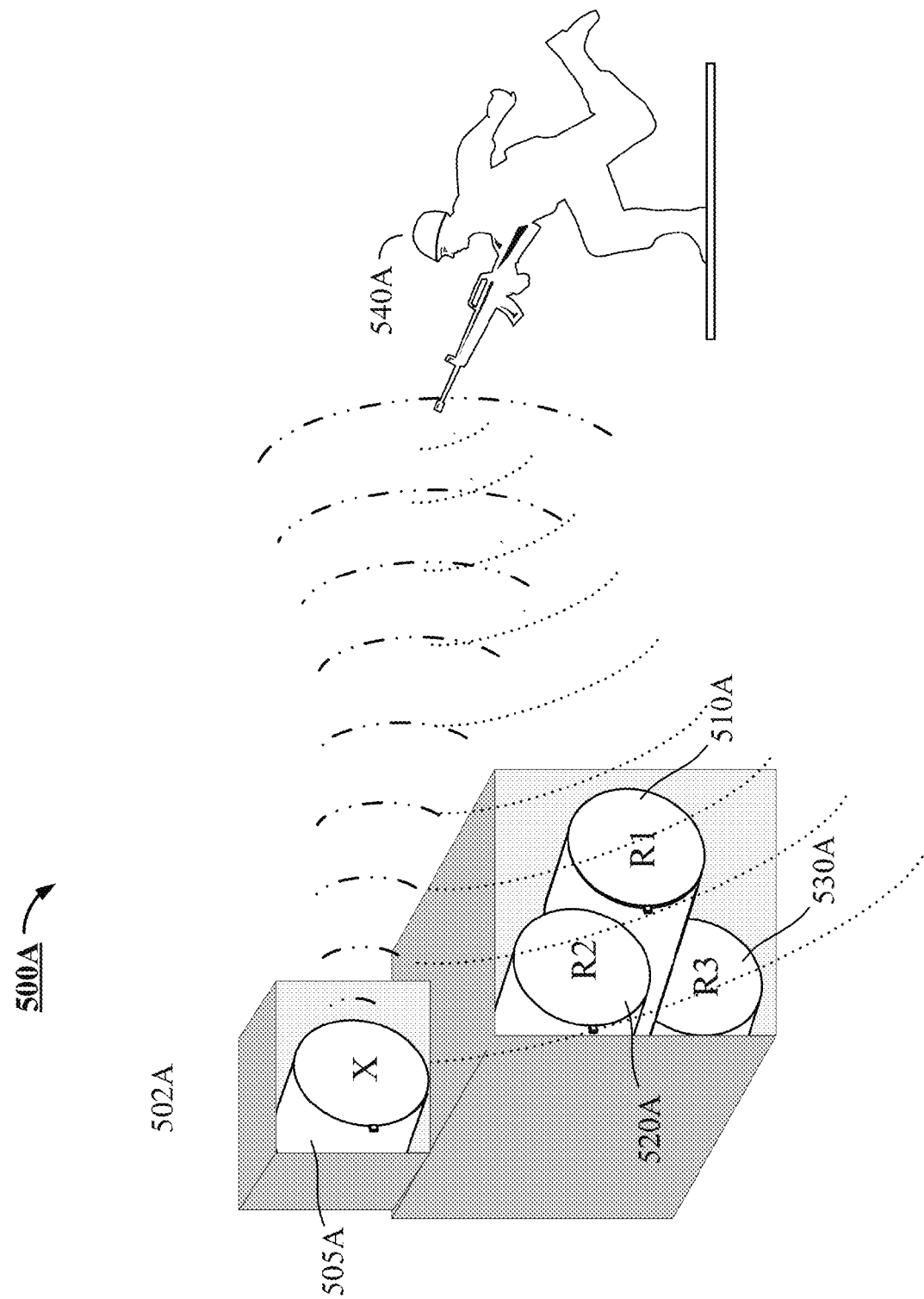
FIG. 5A is a diagram illustrating use of interferometric measurement with a scanning device.
Figure 5B:
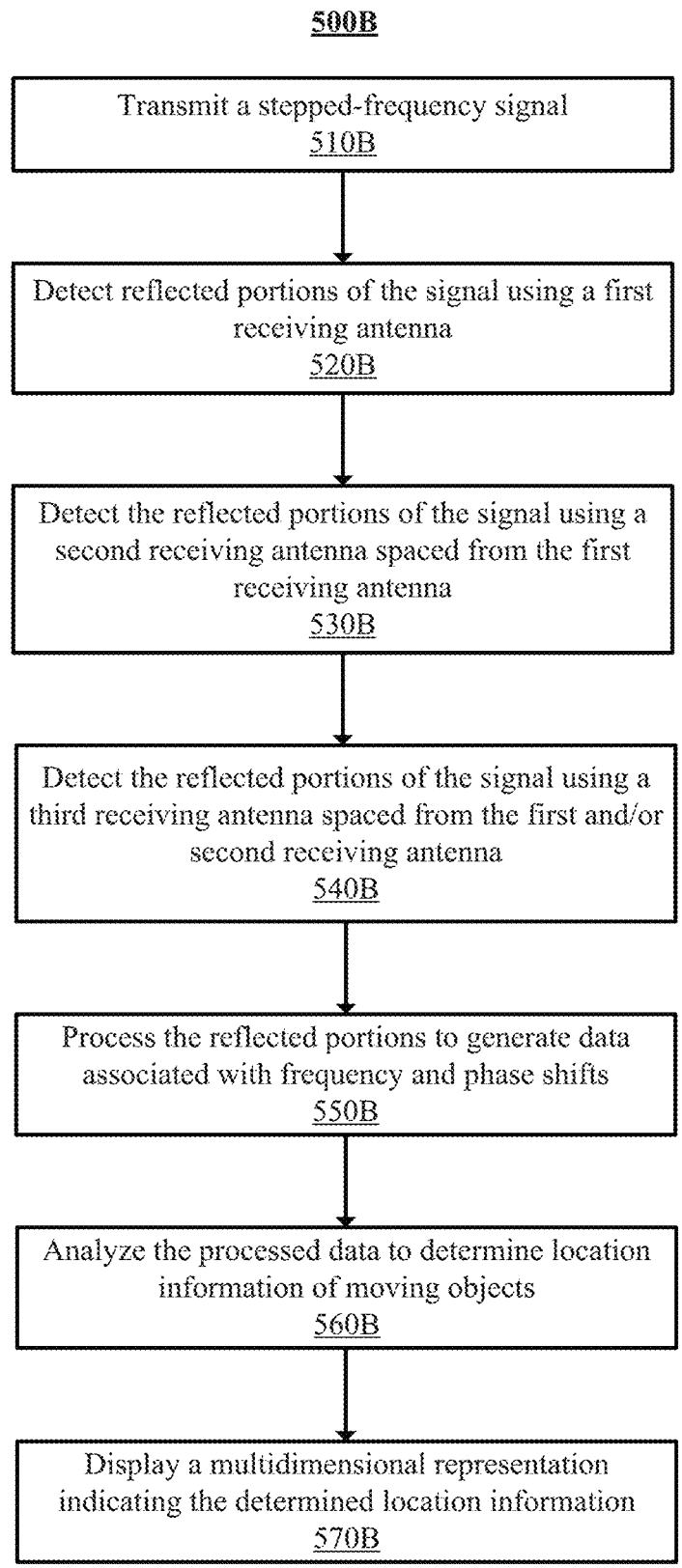
FIG. 5B is a flow chart of an example of a process to detect moving entities using interferometric measurement with a scanning device.

FIG. 5A is a diagram 500A illustrating use of interferometric measurement with a scanning device 502A and FIG. 5B is a flow chart of an example of a process 500B to detect moving entities using interferometric measurement with the device 502A. The description of FIGS. 5A and 5B is directed to the use of multiple receiving antennas. By using multiple receiving antennas, the determined location of moving objects can be of greater specificity. For example, while a single receiving antenna generally enables determination of a linear distance between the device 502A and the object, using three receiving antennas can enable determination of a location in three spatial dimensions relative to the device 502A. The device 502A may be implemented as a part of the device 150 of FIG. 1B or other devices. The process 500B can be used along with or separate from the process 400A of FIG. 4A.

Initially, the device 502A transmits a stepped-frequency signal (510B). The signal may be a stepped-frequency signal transmitted using a single transmit antenna 505A. The signal propagates outward from the device 502A and reaches a moving object 540A, where it is partially reflected. The reflected portions of the signal propagate back to the device 502A with a frequency change proportional to the magnitude with which the moving object was moving towards or away from the device 502A. As the reflected portions of the signal propagate, the phase changes with position while frequency remains constant. The reflected portions of the signal propagate past each of the first, second, and third receiving antennas 510A-530A.

The reflected portions of the signal are detected by the first receiving antenna 510A of the device 502A (520B). The first receiving antenna 510A is at a first location, and the reflected portions of the signal exhibit a first phase relative to the first location. The reflected portions of the signal are also detected by the second receiving antenna 520A of the device 502A (530B). The second receiving antenna 520A is at a second location which is spaced from the first location. The reflected portions of the signal are further detected by the third receiving antenna 530A of the device 502A (540B). The third receiving antenna 530A is at a third location which is spaced from the first and/or second locations.

In one implementation, the first and second receiving antennas 510A and 520A are separated along a first axis (e.g., horizontally) to create a first interferometric pair and the third receiving antenna 530A is separated from the first and/or second receiving antennas 510A and 520A along a second axis which is perpendicular to the first axis (e.g., vertically) to create a second interferometric pair. In addition, the back lobe of a rear facing antenna (not shown) can be used in conjunction with the first and second interferometric pairs which are forward looking in the diagram 500A to provide additional interferometric measurement capability to increase accuracy of angle of arrival estimation. Different implementations can place the receiving antennas 510A-530A differently, such that they are separated by multiple dimensions. Although discussed as three separate occurrences for simplicity, the detections (520B-540B) can be conducted nearly simultaneously (i.e., detection can be temporally separated only by the time of propagation by the reflected signal).

The reflected portions are processed to generate data associated with frequency and phase shifts (550B) using, for example, the techniques described above with respect to element 430A of FIG. 4A. The processed data is analyzed to determine location information of moving objects (560B). In the analysis, the spatial locations of the receiving antennas 510A-530A and the phase of the reflected portions as measured by the receiving antennas 510A-530A are taken into account to determine the physical position of the moving object 540A relative to the device 502A.

In particular, the device 502A uses the phase differences between reflected portions of the signal as received by the first and second receiving antennas 510A and 520A and the known physical locations of the first and second receiving antennas 510A and 520A (e.g., in this implementation, separated horizontally) to determine the azimuth angle-of-arrival of the reflected portions of the signal. Also, the device 502A processes the phase differences between reflected portions of the signal as received by the second and third receiving antennas 520A and 530A and the known physical locations of the second and third receiving antennas 520A and 530A (e.g., in this implementation, separated vertically) to determine the elevation angle-of-arrival. The device 502A uses azimuth and elevation interferometry of the data to determine the physical location of the moving object 540A in three spatial dimensions.

Finally, the device 502A displays a multidimensional representation indicating the determined location information of the moving object 540A (570B) using, for example, the techniques described above with respect to element 450A of FIG. 4A.

Figure 6B:
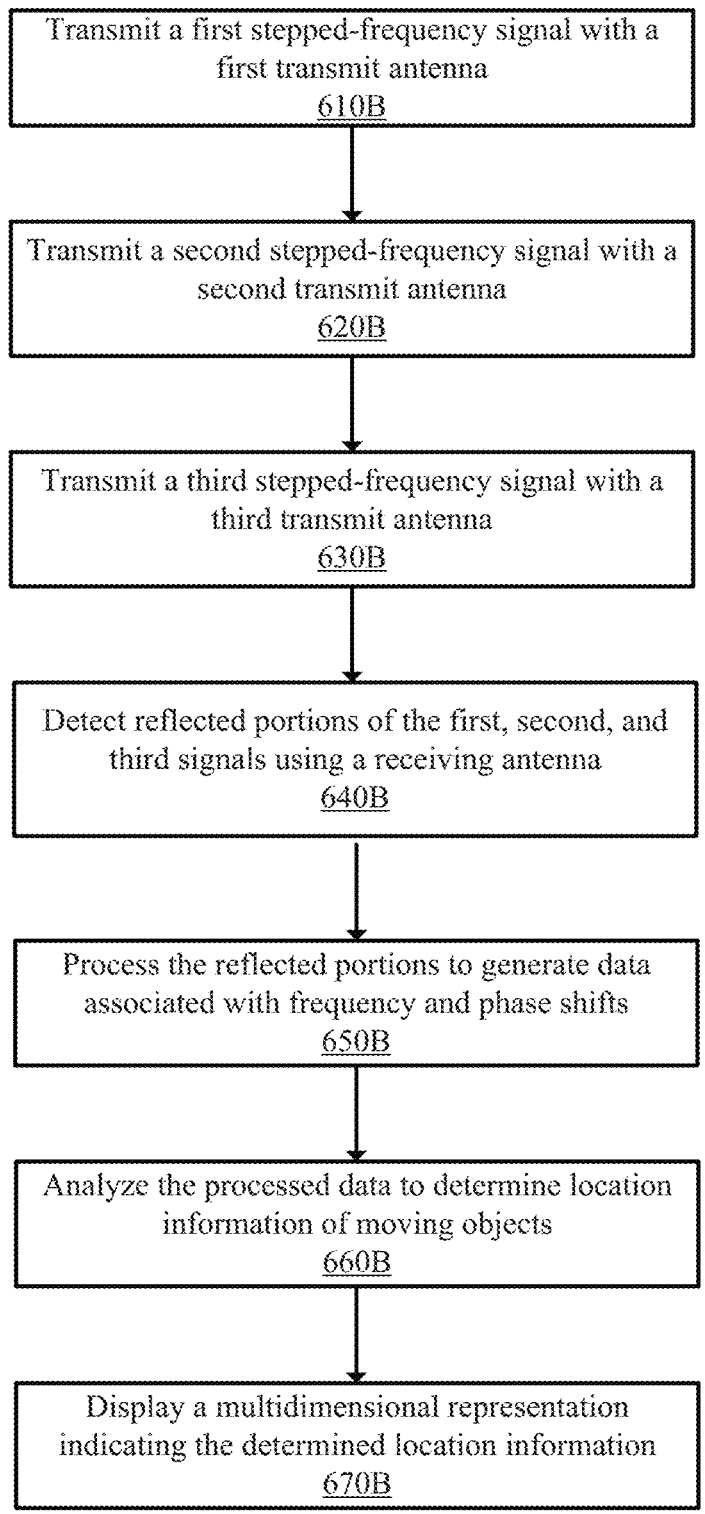
FIG. 6B is a flow chart of an example of a process to detect moving entities using multi-static motion detection with a scanning device.

FIG. 6A is a diagram 600A illustrating use of multi-static motion detection with a scanning device 602A and FIG. 6B is a flow chart of an example of a process 600B to detect moving entities using multi-static motion detection with the device 602A. The description of FIGS. 6A and 6B is directed to the use of multiple signal transmissions. By using multiple transmissions, more precise identification of movement and location thereof can be provided. Moreover, the multiple transmissions can protect against degraded results due to jamming, interference, or noise. Additionally, some implementations conduct the transmissions in a sequence to enable faster refreshing of a display screen. The device 602A may be implemented as a part of the device 150 of FIG. 1B or other devices. The process 600B can be used along with or separate from the process 400A of FIG. 4A.

Figure 7:
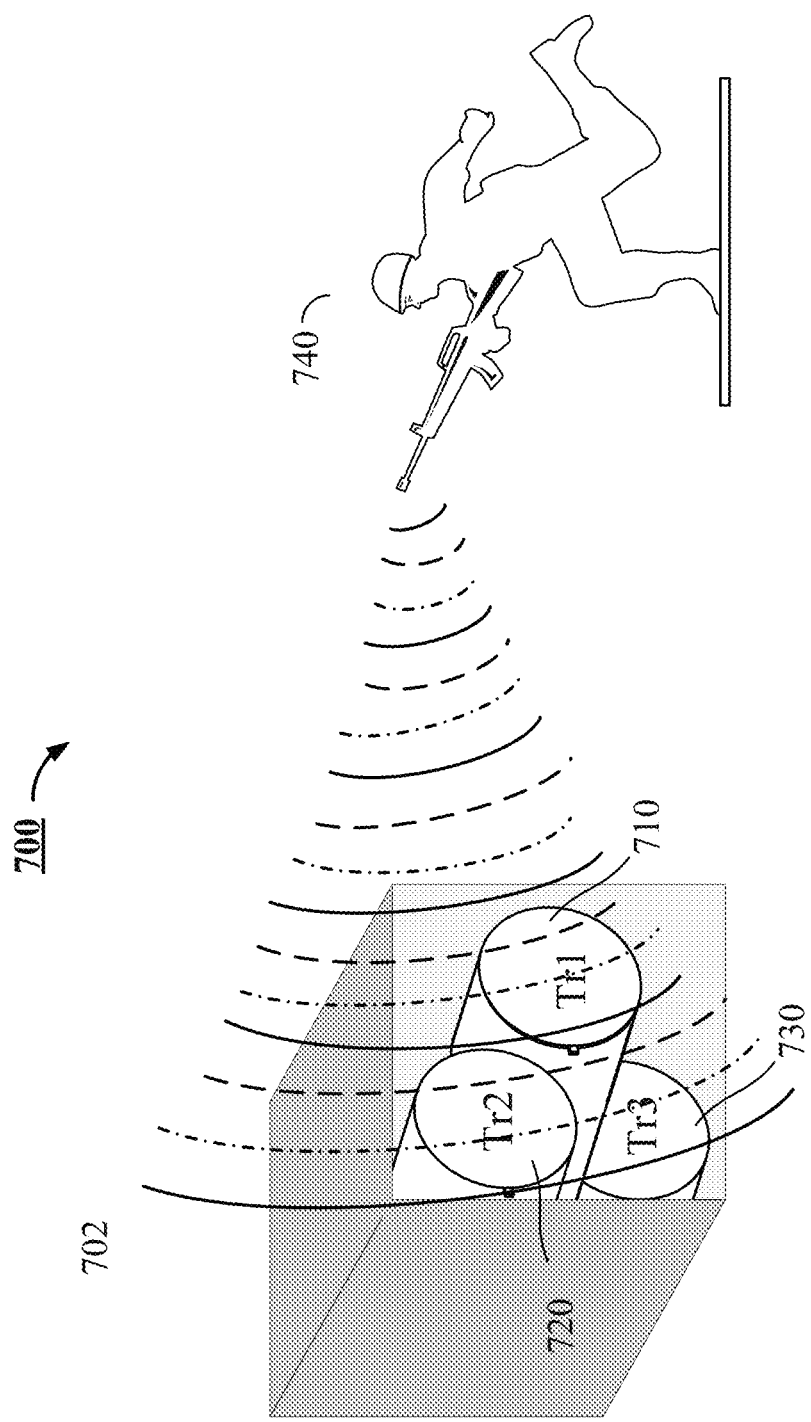
FIG. 7 is a diagram illustrating use of transceivers to conduct interferometric measurement and multi-static motion detection with a scanning device.

As shown in the diagram 600A, the three transmit antennas 610A-630A are part of a single device 602A. In one implementation, the transmissions occur on a single shared transmit antenna (not shown) to minimize device size and required components. The use of dedicated transmit antennas, however, can reduce circuit complexity and lower issues of interference. Moreover, for implementations employing interferometric measurement and the use of transceivers as shown in FIG. 7, separate antennas may be needed for receipt of signals, and therefore may be utilized for separate transmission as well.

Initially, first, second, third transmit antennas 610A-630A are used to transmit three signals. Specifically, a first stepped-frequency signal is transmitted with the first transmit antenna 610A (610B), a second stepped-frequency signal is transmitted with the second transmit antenna (620B), and a third stepped-frequency signal is transmitted with the third transmit antenna (630B). The transmissions of the three signals (610B-630B) can be conducted concurrently or spaced in time. Also, the three transmit antennas 610A-630A can each be a transmit antenna of separate devices, rather than from a single device 602A (as shown).

In some implementations, the transmissions of the three signals (610B-630B) are all conducted concurrently. In these implementations, the transmit frequencies are made to be different to minimize interference and to facilitate distinguishing between the reflected portions of the signals. For each concurrent transmission, the transmit antennas 610A-

630A can each transmit a particular frequency within a predetermined series of frequency steps. Thereafter, each transmit antenna concurrently transmits the next respective frequency of the series. For example, if the frequency series consisted of frequencies $F_1$, $F_2$, and $F_3$, the first transmission may be: $F_1$ for the first transmit antenna 610A, $F_2$ for the second transmit antenna 620A, and $F_3$ for the third transmit antenna 630A. The next transmission can follow as $F_2$ for the first transmit antenna 610A, $F_3$ for the second transmit antenna 620A, and $F_1$ for the third transmit antenna 630A. The physical separation for the three transmit antennas 610A-630A can be used during subsequent processing and/or analysis to account for difference in propagation distance of signals.

If multiple devices are used for transmission, a particular device can be used to control transmission, detection, and processing. The devices can be networked together (using line or wireless communication) to control flow of information and commands. Specifically, a first device of the multiple devices can direct other devices when and what frequency to transmit, similar to how the device 602A directs the three transmit antennas 610A-630A. The first device can also detect reflected portions of each signal and conduct processing and analysis of the signal transmitted by each of the multiple devices. Also, the first device can receive position information of the other devices to be used during processing and analysis. Results of the processing can be communicated from the first device to each of the other devices, enabling the user of each device to perceive the results.

Reflected portions of the first, second, and third signal are detected using a receiving antenna 605A (640B) and the reflected portions are processed to generate data associated with frequency and phase shifts, using, for example, the techniques described above with respect to elements 420A and 430A of FIG. 4A. As reflected portions of multiple signals of different frequencies may be concurrently received on the same antenna, the signal received by the receiving antenna 605A can be filtered to separately extract the reflected portion of each transmission. For example, in the first transmission in the example above, the signal received by the receiving antenna 605A is filtered with an appropriate filter to extract signals near each of frequencies $F_1$, $F_2$, and $F_3$. In one implementation, the signal received by the receiving antenna 605A is sent to a number of filters equivalent to the number of transmission (in this example, 3 filters), where each filter extracts signal near a particular frequency. In implementations directed to one-at-a-time transmissions, the signal received by the receiving antenna 605A is sent to a single adjustable filter which is adjusted to extract signals near a particular frequency according to the transmitted frequency.

The processed data is analyzed to determine location information of moving objects (660B). If multiple transmit antennas are used (as shown in the diagram 600A), the device 602A takes into account the known distance between the transmit antennas to account for different propagation distances of transmitted signals.

Implementations directed to concurrent transmissions can enable the determination of more precise identification of movement and its location. Using, for example, three transmissions can provide three separate data snapshots of a given scene. These snapshots may each have some differences due to signal noise, unwanted reflection, leakage, or other interference. By averaging the three data sets, the effect of such interference is reduced. Also, targeted or general signal jamming may be present on one, but not all, transmitted frequencies, resulting in very poor data. The device can selectively discard data from one or more transmitted frequencies. Therefore, the use of multi-static motion detection may overcome some effects of jamming.

Also, some implementations directed to one-at-a-time transmission enable a more rapid refreshing of data. In some implementations, the time required to complete the process 400A of FIG. 4A can be too large to update a user of a quickly changing situation. By using multiple transmissions spaced in time according to the length of time required to complete the process 400A, data presented to the user can be updated more often. If, for example, the process 400A requires one half of a second to complete and three separate transmissions are spaced at a half second, data can be refreshed at approximately 6 hertz (depending on processing speed and other parameters, the time required to complete the process 400A may be significantly different than one half of a second).

One-at-a-time refers to the start of transmission and does not preclude the possibility of an overlap between an ending of a first transmission and the start of a second transmission. Also, the order of the elements of process 600B can be different than shown in FIG. 6B. For example, reflected portions of the first signal can be detected using the receiving antenna 605A prior to the transmission of the second stepped-frequency signal with the second transmit antenna 620A.

Finally, the device 602A displays a multidimensional representation indicating the determined location information of the moving object 640A (670B) using, for example, the techniques described above with respect to element 450A of FIG. 4A.

FIG. 7 is a diagram 700 illustrating use of transceivers to conduct interferometric measurement and multi-static motion detection with a scanning device. The device 702 may be implemented as a part of the device 150 of FIG. 1B or other devices. The device 702 includes first, second, and third transceivers 710-730. Each transceiver is configured to both transmit and receive stepped-frequency signals and is spaced from the other transceivers. Therefore, the device 702 is able to conduct multi-static motion detection as described in FIG. 6B of a moving object 740 through transmission by the transceivers 710-730 and to conduct interferometric measurement as described in FIG. 5B of the moving object 740 through signal receipt by the transceivers 710-730. For simplicity, the diagram 700 illustrates the deflected signals but not the three transmitted signals.

In some implementations, the device 702 may use a mix of transceivers with transmit antennas or receive antennas. For example, a device 702 configured to use interferometric measurement as described in FIG. 5B without the need for multi-static motion detection may require three receive antennas but only one transmit antenna. To minimize size, the device 702 can include a transceiver antenna used for all transmission and as a first receive antenna and two spaced receive antennas used as second and third receive antennas in interferometric analysis.

Figure 8B:
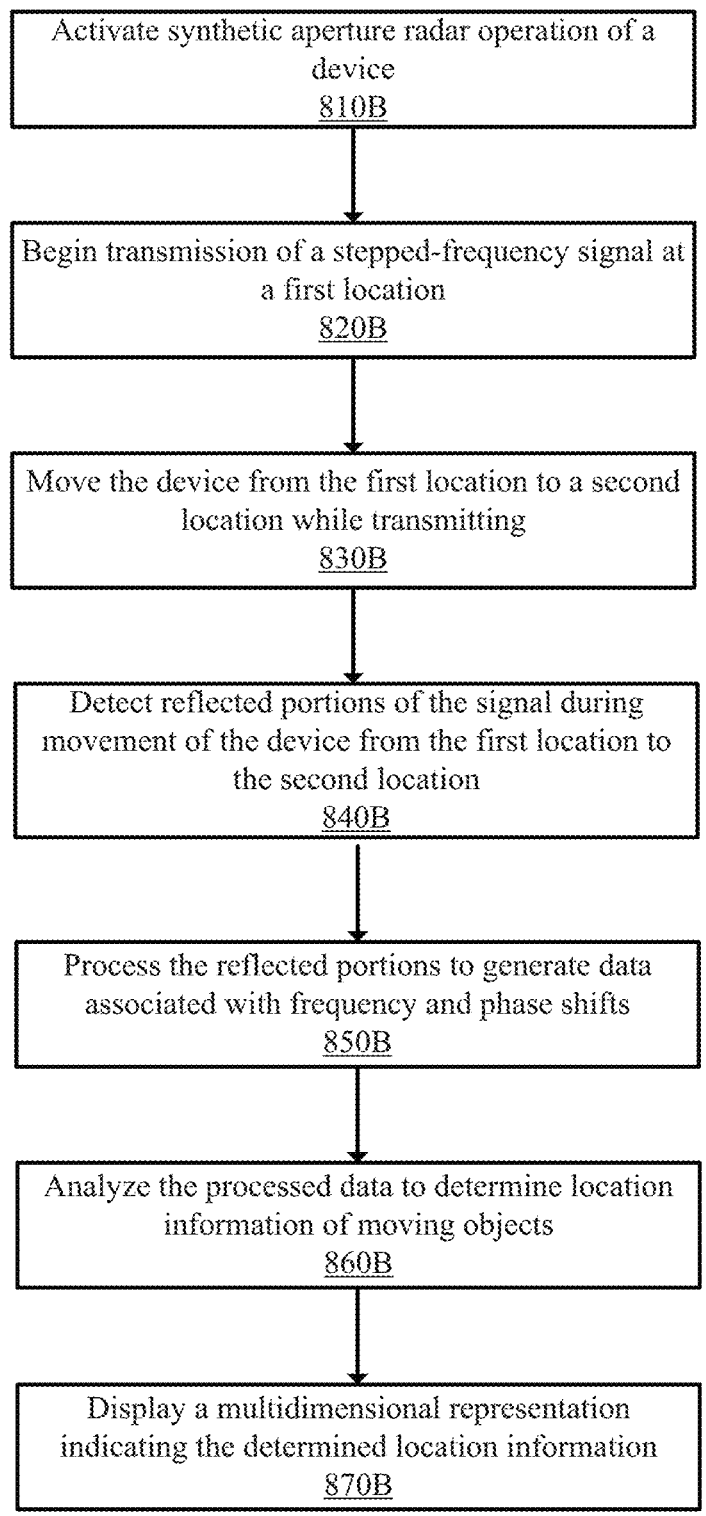
FIG. 8B is a flow chart of an example of a process to detect moving entities using synthetic aperture radar imaging with a scanning device.

FIG. 8A is a diagram 800A illustrating use of SAR imaging with a scanning device 802A and FIG. 8B is a flow chart of an example of a process 800B to detect moving entities using SAR imaging with the device 802A. SAR imaging artificially enhances the effective aperture of the receiving antenna of a device. For example, if SAR data is properly constructed from moving the device a distance of a meter, the results data can correspond to the results obtain from a device with a receiving antenna spanning a meter. The device 802A may be implemented as a part of the device 150 of FIG. 1B or other devices. The process 800B can be used along with or separate from the process 400A of FIG. 4A.

Initially, a SAR operation mode of the device 802A is activated (810B). The activation may be as a result of input by a user to the device 802A to select one of multiple operation modes. For example, in one implementation, the device 802A includes an input option to specify that SAR will be used. In response, the device 802A is triggered to adjust operation according to the description below. In another implementation, SAR operation is the standard mode of the device 802A, and powering on the device 802A activates SAR operation.

Transmission of a stepped-frequency signal begins at a first location 810A (820B). The transmission can begin as a result of user input. For example, the user may activate an input option (the same input option or another input option) to trigger the start of transmission. Also, the transmission may be triggered based upon movement of the device 802A such as that detected from an internal motion sensor. In one implementation, activating the SAR operation mode (810B) initiates device 802A monitoring of movement. When movement is deemed significant (e.g., motion of at least 100 millimeters is detected), transmission of the signal begins (820B). Therefore, when ready, the user can ready the device 802A for SAR operation and begin the scan by beginning the motion of the device (as described below).

The device 802A is moved from the first location 810A to a second location 820A while transmitting the stepped-frequency signal (830B) and reflected portions of the signal are detected during movement of the device from the first location 810A to the second location 820A (840B). The movement can be a lateral movement created by the user to move the device 802A from the first location 810A to the second location 820A. During the movement, the device 802A receives reflected portions of the signal. The reflected portions of the signal may be received and used for subsequent processing along with an indication of where or when the signal was received. Specifically, the device 802A can use time in conjunction with an assumed movement rate or can use measurements from an internal motion sensor to determine the location of the moving antenna at the time reflected portions are detected.

Also, in some implementations, an internal motion sensor is used to provide dynamic SAR scanning. Specifically, the device 802A uses the start and stop of motion to trigger the start and end of transmission/detection. Therefore, a user with ample room to obtain a large aperture can move the device across a longer distance while a user not able to move the device a full meter can nevertheless use space less than a meter to obtain some imaging improvement.

Thereafter, the reflected portions are processed to generate data associated with frequency and phase shifts (850B). The processing can use techniques similar to those discussed in, for example, element 650B of FIG. 6B. The reflected portions may be received and processed into discrete packets of data associated with frequency and phase shifts. The packets can be associated with a relative position in the movement. Implementations with an internal motion sensor can use motion information to trigger generation of packets at specific physical intervals and record the location of each packet based on sensed motion. For example, in one implementation, a packet is recorded every half wavelength (e.g., at approximately every 2.5 inches) across one foot of lateral device motion based upon internal motion sensing. Implementations not employing motion sensors can be configured to assume movement of a particular speed for the purposes of packet location determination, and the user can be trained to move the device 802A at approximately the assumed speed.

The processed data is analyzed to determine location information of moving objects (860B) and a multidimensional representation indicating the determined location information is displayed (870B), using, for example, the techniques described above with respect to elements 440A and 450A of FIG. 4A.

Figure 9A:
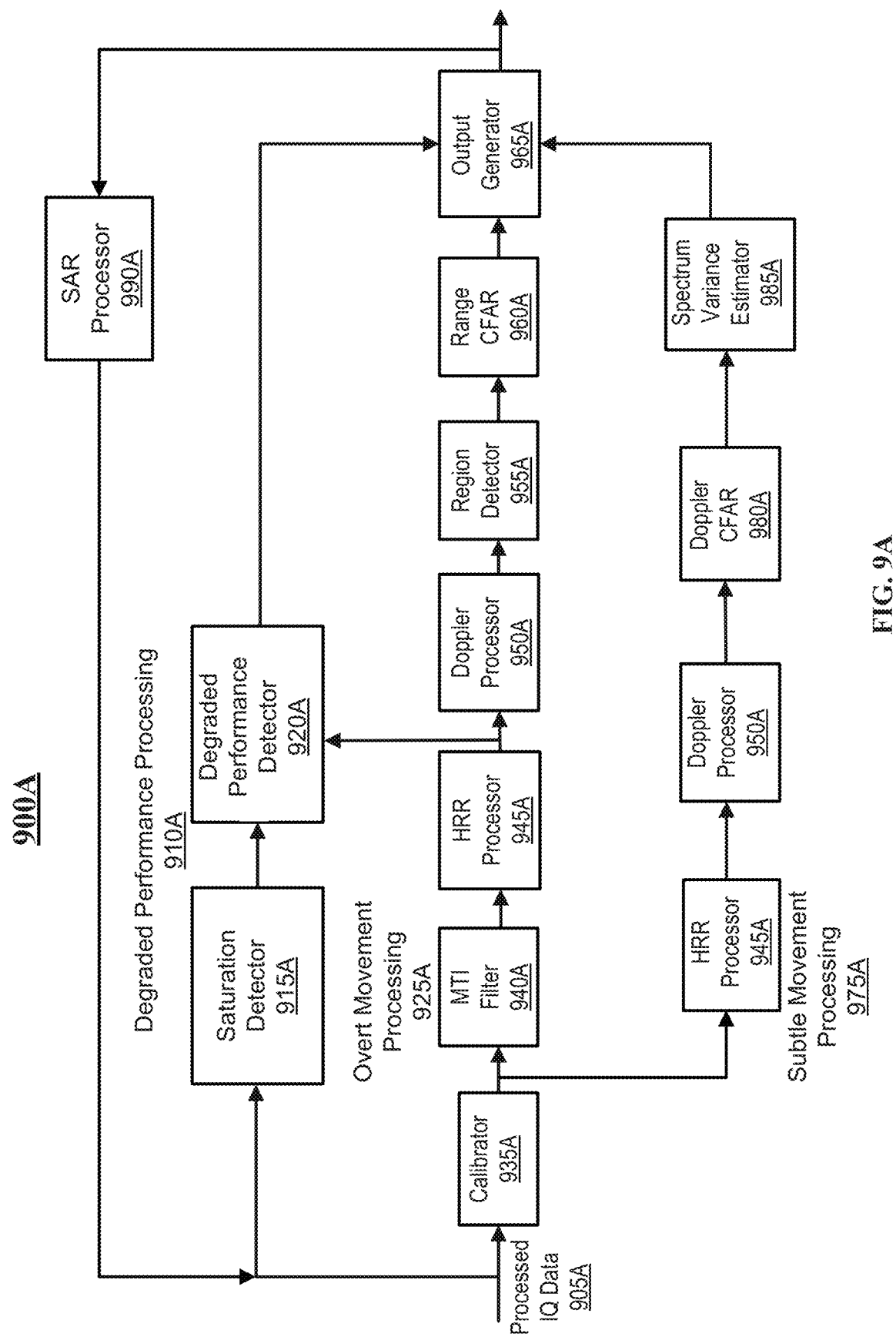
FIG. 9A is a flow chart of an example of a process to analyze data associated with frequency and phase shifts generated by a scanning device.

FIG. 9A is a flow chart of an example of a process 900A to analyze data associated with frequency and phase shifts generated by a scanning device. In various implementations, the process 900A is carried out with the device 150 of FIG. 1B and can be used to perform element 440A of FIG. 4A, element 440B of FIG. 4B, element 560B of FIG. 5B, element 660B of FIG. 6B, or element 860B of FIG. 8B. For brevity, however, the process 900A is described with respect to element 440A of FIG. 4A.

The process 900A receives processed IQ data that may be generated, for example, by element 430A of FIG. 4A and with the circuit 300 of FIG. 3. As shown, the process 900A involves multiple signal processing paths, degraded performance processing (910A), overt movement processing (925A), and subtle movement processing (975A). For simplicity, the signal processing paths are discussed separately, though the different types of processing may be concurrently carried out on the same input signals. Also, paths shown are examples only. Other implementations may conduct processing along a single path configured to process overt or subtle movement. Each processing path may be associated with a specific type of result displayed from the output generator (965A). In various implementations, in both overt movement processing (925A) and subtle movement processing (975A), phase and/or frequency data for each transmitted frequency is first used to develop a current picture of an environment, and is then compared against further phase and frequency data to determine differences.

The process 900A incorporates coherent integration gain and robust detection algorithms, to provide enhanced range of movement detection, higher probability of detection (Pd), and a lower probability of false alarm (Pfa). The process 900A begins when IQ data is input to be processed (905A). The input IQ data can be the output of the mixer 350 of the circuit 300 of FIG. 3. In some implementations, the IQ data is generated using a single transmit antenna and a single receive antenna. In other implementations, the IQ data is generated using multiple transmit antennas for interferometric processing and/or multiple receive antennas for multi-static processing. Accordingly, the process 900A can be used to implement portions of the processes 500B of FIG. 5B and 600B of FIG. 6B.

In various implementations, the user inputs one or more commands associated with one or more of overt movement processing (925A), subtle movement processing (975A), or both. For example, a user wishing to target only subtly moving objects (e.g., the cardio-pulmonary function of an individual sleeping or in a coma), may activate an input option to trigger the device to conduct subtle movement processing (975A) where it otherwise would not occur. In various implementations, a single command may be pressed, which may, depending on the reflected signal, trigger overt moving processing (925A), subtle movement processing (975A), or both.

IQ data is input to a calibrator (935A) and to a saturation detector (915A). The saturation detector (915A) sends data to a degraded performance detector (920A), which monitors for situations including detection of A/D converter saturations or unusually high signal levels that may arise from the transmitted signal reflecting off metal objects buried within or behind walls, detection of significant increases in the noise floor resulting from intentional or unintentional jamming, and detection of significant signal energy across all range cells associated with excessive movement of the antenna. If such situations are detected, the degraded performance detector (920A) can determine that the transmission waveform of subsequent transmission should be altered according to element 410B of FIG. 4B. Also, data from the degraded performance detector (920B) can be sent to the output generator (965A) to trigger a visual indication or an alert to specify the detection of a degraded signal. The alert may signify to the user that processing results may be less reliable. Degraded performance processing (910A) need not interrupt other processing.

In overt movement processing (925A), the IQ data may first be sent through the calibrator (935A). Calibration can be used to minimize the effects of non-ideal transceiver hardware, such as transmit-to-receive signal leakage, unwanted device movement, interference, or other adverse effects upon the IQ data or collection thereof. Target detection performance may be improved as a result of cleaner range and Doppler profiles. Calibration can provide for adjustment of the collection of data, by, for example triggering the determination that the transmission waveform of subsequent transmission should be altered according to element 410B of FIG. 4B. Calibration can also provide for adjustment of collected data, to for example, compensate for direct-current (DC) offset errors, IQ gain and phase imbalance, and gain and phase fluctuation across frequency which may be caused, for example, by transmit-to-receive signal leakage or unwanted device movement. In various implementations, calibration can be conducted at other positions within the process 900A. Hardware support for calibration can include use of an internal motion sensor and signal processor, solid state RF switches in the receive and transmit antenna front end(s) that enable the receiver input to be switched from the antenna to either resistive load or to a reduced power sample of the transmit signal. Calibrated data may be used in overt movement processing (925A) and subtle movement processing (975A).

The overt movement processing (925A) can be optimized for rapid detection of moving personnel. Processing delays associated with filtering and coherent integration can be short, enabling quicker display/alert of indications of detected movement, for example, within less than a second of the event in some implementations. The overt movement processing (925A) can begin with the data output from the calibrator (935A) input to the moving target indication (MTI) filter (940A) to eliminate or flag strong returns from stationary clutter, or returns from objects within a proximity from the device (e.g., objects on the same side of a wall as the device). Flagged returns from the MTI filer (940A) can be used by the output generator (965A) to identify flagged objects accordingly. For example, in one implementation, objects flagged as stationary are presented with a characteristic (e.g., a color or uniquely shaped icon) which differs from objects not flagged as stationary and object flagged as likely repeated mechanical movement are similarly presented with a different characteristic. Each transmit frequency may be processed by a separate filter having a bandpass response that passes signals from separate target velocities. Separate filters may enable detection of short duration movements from the arms and legs of stationary personnel as well as the detection of the main body movement, such as walking and running.

The data output from the MTI filter (940A) is input to the high range resolution (HRR) processor (945A). In one implementation, the HRR process (645A) uses an inverse fast fourier transform (IFFT) to transform the ensemble of returns from the received signal to HRR profiles. In other implementations, other transforms may be used. Depending on the characteristics of the results, the HRR process (945A) results may be input to the degraded performance detector (920) as well as the Doppler processor (950A). The Doppler processor (950A) may provide additional coherent integration gain to further improve the signal-to-noise ratio. A region detector (955A) then selects a Doppler bin with amplitude regions from range resolution cells.

The region amplitudes are passed on to a Range constant false alarm rate processor (CFAR) (960A). The Range CFAR (960A) is a cell-averaging constant false alarm rate (CA-CFAR) detector and operates along the HRR range cells output from the region detector (955A). The range cells are compared to the surrounding cells. A detection may be sent to the output generator (965A) if calculated parameters of the cell under test are greater than a predetermined amount.

Subtle movement processing (975A) is optimized for detection of stationary personnel, such as individuals whose only significant movement is that caused by respiratory and/or cardiac function. Subtle movement processing (915A) includes the calibrator (935A), the HRR processor (945A) and the Doppler processor (950A), but with longer integration times. A longer integration time provides fractional-hertz Doppler resolution to resolve the carrier modulation sidebands associated with breathing. The HRR processor (945A) can be used directly on the calibrated radar data, bypassing the MTI filters that may otherwise remove the respiration sidebands.

In subtle movement processing (975A), the output of the Doppler processor (950A) is sent to a Doppler CFAR processor (980A). The Doppler CFAR processor (980A) may be applied across the Doppler processor (950A) output to identify portions of the spectrum that are significantly above the noise floor. Values selected by the Doppler CFAR processor (980A) may be input to the spectrum variance estimator (985A) where the power-weighted second-moment of the spectrum is determined. If the calculated spectrum variance is within limits typical of respiration, the output generator (965A) may declare detection of subtle movement.

The output generator (965A) receives the results of the analysis of the IQ data from one or more of the overt movement processing (925A), subtle movement processing (975A), and the degraded performance processing (910A). For example, IQ data may be analyzed according to each processing path, generating multiple sets of results. The output generator (965A) may give priority, such that, if the same object is identified as overt and subtle movement, the output generator (965A) considers the object overtly moving. The output generator (965A) may perform additional clean-up of the detection map, including, for example, removal of detections beyond a range, and encoding the detection as either near or far. In some implementations, the output generator (965A) constructs a graphic user interface (GUI) to render the results for display to the user. The GUI can show a two or three dimensional representation of the detected objects as described with respect to the display screen 119 of FIG. 1 and/or element 450A of FIG. 4A.

The output generator (965A) can output results of signal processing to a SAR processor (990A). The SAR processor (990A) is used as a feedback loop in implementing portions of the process 800B of FIG. 8B. Specifically, the SAR processor (990A) receives the output of the output generator (965A) and outputs SAR processing data as further IQ data for subsequent processing using the process 900A to provide a radar image with a synthetic aperture.

The above process 900A is an example and other processing techniques could be used along with or separate from elements of the process 900A. For example, alternate techniques discussed in FIG. 4A, such as Maximum Likelihood Method, Maximum Entropy Method, or Music Method, may offer greater resolution for micro-Doppler detection using shorter observation times. Also, methods such as Singular Spectrum Analysis (SSA) and Higher-order statistics based techniques (e.g., Bispectral Analysis) can also be used to better resolve very closely spaced independent target returns than is possible with direct Fourier methods. Further, other methods that focus on reducing the computational cost relative to the FFT methods can be used to create the frequency (Doppler) spectrum, such as, Discrete Cosine Transform, Fast Hartley Transform, and Walsh-Hadamard Transform.

Figure 9B:
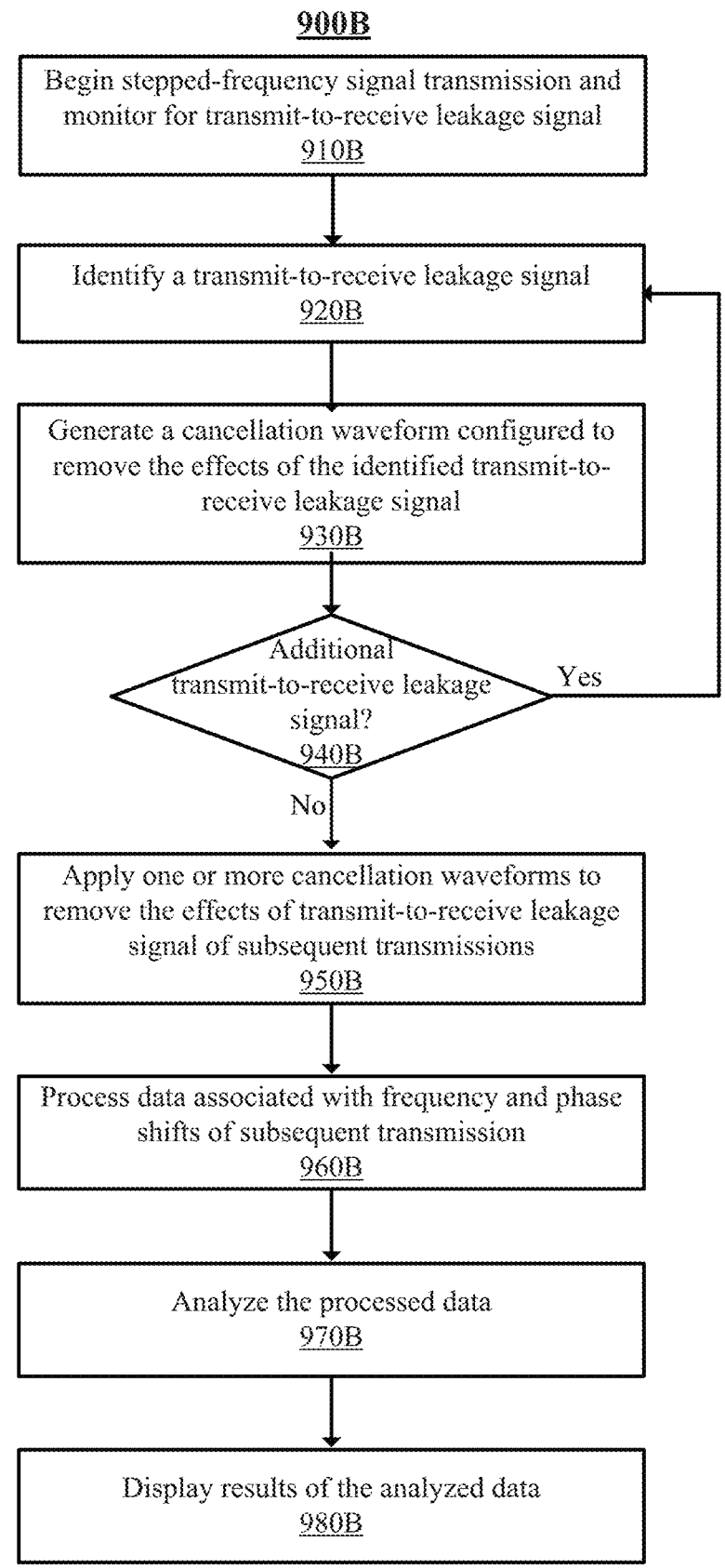
FIG. 9B is a flow chart of an example of a process to cancel transmit-to-receive leakage signal with a scanning device.

FIG. 9B is a flow chart of an example of a process 900B to cancel transmit-to-receive leakage signal with a scanning device. This processing approach can be used to adaptively locate and remove various components of the transmit-to-receive leakage signal, which generally are orders of magnitude higher in amplitude then the highest reflected portions of signal intended to be detected. This cancellation can reduce the dynamic range of the signal data and also can suppress the range sidelobes of the leakage signal which otherwise may obscure lower-amplitude stationary targets. A reduction of dynamic range can allow for increased magnification of data for better separation between noise and targets without generating significant artifacts that would otherwise be generated by the increased magnification. The process 900B may be implemented as a part of the process 900A of FIG. 9A and/or the process 400A of FIG. 4A. For example, the process 900B can be used as part of the calibrator (935A) in FIG. 9A. Also, the process 900B may be performed using the device 150 of FIG. 1B or other devices.

The device begins stepped-frequency signal transmission and monitors for transmit-to-receive leakage signal (910B). The monitoring may begin concurrently with the transmission or just before or after the transmission. In one implementation, the monitoring begins prior to transmission. Thereafter, the change in received signals is used to determine the presence of transmit-to-receive leakage signal according to the techniques described below.

From the monitoring, a transmit-to-receive leakage signal is identified (920B). The identification can be based upon various characteristics in signal received by one or more receive antennas that are indicative of transmit-to-receive leakage. For example, due to the proximity of the receive antennas to the transmit antennas, transmit-to-receive leakage signal can be the strongest received signal within a short delay from transmission. Specifically, transmit-to-receive leakage can occur at effectively zero distance from the device. Therefore, signal reflected from locations within a short distance (e.g., less than one foot) can be identified as transmit-to-receive leakage (920B).

Amplitude can also be used to identify transmit-to-receive leakage signal. In particular, transmit-to-receive leakage signal can dominate the dynamic range with an atypically high amplitude (e.g., several orders of magnitude greater than the highest amplitude reflected signal). This effect is a result of the differing paths of signals. Specifically, because the transmit-to-receive leakage signal often is from a direct path and signals reflected from moving objects often move through an attenuating medium (e.g., a wall) there can be a significant difference in amplitude between transmit-to-receive leakage signal and signal reflected from moving objects.

Another characteristic that can be used to identify transmit-to-receive leakage signal is phase change. Generally, transmit-to-receive leakage signal exhibits no Doppler shift. The lack of a Doppler shift is because transmit-to-receive leakage signal is reflected from the device and received at the device. Therefore, the transmission location and receive location have no difference in net movement so long as they are mechanically connected.

A cancellation waveform configured to remove the effects of the identified transmit-to-receive leakage signal is generated (930B). The cancellation waveform is configured to offset the effect, thereby effectively removing the identified transmit-to-receive leakage signal. In particular, a signal profile which is the inverse of the profile of the identified transmit-to-receive leakage signal can be created. This cancellation waveform can effectively zero out the transmit-to-receive leakage signal.

These techniques can be applied iteratively to maximize the reduction of interference caused by transmit-to-receive leakage. For example, after generating the cancellation waveform, the device determines whether there is additional transmit-to-receive leakage signal (940B). If there is additional transmit-to-receive leakage, the process 900B identifies and generates a cancellation waveform to remove effects of the additional transmit-to-receive leakage signal (920B and 930B). The iteration can be used to fine-tune the removal of a particular signal leakage path or to remove signal from multiple leakage paths. For example, signal from a separate leakage path may travel further before reaching the receive antenna and may not have the same amplitude or delay. Multiple cancellation waveforms can be generated, or a single cancellation waveform can be adjusted with each iteration.

The one or more cancellation waveforms are applied to remove the effects of transmit-to-receive leakage signal of subsequent transmissions (950B). For example, the cancellation waveform can reflect the signal profile of the identified transmit-to-receive leakage signal and may be stored in memory and used during calibration processing of later data to effectively remove subsequently occurring transmit-to-receive leakage signal. In various implementations, the one or more cancellation waveforms are applied to all subsequent transmission while the device is powered on. In other implementations, the process 900B is repeated at fixed intervals of time or upon detection of poor data, such as, for example, by the saturation detector (915A) or the degraded performance detector (920A) of FIG. 9A. Thereafter, data associated with frequency and phase shifts of the subsequent transmission is processed, the processed data is analyzed, and results of analyzed data are displayed (960B-980B) using, for example, the techniques described above with respect to elements 430A-450A of FIG. 4A.

Figure 9C:
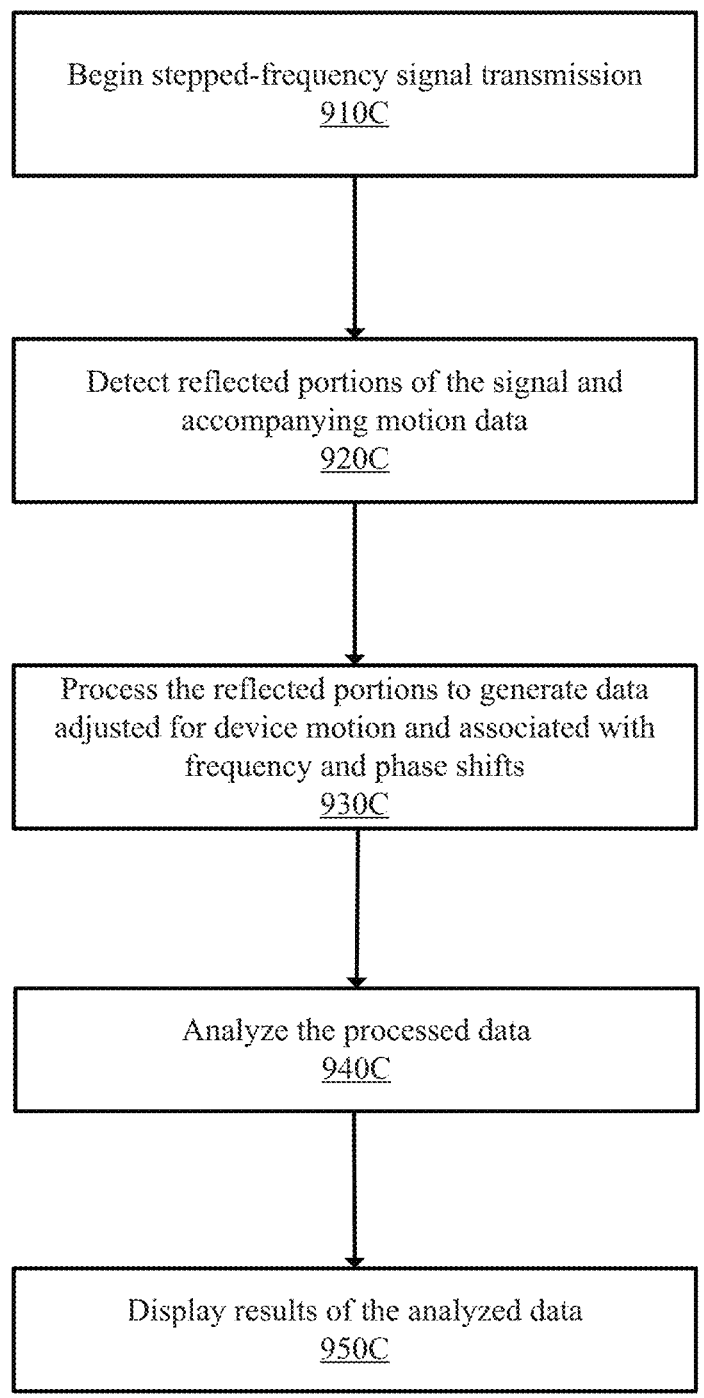
FIG. 9C is a flow chart of an example of a process to compensate for motion occurring during operation of a scanning device.

FIG. 9C is a flow chart of an example of a process 900C to compensate for motion occurring during operation of a scanning device. This processing approach can be used to enable the operation of the device while it is being moved intentionally or unintentionally. Specifically, input from a motion sensor is used to facilitate the adjustment of data to offset the effect of device movement. The process 900C may be implemented as a part of the process 900A of FIG. 9A and/or the process 400A of FIG. 4A. For example, the process 900C can be used as part of the calibrator (935A) in FIG. 9A. Also, the process 900C may be performed using the device 150 of FIG. 1B or other devices.

The device begins stepped-frequency signal transmission (910C) and reflected portions of the signal and accompanying motion data are detected (920C). Device movement can contribute to or otherwise alter the phase change of the reflected portions created by the movement of the reflecting object. Specifically, if the device is moving towards a stationary object (e.g., due to unintentional device movement), the reflected portion of the signal can exhibit a Doppler shift similar to what would be exhibited if, instead, the object had been moving towards the stationary device. The movement information enables adjustment for phase changes resulting from this device movement. In various implementations, as reflected portions of the signal are received and sent for processing, the device receives movement information from an internal inertial sensor. In other implementations, the device uses a GPS sensor to derive device movement alone or in conjunction with an internal inertial sensor.

The reflected portions are processed with the movement information from the internal motion sensor to generate data adjusted for device motion and associated with frequency and phase shifts (930C). In one example, processing includes generating a packet of data for received reflections of each frequency step of a sequence of frequency steps in the transmitted stepped-frequency signal and associating motion information with each packet. In particular, if an internal inertia sensor is used, the output of the sensor can be sampled once for each packet to determine acceleration of each of three axes. This acceleration information can be accumulative and can be integrated across multiple packets for determination of velocity and direction of movement. From the determination of velocity and direction of movement, the generated data can be adjusted to reverse the Doppler effect resulting from the motion of the device with respect to the detected reflections. Also, if a GPS sensor is used, the position as determined by the sensor can be sampled once for each packet. This position information can be used to determine velocity and direction of movement by comparing previous position information.

The processed data is analyzed (940C). The motion determined by the motion sensor can be used during analysis to compensate or offset the perceived Doppler shift (and thus the perceived motion) of an object detected by the device. Thereafter, results of analyzed data are displayed (950C) using, for example, the techniques described above with respect to element 450A of FIG. 4A.

Alternatively or in conjunction, adaptive processing of the radar return can be used by the motion sensor 190 and/or the signal processor 175 to estimate the sensor motion. The latter approach can be employed to utilize the phase change of stationary scattering present in the scene to estimate the sensor motion.

Figure 9D:
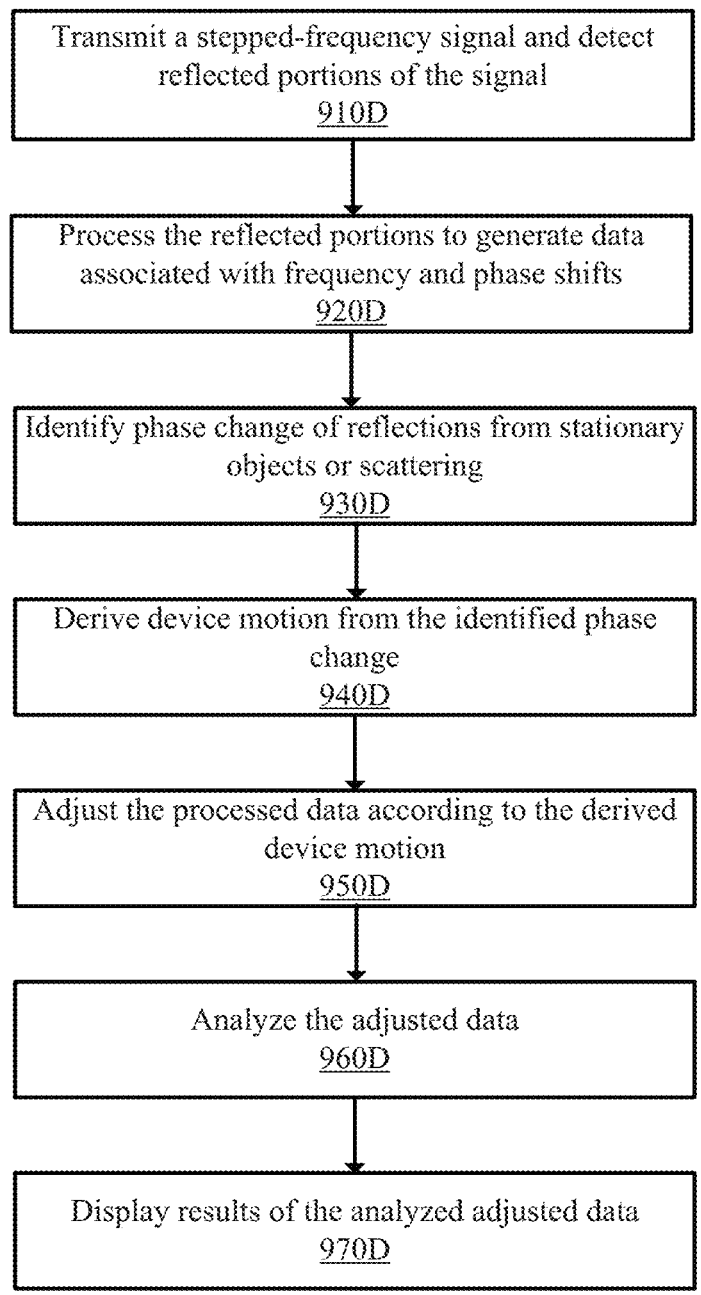
FIG. 9D is a flow chart of an example of a process to compensate for motion occurring during operation of a scanning device using adaptive processing.

FIG. 9D is a flow chart of an example of a process 900D to compensate for motion occurring during operation of a scanning device using adaptive processing. This processing approach can be used to enable the operation of the device while it is being moved intentionally or unintentionally without the use of a motion sensor. Specifically, the device analyzes data for the appearance of movement of stationary objects and uses the apparent movement to derive and compensate for the actual movement of the device. The process 900D may be implemented as a part of the process 900A of FIG. 9A and/or the process 400A of FIG. 4A. For example, the process 900D can be used as part of the calibrator (935A) in FIG. 9A. Also, the process 900D may be performed using the device 150 of FIG. 1B or other devices. Finally, the process 900D can be used in conjunction with an internal motion sensor as described in the process 900C of FIG. 9C to further minimize the effects of device motion.

The device transmits a stepped-frequency signal and detects reflected portions of the signal (910D). The reflected portions are processed to generate data associated with frequency and phase shifts (920D). As discussed above, the phase of reflected portions of the signal may exhibit a Doppler shift based on the relative movement of the object towards or away from the device. If the device is moving towards a stationary object, the reflected portion of the signal can exhibit a Doppler shift similar to what would be exhibited if, instead, the object had been moving towards the stationary device.

The device identifies a phase change of reflections from stationary objects or scattering (930D). In one implementation, the identification of the phase change can be based upon perceiving newly occurring movement (or a phase change indicative thereof) from a reflection from a previously stationary object. For example, the device can identify non-moving objects or objects of repeated mechanical movement and store the identification in memory. Thereafter, the device can compare the stored identification of the prior identified stationary object with the object's apparent movement during a subsequent transmission. From this comparison, the device can identify a phase change of reflections from stationary objects or scattering (930D).

Also, in various implementations, the device can identify the phase change by analyzing a commonality in the data of reflected portions of the signal last transmitted. Specifically, the device can look for consistent movement or a pattern of movement of scattering or objects which reflect the transmission. For example, if the majority of reflected portions of the signal indicate movement (i.e., exhibit a phase change), the device can determine that the phase change of the reflected portions of the signal is a phase change of stationary objects. Finally, some implementations use a combination of the two approaches described above. For example, the device can first determine if there is common movement for a current set of objects, and, if so, compare the prior and current movement of specific objects to identify the phase change of reflections from stationary objects (930D).

Next, the device derives device motion from the identified phase change (940D). Specifically, the device determines what motion of the device would produce the identified phase change of the stationary objects. For example, in some implementations which generate a packet of data for received reflections of each frequency step, an adjustment is associated with each packet indicating the derived motion. The derived motion can be both a velocity and direction. To derive both velocity and direction, the device may process the perceived motion towards and away from multiple objects of different physical locations. This may include interferometric processing techniques to determine movement of the device in three spatial dimensions.

Thereafter, the processed data is adjusted according to the derived device motion (950D). The adjustment can include altering frequency data to counteract the effect of the motion derived to have occurred for the device. Finally, the adjusted data is analyzed (960D) and results of the analyzed adjusted data are displayed (970D) using, for example, the techniques described above with respect to element 450A of FIG. 4A. The adjustment may be conducted later in processing only for specific objects of significance or may be conducted earlier in processing on the data used to determine the existence of moving objects.

Also, a Kalman-based smoothing filter can be used in processing acceleration data to make the data more useful for motion compensation as discussed above. In addition, correcting for quadratic phase errors introduced by sensor motion and prevent defocused imagery.

FIGS. 10A-12B and the discussion below are directed to a set of specific implementations of a scanning device referred to as a wall penetrating personnel detection sensors (WPPDS) and are provided as one possible set of implementations of a sensor for detecting moving entities as described above.

In one implementation, a WPPDS employs a through-wall-detection radar device to detect personnel. The device includes a light-weight (e.g., a few pounds or less), portable, dedicated through wall device for detection through walls. Particular implementations of the WPPDS are configured to detect both moving and stationary (breathing) personnel and can be useful in a variety of situations. For example, an individual buried under structural debris can be located with relative spatial position or distance and angle, which may be critical to a life saving operation. Also, in the case of hostage situations, the WPPDS may be used to determine the position of individuals from certain locations, which may dictate the rescue operation methodology.

A particular implementation employs an AN/PSS-14 mine detection radar device in a miniaturized WPPDS unit that fits into a semi-automatic weapon (SAW) ammo pouch, and may operate for 180 twenty-second cycles and otherwise remain on standby during a 16 hour period running on eight disposable AA batteries. Other implementations use different batteries. For example, one implementation uses six CR123 type camera batteries rather than eight AA batteries. The WPPDS may detect moving targets through non-metallic materials (e.g., cement blocks, reinforced concrete, adobe, wallboard and plywood).

The WPPDS may employ coherent, stepped-frequency continuous wave (SFCW) radar that provides excellent through wall detection performance. Detection is realized through range-Doppler processing and filtering to isolate human motion.

In various implementations, data from a SFCW radar may be processed as an ensemble of fixed-frequency CW radars, allowing for the optimum detection of the Doppler shift of a moving target over time via spectral analysis. The stepped-frequency radar data may also be processed to compress the bandwidth and obtain a high range resolution profile of the target. For example, the data may be processed to remove stationary or fixed time delay data, leaving the moving target data to be evaluated in both the range and Doppler (velocity) dimensions. A coherent frequency-stepped radar may have an advantageous signal gain when computing the range and Doppler values of moving targets. Pulse type or frequency chirp type radars may not be able to achieve the same integrated signal gain as stepped-frequency radar, due to a non-coherent nature.

Another property of a SFCW radar is the ability to operate in environments that exhibit high radio frequency interference (RFI). Short pulse and frequency chirp radar devices maintain a wider instantaneous receive bandwidth, enabling more RFI into a processing electronics chain and reducing the signal to noise/interference level, which may reduce sensitivity and may degrade detection performance.

In one implementation, the SFCW radar device enables detection of subtle and overt movement through walls. The SFCW radar device can use processes that operate on hardware that is generally commercially available. The architecture of the SFCW radar device generally is less susceptible to jamming (intentional or unintentional) than other radar architectures. Additionally, the reduced bandwidth enables implementation of more highly integrated RF technology, resulting in a reduction in device size, weight and DC power.

With respect to the antenna, the antenna elements can be miniaturized (scaled) versions of the AN/PSS-14 cavity-backed spiral design. The miniaturized tactical antenna supports the selected frequency range (the upper end of the AN/PSS-14 operating range, which improves performance against rebar) and packaging constraints.

The RF Electronics can generate the frequency-stepped radar waveform, amplify the signal for transmission, receive energy reflected off targets using a low-noise front end, and generate coherent (in-phase and quadrature, or I & Q) signals used in the detection process. The transceiver electronics feature a reduced bandwidth, which enables a single voltage controlled oscillator (VCO) implementation compared to a more complex two VCO design. Further device miniaturization can be achieved through implementation of a direct down-conversion (homodyne) receiver.

A brassboard homodyne receiver has shown that significantly increased detection range in through wall applications is achievable compared to the phase-noise limited AN/PSS-14 super-heterodyne architecture. The reduced bandwidth of the single-board TX/RX can provide sufficient range resolution capability to support detection and can avoid the National Telecommunications and Information Administration (NTIA)/Federal Communication Commission (FCC) restrictions associated with ultra wideband (UWB) radars. The transmit power, coupled with the gain of the antenna, can result in a low radiated power (approximately the same as cell phones), making the device safe for human exposure. Some implementations use a super-heterodyne receiver with common transmit and receive local oscillators and VCOs. The super-heterodyne implementations can reduce phase noise as compared to the homodyne implementations.

The digital signal processor (DSP) hosts the motion detection algorithms. The WPPDS signal processing algorithm incorporates coherent integration gain and robust detection algorithms, achieving superior performance with greater detection range, higher probability of detection (Pd), and lower probability of false alarm (Pfa). Particular implementations may be used to scan through damp concrete blocks and rebar, so as to permit ready detection of moving personnel.

The device also can include power supply circuitry needed to convert 6V battery power for the electronics. Bottoms-up power consumption calculations show that a set of disposable AA alkaline batteries may provide 180 twenty-second operating cycles. The low power, compact, high-performance direct-conversion radar transceiver can be realized through use of RF Monolithic Microwave Integrated Circuits (MMICs) and the RF integrated circuits available. An ultra-low phase noise Temperature Compensated Crystal Oscillator (TCXO) housed in a miniature surface-mountable package can be used as a reference to a synthesizer chip with a VCO integrated on the chip. Loop response time and phase noise can be achieved and optimized via an external loop filter, creating a stable, fast-locking signal source with low divider noise.

The signal source is then amplified by high-efficiency monolithic amplifiers with integrated active biasing circuitry and on-wafer DC blocking capacitors. This approach minimizes part count and current consumption. This low-noise VCO is also used in the demodulation of the received radar return, which provides considerable phase noise cancellation due the oscillator coherency. With much lower phase noise riding on returned signals (including near-wall reflections), the receiver sensitivity can be predominantly limited by thermal noise, enabling increased detection range compared to the AN/PSS-14 radar receiver. This also enables an increase in transmit power for increased range.

The direct-conversion quadrature demodulator can include polyphase filters and ensure quadrature accuracy across the entire bandwidth. Pre-amplification of the LO and integrated variable gain control of the demodulated signal can allow for efficient use of circuit board real estate and provide the device with signal conditioning flexibility to maximize signal dynamic range at the analog-to-digital (ADC) inputs.

The digital signal processor (DSP) is used to process IQ data from the radar transceiver to determine if objects are in motion and, if so, to alert the user. The DSP can have many features for power management, including dynamic frequency control, dynamic core voltage control, and the capability of turning off unused sections of the IC. These power management features make this DSP an excellent choice for battery operated WPPDSs. Operating the WPPDS at half the frequency and a core voltage of 1V allows lowering of the power and can enable a programmable performance upgrade for the future. A clock frequency is provided by the RF transceiver board via a Low-voltage differential signaling (LVDS) differential clock driver. This helps protect signal integrity and reduces electromagnetic interference (EMI) caused by the fast clock edge rates.

In various implementations of WPPDS, the design features 8M bytes of synchronous dynamic random access memory (SDRAM) for fast program access and enough storage for 60 seconds of captured data per operating cycle. In addition, 4M bytes of flash memory are used for booting up the DSP and for non-volatile storage. A universal serial bus (USB) interface is used as a test port, and will only be powered up for debugging and data collection. An ADC includes an 18 bit ADC that allows a 15 dB increase in signal-to-noise ratio (SNR) to take advantage of the increased dynamic range and sensitivity. Differential inputs improve common-mode noise cancellation, allowing for a more sensitive detector. The op-amps are selected for low power, low noise performance as amplifiers and active filters. A 16 bit DAC is used to cancel the DC offset from the incoming IQ signals from the RF Electronics. Serial communication protocol (SPI) is used to communicate with the ADC, digital-to-analog converter (DAC), and RF phase-locked loop (PLL), which helps reduce I/O requirements and EMI.

Figure 10A:
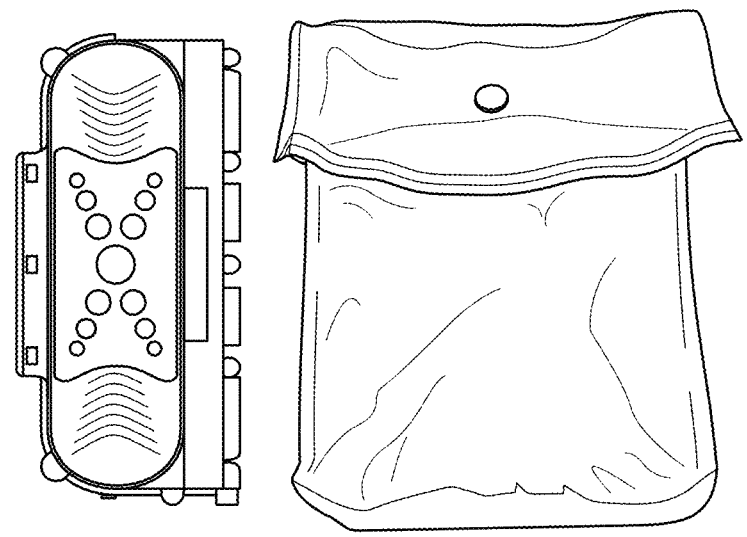
FIG. 10A is a picture of a handheld stepped-frequency scanning device relative to a semi-automatic weapon ammo pouch.
Figure 10B:
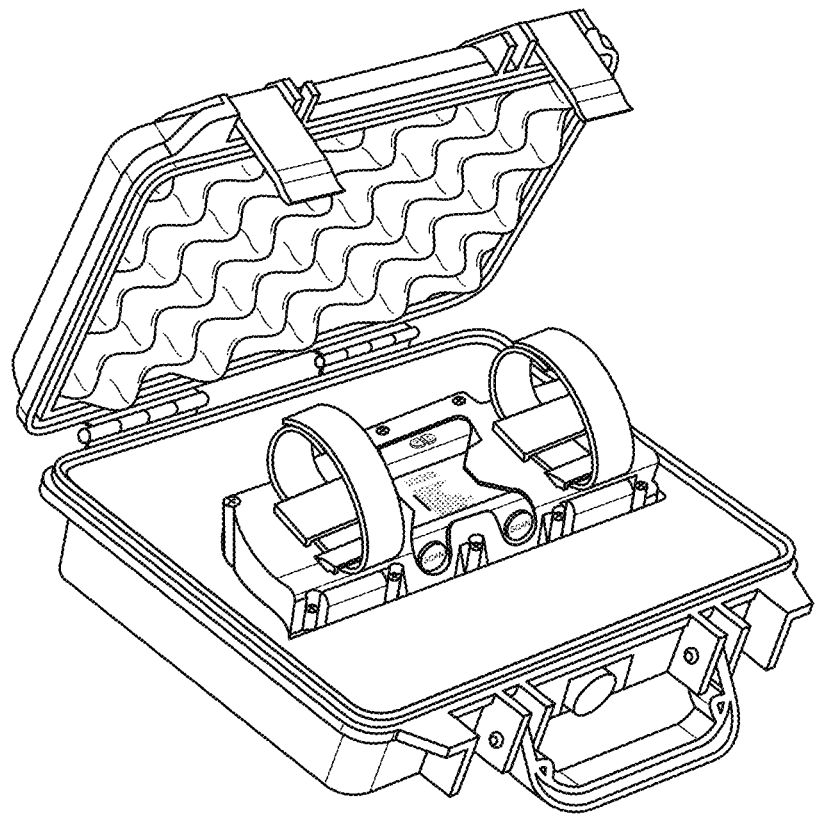
FIG. 10B is a picture of a handheld stepped-frequency scanning device in a case.

Referring to FIGS. 10A and 10B, the compact WPPDS package enables single-handed operation while providing robust protection for the intended application. The unit may also be attached to the forearm or upper arm via straps. FIG. 10A is a picture of a handheld stepped-frequency scanning device relative to a SAW ammo pouch. The housing layout is able to be configured with three circuit card assemblies (CCA), which enables an optional integrated battery recharging circuit, such as a generally commercially available integrated battery recharging circuit. The miniature cavity-backed spiral antennas each contain a planar feed assembly that connects directly to the RF CCA. The Digital CCA contains the DSP as well as the power supply (PS) circuitry.

FIG. 10B is a picture of a handheld stepped-frequency scanning device in a case. The WPPDS unit and accessories can fit into a standard Pelican™ case for storage and transportation. The packaging provides protection against transportation shock and vibration, environmental protection, and facilitates safe storage and ease of handling while in daily use by soldiers or rescuers. The case includes compartments for storing arm straps, extra batteries, and an optional vehicle-compatible battery recharger.

To deploy, the operator may hold the device by the straps or by the sides of the unit, affix the unit to either arm via the straps (forearm or upper arm), or mount the device to a pole or tripod (pole/tripod not provided with unit). A standard video camera mount may be connected to the bottom of the unit to facilitate mounting to a tripod or pole. The housing design also features raised stiffener ridges on the front that may facilitate temporary wall mounting using putty. Other implementations may not include the straps, enabling users to operate the device without connecting it to their person.

The housing is made of impact-resistant ABS plastic to help provide protection if the case is dropped or collides with hard objects that may occur during training exercises or during operation, such as on a battlefield or in a rescue operation. The external design of the housing incorporates human factor features to simplify operation in difficult environments. A rubber shield protects the front of the unit. Rubber grip pads are also provided in four areas to facilitate slip-free handheld operation. Multiple SCAN switches support a variety of operational situations.

Figure 11A:
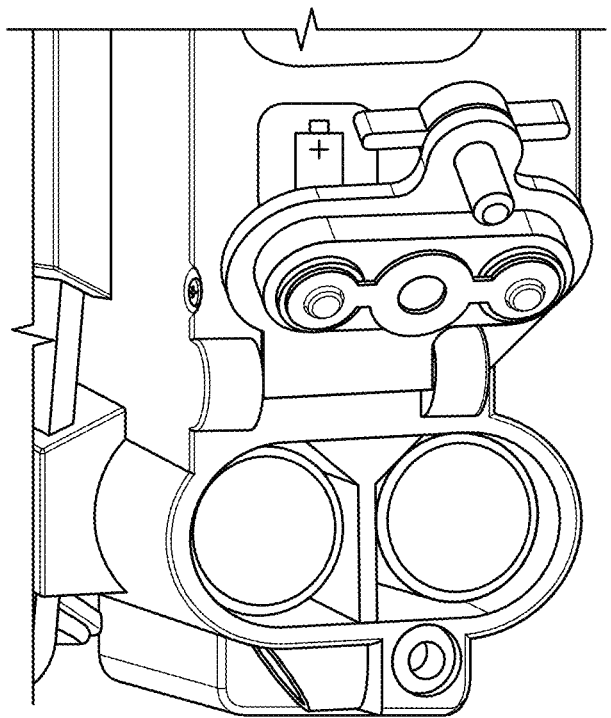
FIG. 11A is a picture illustrating battery access in a handheld stepped-frequency scanning device.
Figure 11B:
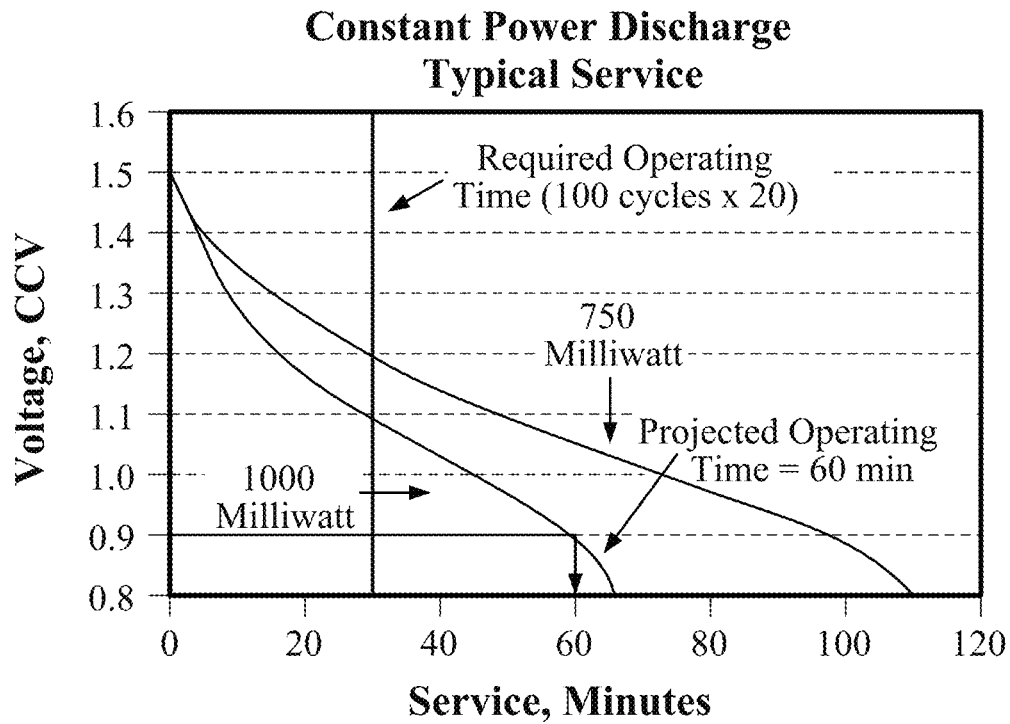
FIG. 11B is a graph illustrating power discharge characteristics in a handheld stepped-frequency scanning device.

FIG. 11A is a picture illustrating battery access in a handheld stepped-frequency scanning device. The battery holder assembly features all eight batteries in the same orientation for easy installation under low light/time critical conditions. The total power draw from batteries can be 2.2 W. In one implementation, four batteries are connected in series, and 2 sets of 4 batteries in parallel. This provides 6V and divides the power by the 2 battery sets. FIG. 11B is a graph illustrating power discharge characteristics in a handheld stepped-frequency scanning device. During run time the individual battery voltage is allowed to decay from 1.4V to 0.9V, providing approximately 1 hour of operation time.

Figure 12A:
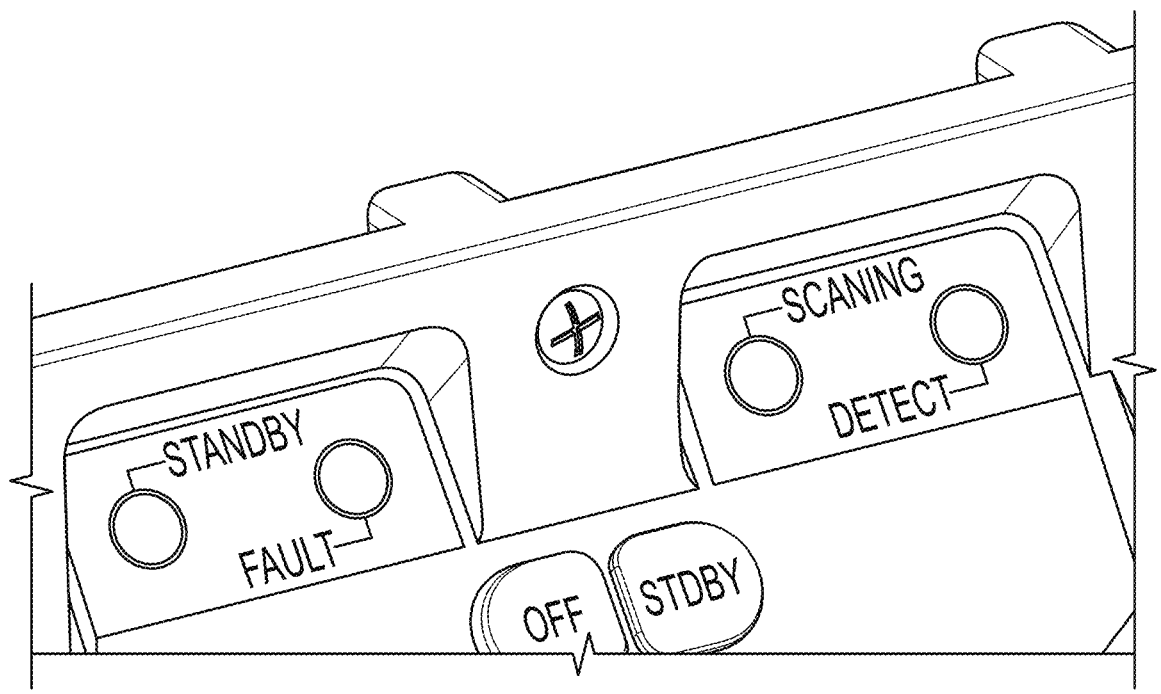
FIG. 12A is a picture illustrating recessed light emitting diodes in a handheld stepped-frequency scanning device.
Figure 12B:
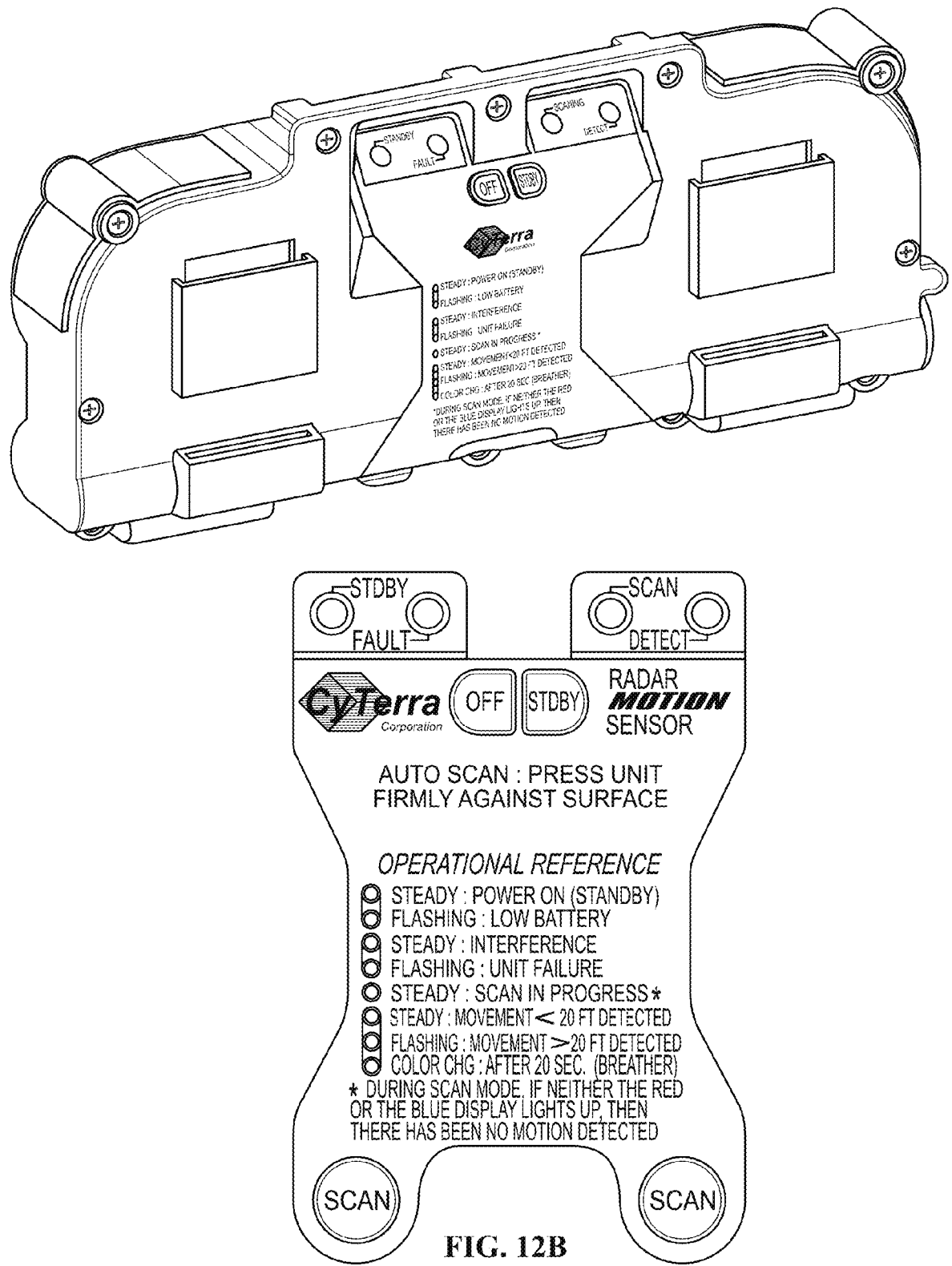
FIG. 12B is a picture illustrating operational controls of a handheld stepped-frequency scanning device.

FIG. 12A is a picture illustrating recessed light emitting diodes in a handheld stepped-frequency scanning device. The device can include light emitting diodes (LEDs) recessed to provide shadowing to enhance daytime vision with or without a display screen (not shown). FIG. 12B is a picture illustrating operational controls of a handheld stepped-frequency scanning device. Power of the device can be affected through use of the OFF and STDBY controls. In Standby mode the circuitry is placed in a power-save mode, and activation of any one of three SCAN pressure switches (one front, two bottom) initiates immediate sensor operation. The device returns to standby mode when the SCAN button is released. Other implementations may include other interface arrangements. For example, a combination of two SCAN switches could be simultaneously pressed (but not held) to enable timed operation, such as when the unit is temporarily adhered to or leaned against a wall, or mounted to a tripod, for hands-off operation.

In one implementation simplifying design, four color LEDs are used to provide indications to the operator without a display screen. The yellow STANDBY LED indicates power status: steady illumination indicates power is on; flashing LED indicates low battery power. The red FAULT LED indicates one of several conditions: steady illumination indicates that the device is unable to make an accurate measurement due to metal blockage, electromagnetic interference (e.g., jamming), or excessive motion of the sensor; flashing illumination indicates a built-in-test (BIT) failure. The green SCANNING LED remains illuminated while the unit is operating to detect motion. The blue DETECT LED indicates that motion has been detected. Steady illumination indicates personnel motion detection at a closer distance. A flashing DETECT LED indicates personnel motion detection at a farther distance. A change in color for the blue DETECT (to Magenta) indicates that subtle movement has been detected.

The device may be powered on and placed in standby mode by momentarily pressing the STDBY switch. The device may be powered off by simultaneously pressing the STDBY and OFF switches. This may prevent accidental power-down during normal operation should the OFF switch get accidentally bumped. In STDBY mode, circuitry is activated in power-save mode, and the device may be immediately operated by pressing one of the SCAN switches. The front SCAN switch may be activated by pressing and holding the device against the wall to be penetrated. One of two bottom SCAN switches may be activated by squeezing with the thumb (normal device orientation) or index finger (inverted orientation), or by pressing the device against the knee or thigh when in a kneeling position.

When any SCAN switch is depressed, the green SCAN LED may illuminate, and may remain illuminated as long as the SCAN switch is depressed. This may alert the operator that the device is operational (i.e., that the SCAN switch is properly depressed). A blue DETECT LED may be used to alert the operator of detected personnel. The device may also be programmed to detect subtle movement. This mode may be initiated by pressing any SCAN switch twice in rapid succession. The green SCAN LED may pulsate slowly when this mode is active. The blue DETECT LED may illuminate when slow movement (respiration) is detected. Some implementations use alternative manners of communicating information to users. For example, one implementations uses a light emitting diode screen to render a two digit number to express a distance of detected moving objects. Other implementations use more sophisticated screens (e.g., more advanced light emitting diodes, organic light emitting diodes, etc.) to render three dimensional representations and more complex information.

Some implementations not employing interferometric processing can have conical radiation patterns so the device may be arbitrarily oriented (within the plane of the wall); i.e., when held against the wall, the unit may be oriented horizontally, vertically, or in any other position without impacting operational performance. The device may also be held off the wall (standoff), provided it is held still during SCAN operation.

Figure 13A:
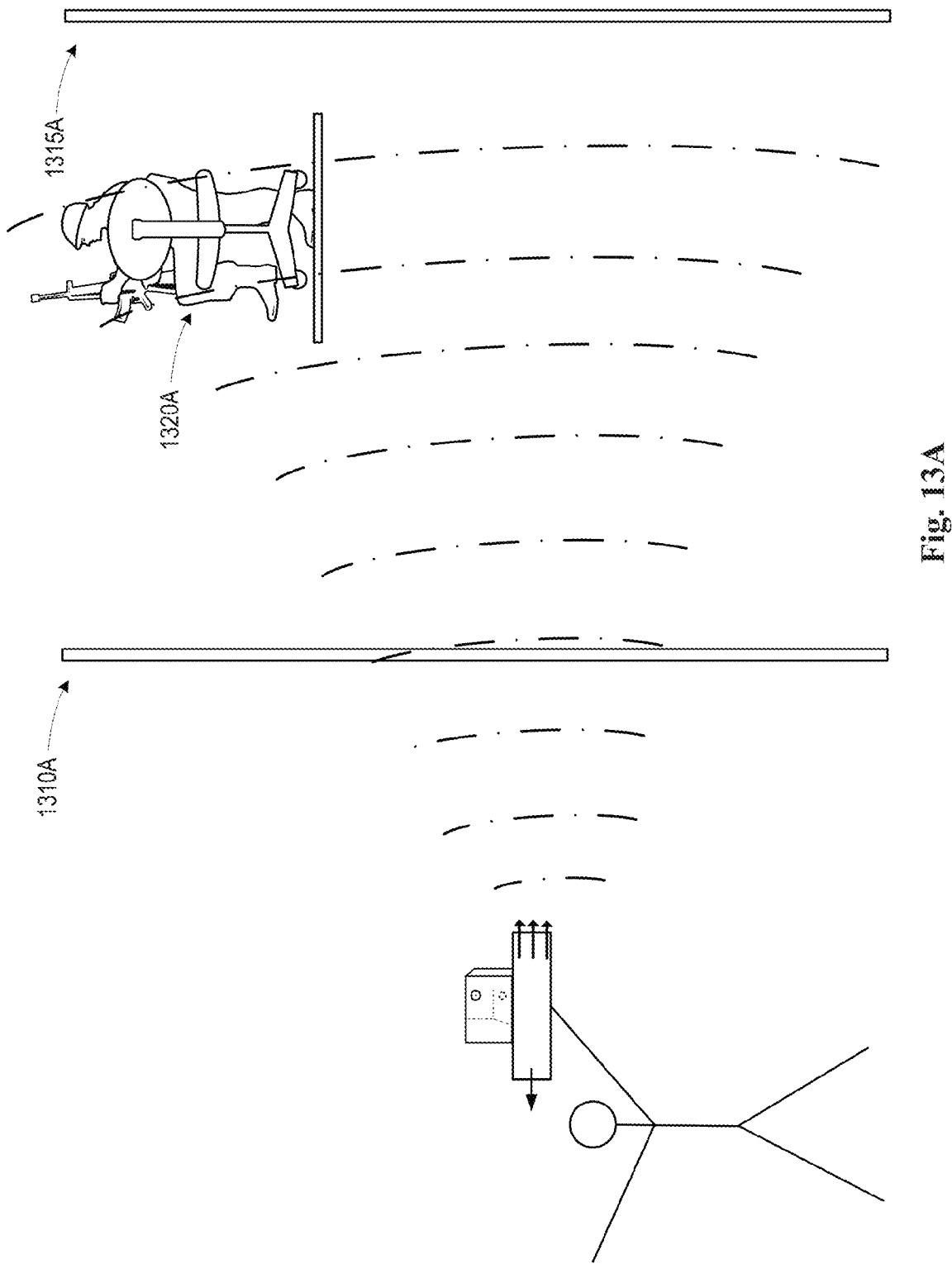
FIGS. 13A-13C are example diagrams illustrating use of a scanning device in distinguishing between walls and moving objects.
Figure 13B:
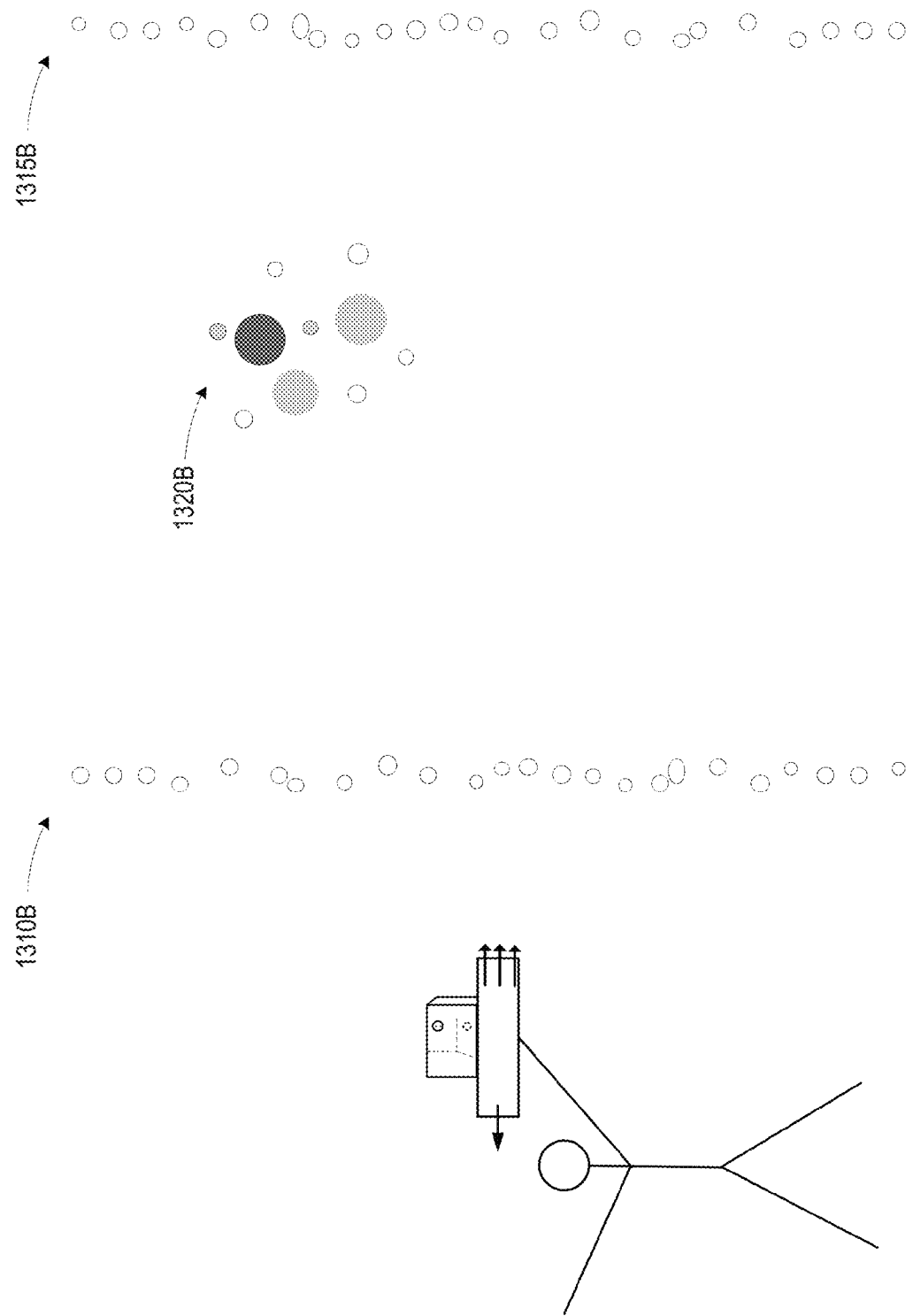
Figure 13C:
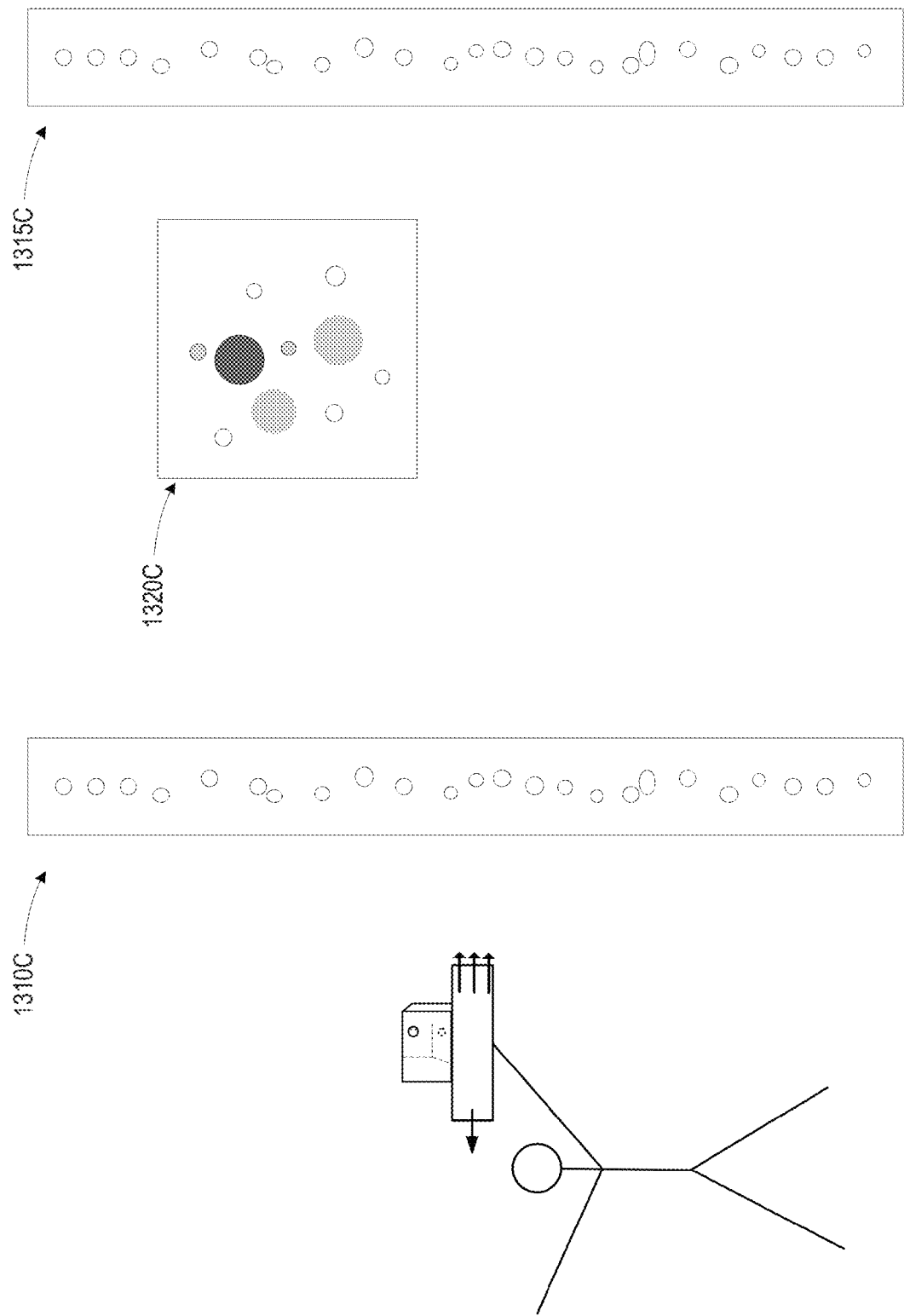

FIGS. 13A-13C are diagrams illustrating example uses of a scanning device in distinguishing between walls and moving objects. In particular, it can be valuable for a scanning device to be able to determine which reflections of a transmitted signal emanate from a wall (or other inanimate object) and which reflections emanate from an individual. Based on this determination, a scanning device can provide a display indicating the geographic layout of entities with respect to the contours of a room. Also, based on this determination, a scanning device can anticipate and correct for further reflections based on detected walls, as discussed in more detail below.

As shown in FIG. 13A, a scanning device is used to scan a room in front of the device which includes an object (or objects) (here, object 1320A includes a chair and a person holding a rifle) between two walls 1310A and 1315A. For convenience, the three dimensional area of a room is illustrated in FIG. 13A and other Figs. as a two dimensional approximation. The object 1320A shown near the top of the page is representative of a chair and a person holding a rifle at a side of a room. The reflections resulting from the scan of the room depicted in FIG. 13A are shown in FIG. 13B. In FIG. 13B, each circle represents a detected reflection. The size of each circle represents the magnitude of the reflections, and the shade of each circle represents the extent of the frequency-shift between the transmitted signal and the reflection. A circle with a darker shade represents a greater extent of the frequency-shift between the transmitted signal and the reflection as compared with the extent of the frequency-shift between the transmitted signal represented by a lighter shade. In FIG. 13B, each of the walls produce a number of reflections 1310B and 1315B along a plane with little to no frequency-shift, whereas the individual produces reflections 1320B with a frequency shift. The inanimate objects associated with the individual, such as the chair, also producing reflections with little to no frequency shift.

The location and the extent of the frequency shift of the reflections from the individual 1320B can be used by the scanning device to distinguish between the wall and the individual in processing. The processing can include use of a heuristic to discover peaks within the averaged scene data as shown in FIG. 13B. To improve accuracy, a constant false alarm rate (CFAR) based detection process can be used to distinguish between the wall and the individual in processing. The boxes shown in FIG. 13C represent the objects identified by the scanning device. Specifically, the first box 1310C represents an identified first wall, the second box 1320C represents an identified moving object, and the third box 1315C represents an identified second wall.

Figure 13D:
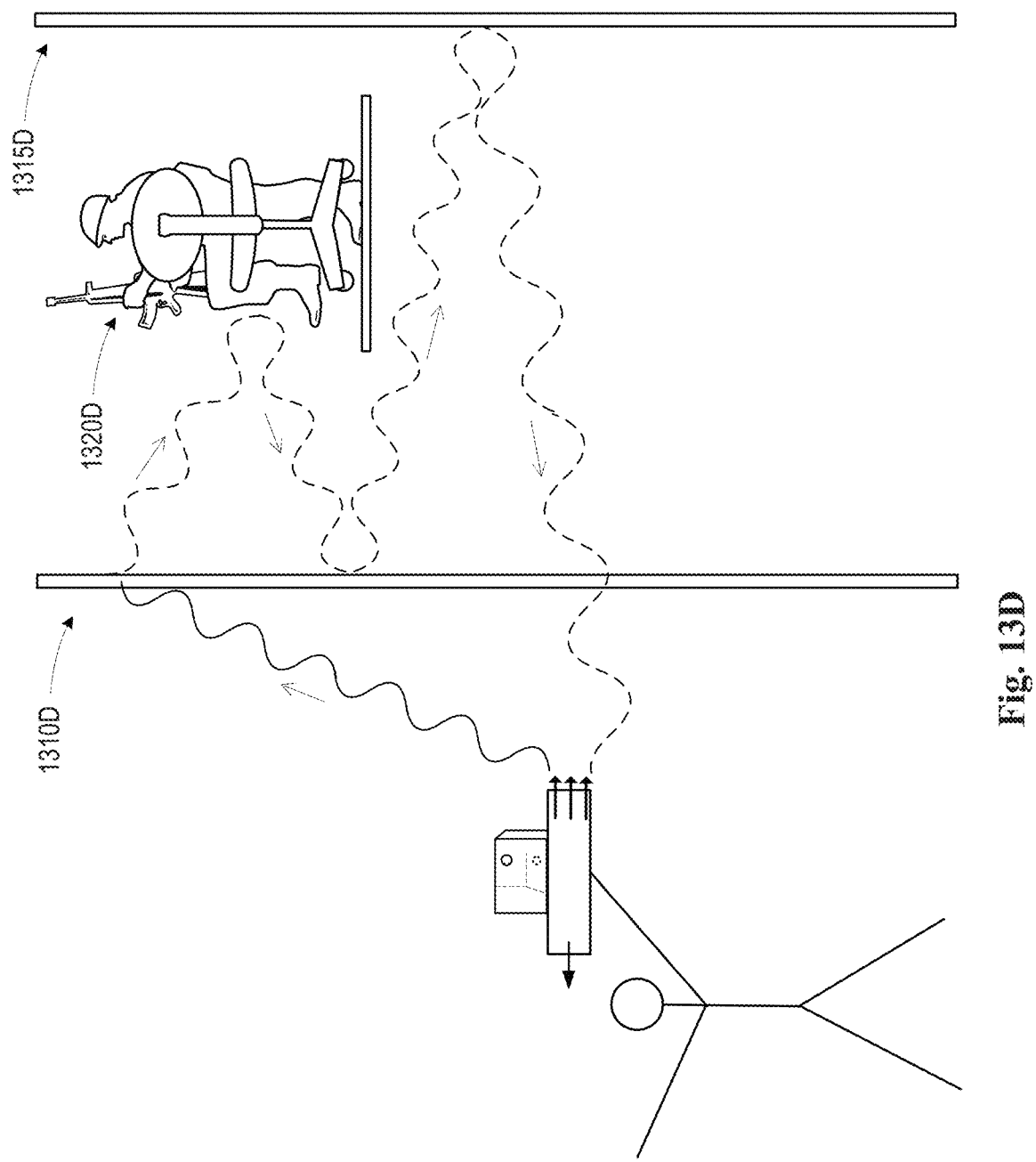

FIGS. 13D-13E are diagrams illustrating example uses of a scanning device in distinguishing between direct and indirect reflections from moving objects. FIG. 13D illustrates the path of an indirect reflection of a transmitted signal (the path of the direct reflection is not shown). In particular, a transmitted signal is deflected by a far wall 1315D, by a close wall 1310D, by an individual 1320D, and then reaches the scanning device. The scanning device thus detects both a direct reflection and the indirect reflection. From the perspective of the device, the indirect reflection has characteristics corresponding to the existence of a second object which is similar to the first object and located further away than the first object. FIG. 13E illustrates the reflections detected by the scanning device. In particular, FIG. 13E includes a detected first wall 1310E, a detected first moving object 1320E, a detected second wall 1315E, and a detected second moving object 1325E.

Figure 13F:
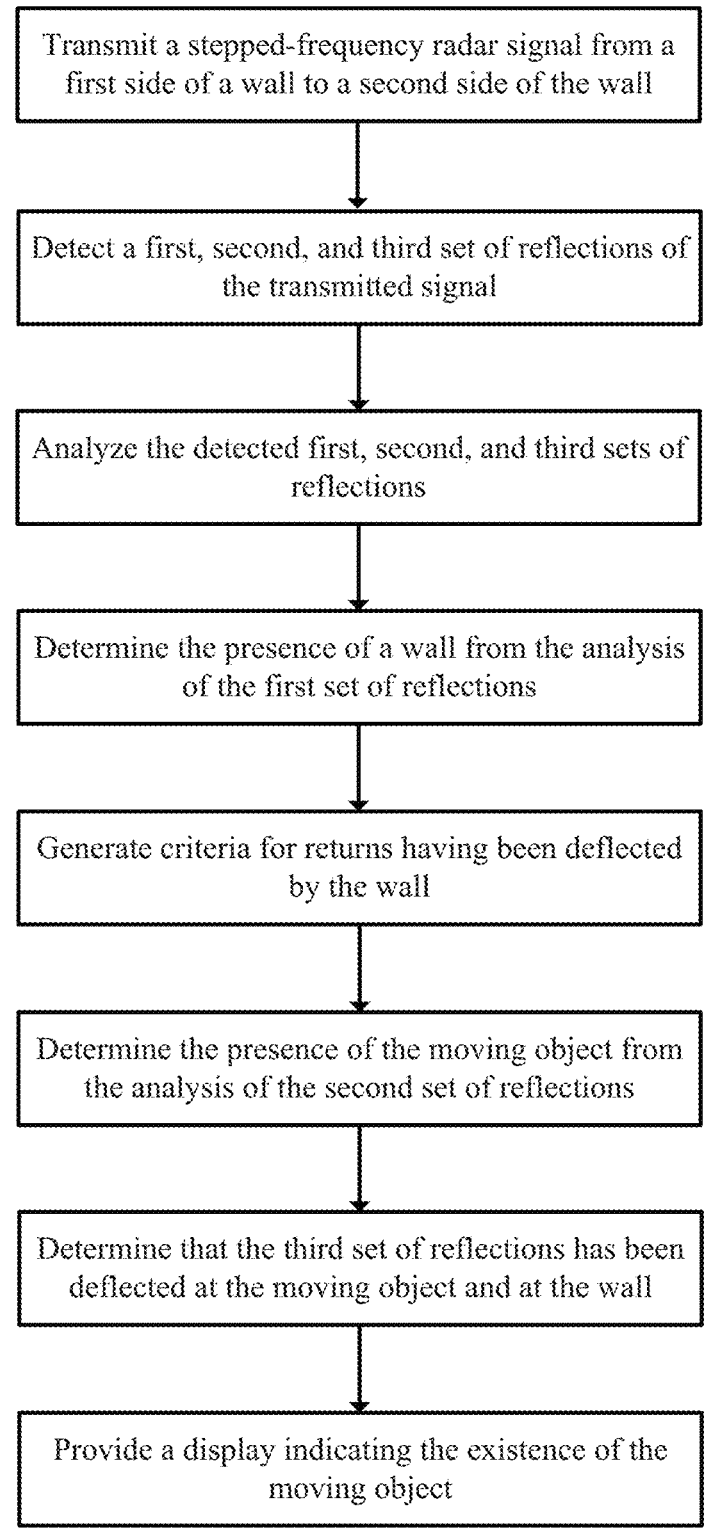
FIG. 13F is a flow chart of an example of a process to distinguish between direct and indirect reflections from moving objects.

However, by taking into consideration the existence of the walls as shown in FIG. 13C, the scanning device can identify which reflections are characteristic of reflections that would occur from deflections by the walls. Indirect or "multipath" reflections can be detected based upon range sorting and range-only processes. However, by including angle and/or azimuth as additional discriminant(s), accuracy of the multipath computation can be improved. FIG. 13F is a flow chart of an example of a process to distinguish between direct and indirect reflections from moving objects.

Figure 14C:
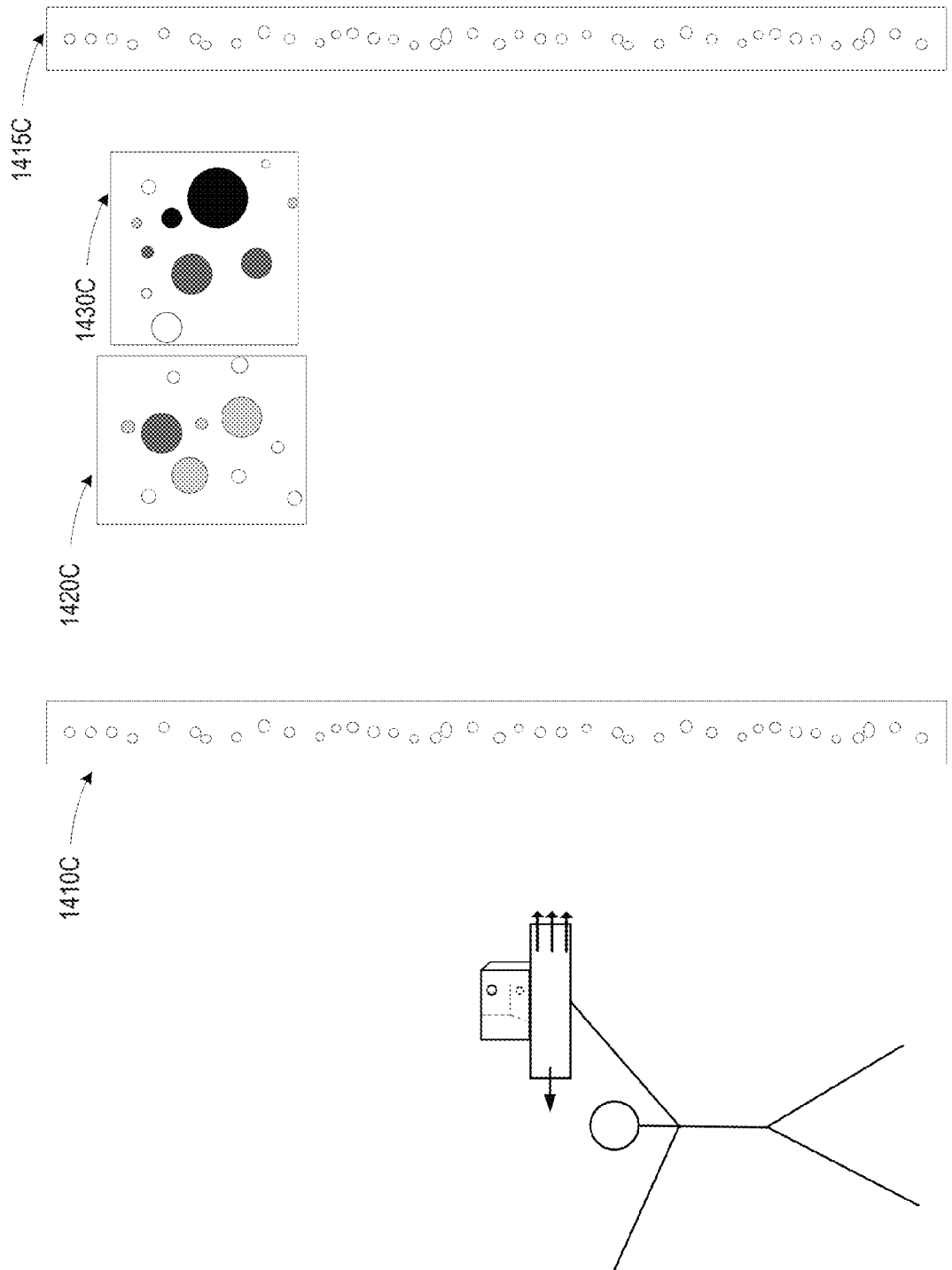

FIGS. 14A-14C are diagrams illustrating example uses of a scanning device to determine the existence of moving objects from a cluster of reflections. In particular, FIG. 14A illustrates a scanning device scanning a room with a first wall 1410A, a second wall 1415, and two individuals 1420A and 1430A in close proximity. As shown in FIG. 14B, the detected reflections from the two individuals overlap to form a cluster of reflections 1425B between reflections from the first and second walls 1410B and 1415B that is not immediately identifiable as being from two or more objects. As such, further processing by the scanning device can be conducted to determine the existence of objects from the cluster of reflections 1425B. FIG. 14C illustrates the determined objects from the cluster of reflections. In particular, FIG. 14C includes a detected first wall 1410C, a detected first moving object 1420C, a detected second moving object 1430C, and a detected second wall 1415C. An Order Statistics-Constant False Alarm Rate (OS-CFAR), Constant False Alarm Rate (CFAR), censored CFAR, and/or Fuzzy-C-Means (FCM) process can be used by the scanning device in analyzing the cluster of reflections. The FCM processes can be modified for real-time (or near real-time) operation. For example, the FCM processes can be modified to not require storage of a membership matrix U.

Figure 14D:
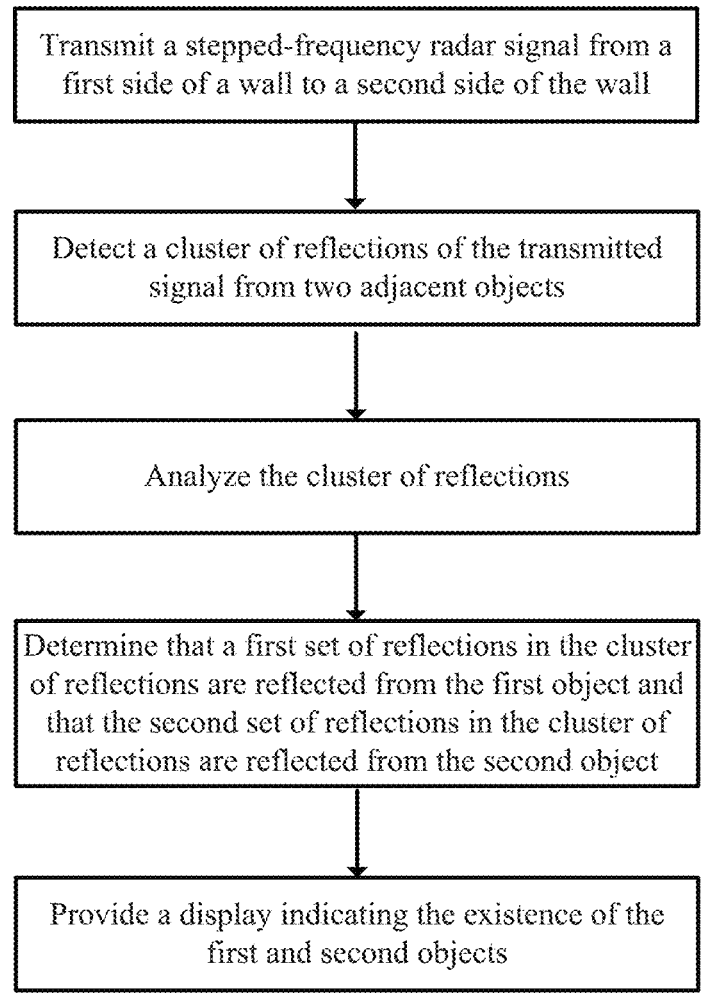
FIG. 14D is a flow chart of an example of a process to determine the existence of moving objects from a cluster of reflections.

In addition, a cluster validity index, such as a Xei-Beni index, can be used in estimating the existence of specific objects as generating the cluster of reflections. To aid in speed and accuracy of processing, the code of the process can be incorporated into a DSP of the scanning device with modifications to prevent dynamic memory allocation. Reframing a censored CFAR can also improve real time calculation of object movement. The computation of mean and standard deviation of windowed samples can be computationally demanding. To increase efficiency, incremental updates in the statistics (such as the mean and standard deviation) may be determined as the window slides across the range/Doppler map. FIG. 14D is a flow chart of an example of a process to determine the existence of moving objects from a cluster of reflections.

FIGS. 15A-15C are diagrams illustrating example uses of a scanning device to predict motion of a moving object. By detecting the movement of an object, future movement can be predicted by the scanning device. FIG. 15A illustrates the use of a scanning device to detect a moving object 1520A. In this example, the moving object 1520A is an individual behind a wall 1510A. The movement predicted by the scanning device can be used to better interpret detections of reflections in the near future. For example, in one situation in a noisy environment, reflections representing a moving object are detected, then not detected, then detected yet again a short time later in an adjacent position. Further, reflections representing a stationary object also may be detected, then not detected and then detected yet again in the same position, as the reflections of the stationary object are obscured at some times within the noisy environment.

FIG. 15B illustrates the reflections detected by the device during a short period of time (e.g., a second). In particular, FIG. 15B includes reflections from a wall 1510B, reflections from a moving entity in a first area 1520B, and reflections from a moving entity in a second area 1530B. Without movement detection, the scanning device may have trouble interpreting the data from the reflections 1520B and 1530B and may erroneously drop display of an object or display multiple objects. By detecting motion of the object in real time, the scanning device can expect the motion of the object to the adjacent location and interpret the data from processing as being reflective of a single moving object. FIG. 15C illustrates the objects detected by the scanning device given the reflections detected in FIG. 15B. The line 1540C in FIG. 15C represents the motion expected by the device. In taking into account the expected motion, the device has detected a single moving object 1525C and a wall 1510C.

Figure 15D:
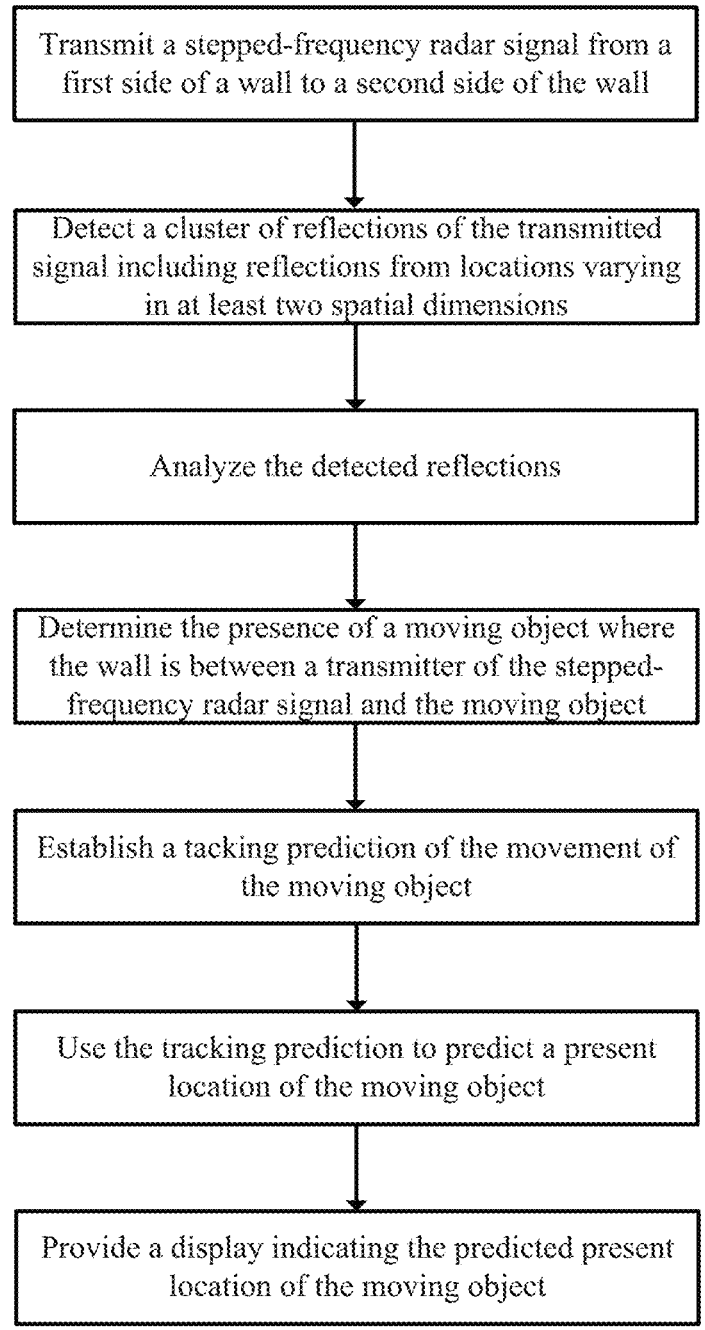
FIG. 15D is a flow chart of an example of a process to predict motion of a moving object.

FIG. 15D is a flow chart of an example of a process to predict motion of a moving object. In order to better detect a moving object, processes can be configured to dynamically adjust tracking gains. In one implementation, the process include use an alpha-beta-gamma tracking filter. In other implementations requiring better detection of moving targets, a fully-coupled extended Kalman filter that tracks in the Cartesian coordinate space can be used. The fully-coupled Kalman filter can provide automatic range-rate/Doppler correlation and can produce improvement in capability over an alpha-beta-gamma tracking filter. Also, coasting logic, tracking gate overlap logic, and track-to-detect association for multi-target tracking can be used.

Figure 16:
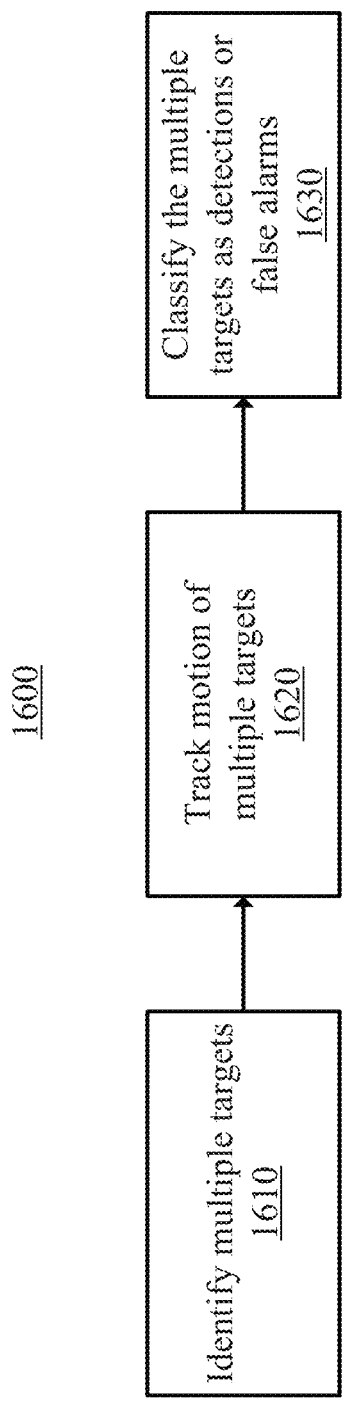
FIG. 16 is a flow chart of an example of a process to identify, track and classify multiple objects.

FIG. 16 is a flow chart of an example process 1600 to identify, track and classify multiple objects. The objects may be referred to as targets. The process 1600 may reduce or eliminate false alarms arising from systemic errors (such as false alarms arising from a multi-path reflection), resulting in improved performance.

The process 1600 may be performed by one or more processors included in a device for detecting objects or targets, such as entities or persons. The device may include the sensor device 110 discussed with respect to FIG. 1A or the scanning device 150 discussed with respect to FIG. 1B. The process 1600 may be performed by one or more processors separate from, and in communication with, a device such as the sensor device 110 or the scanning device 150. For example, the process 1600 may be performed by a computer in communication with such a device. In some implementations, the wall penetrating personnel detection sensors (WPPDS) (e.g., Sense Through The Wall (STTW) sensors) described with reference to FIGS. 10A-12B may perform the process 1600, and, in the discussion below, the process may be performed by the WPPDS.

Multiple targets are identified (1610). The multiple targets may include, for example, two persons located in close proximity with each other, such as the persons 1420A and 1430A shown in FIG. 14A. The multiple targets may include multiple objects within an enclosed space, such as the person 120A who is sitting in a chair, the person 115 running in the space, and the fan 125 shown in FIG. 1A. As discussed with respect to FIG. 14A, in some instances, the signals reflected from the multiple objects are not immediately identifiable as being from two or more distinct objects without further analysis and processing of the data from the WPPDS. The signals reflected from the multiple objects are processed and analyzed to determine that multiple, distinct targets are present. The presence of multiple targets may be determined at one or more instances in time.

In the discussion below, moving targets may be considered to be targets or objects that move within a space from a first spatial location to a second, distinct, spatial location. An example of a moving target is a person walking through a room. Near-stationary or substantially stationary targets are targets or objects that do not move from one spatial location to another but do exhibit subtle movements that are detectable by the WPPDS. A person sitting quietly in a chair or sleeping on a floor are examples of near-stationary targets. Stationary targets are targets that do not ordinarily exhibit motion in the absence of applying force to the target. Examples of stationary targets include bookcases, filing cabinets and walls.

Additionally, targets or objects are physical items that are present in a space. Candidate detections, potential detections, or detections may be an indication from the WPPDS that a physical item may be present. Candidate detections may arise from radar signals reflecting from physical objects in the space or from artifacts such as multi-path reflections and system errors. Actual detections, confirmed detections, or detections may be candidate detections that arise from an object or target. False alarms are candidate detections that arise from an artifact.

The motion of the multiple targets identified in (1610) is tracked (1620). For example, the multiple targets identified in (1610) may be targets that are moving through a space (such as the running person 115 in FIG. 1A) or targets that are stationary, or nearly stationary, such as the person 120A sitting in the chair or the fan 125 of FIG. 1A). Tracking the identified multiple targets provides an indication of the location of the multiple targets over time.

The WPPDS may utilize a Doppler frequency shift to calculate a range rate (the rate at which a target moves towards or away from the radar) for targets. The Doppler frequency shift is the difference in frequency between a transmitted signal and a return signal, and the Doppler frequency shift may provide radial motion (velocity) information for the target. For example, as a target moves from an initial location to a second location from a first time to a second time, respectively, signals reflected from the target exhibits a frequency shift (such as, a Doppler shift) as the target moves from the initial location to the second location that may be processed by the WPPDS. To track a particular one of the identified multiple targets, characteristics of the particular target at the first time may be compared to characteristics of a detected target at the second time to determine whether the target detected at the second time is the same target that was detected at the first time. If the targets are determined to be the same, the second target is associated with a track of the first target and the first target is deemed to have moved from the initial location to the second location.

The multiple identified targets are classified as detections or false alarms (1630). The multiple targets may be classified as detections or false alarms at a classifier such as the classifier discussed with respect to, for example, FIG. 17. The classifier may compare characteristics of the multiple targets to known characteristics of detections and false alarms to determine whether a particular target is an actual detection or a false alarm. Alternatively or additionally, the classifier may account for known environmental conditions and existing structures to determine whether a particular target is a false alarm caused by, for example, multiple reflections off of an internal wall or a fixed structure within a building or the erroneous identification of a stationary target as a moving target. In this regard, the classifier may act to reduce systemic errors that increase the number of false alarms, thus improving performance of a device such as the device 110, the sensor device 150, or the WPPDS.

Figure 17:
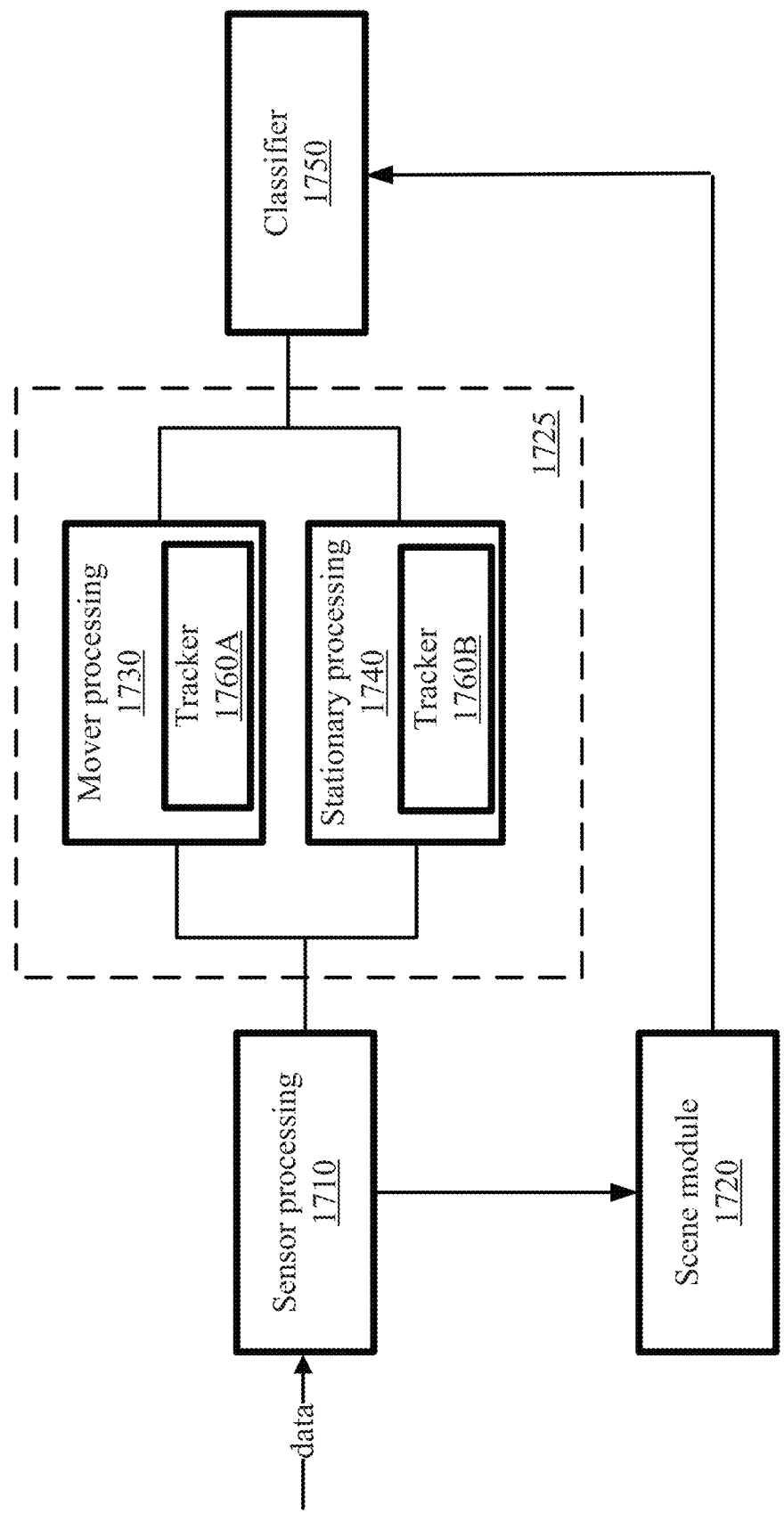
FIG. 17 is a block diagram of a system for identifying, tracking, and classifying multiple objects.

FIG. 17 is a block diagram of a system 1700 for identifying, tracking, and classifying multiple targets. The system includes a sensor processing module 1710, a scene module 1720, a processing module 1725, and a classifier module 1750. The processing module 1725 includes a mover processing module 1730 and a stationary processing module 1740.

The sensor processing module 1710 receives and processes data from a sensor that monitors a space. For example, the sensor processing module 1710 may receive a signal from the forward looking antennas 114 (FIG. 1A) and the backward looking antenna 116 (FIG. 1A) of the device 110, and the data may be received as an IQ data pair. The IQ data pair may be output from the mixer 350 of the circuit 300 of FIG. 3. As discussed above, the mixer 350 is a quadrature demodulator that outputs "I" and "Q" data (referred to as IQ data) where a separate IQ data pair may be generated for each transmitted frequency.

The data signals received by the sensor processing module 1710 are signals that have reflected off of objects in a monitored space in response to those objects being exposed to signals transmitted from a radar. The transmitted signal includes multiple frequencies (for example, the transmitted signal may include 250 frequencies, each of which are separated by about 2 MHz), and the signal reflected from the objects includes data at each of the multiple frequencies.

Additionally, each frequency in the reflected signal has an associated magnitude and phase. The magnitude of the reflected signals may depend on the range (distance) from the sensor to the object, path loss due to walls and other barriers and obstructions, and environmental factors that give rise to multi-path reflections. The phase of the reflected signal corresponds to the range to the target and back as a function of radio signal wavelength. The sensor processing module may analyze the magnitude and phase of the data signals by performing an inverse Fourier transform (IFFT) of the data signals to produce a signal magnitude as a function of range to the target. The data produced by the sensor processing module 1710 may be referred to as high-range resolution (HRR) data.

The range to the target may be provided by stepping through multiple transmit frequencies so that the amount of difference in phase between the transmitted signal and its received (returned) signal may be measured and used to calculate the distance, or range, to the target. The more frequency steps that are transmitted, the better the range resolution becomes. In addition, by processing additional received samples of the signal at each frequency, the Doppler resolution may increase allowing the WPPDS to extract moving targets from clutter content that does not normally move between various locations in a monitored space, such as grass and trees. Signal processing may, therefore, cancel out much of the stationary clutter. Therefore, the clutter content may be classified as a false alarm. In addition, the use of increased signal integration times may decrease the margin between target detection and clutter.

In some implementations, the sensor processing module 1710 receives inertial measurement unit (IMU) accelerometer data. The IMU data may indicate the current rate of acceleration of a the sensor using one or more accelerometers. In some implementations, the IMU may indicate a change in rotational attributes such as pitch, roll and yaw using one or more gyroscopes.

In some implementations, the sensor processing module 1710 may include a leakage canceller that estimates a direct-path leakage signal and removes or reduces the effects of the direct-path leakage signal on the data received by the sensor processing module 1710. A direct-path leakage may be a signal that is received directly from a transmitting antenna without any reflection from the environment. Removing the leakage signal allows smaller echoes to be uncovered that would otherwise be swamped by the higher-amplitude leakage signal.

The scene module 1720 performs scene mapping for use in the classifier module 1750. The scene module 1720 generates a mapping, model, or other representation of fixed or semi-fixed objects in the vicinity of the radar. For example, the scene module 1720 may generate a mapping that specifies relative locations and orientations of walls, objects, and other barriers (such as trees) that may reflect transmitted radar signals. The mapping, model, or other representation is used by the classifier module 1750 to model the reflection of signals from fixed objects in the scene and to determine which detections are caused by multi-path reflections for a given scene geometry, The scene module 1720 may receive or access predetermined information (such as GPS coordinates) that specifies the locations and orientations of walls that form a building observed during a previous visit to an area. Alternatively or additionally, the scene module 1720 may receive an HRR from the sensor processing module 1710 and analyze the HRR to determine the locations of walls and other fixed barriers relative to the sensor. For example, large stationary objects in a scene may provide strong radar return with near-zero Doppler frequency shifts. If the large stationary objects are located directly in front of and/or with an orientation that is normal to the WPPDS, the strong radar returns are assumed to be caused by walls. The location of the walls relative to the WPPDS may be determined from the radar return, and the location may be used by the classifier module 1750. The location, orientation, and/or other information about the walls may be stored in an electronic memory for future use and/or displayed to a user of the sensor. For example, referring to FIG. 1A, the located walls may be displayed to the user 105 as horizontal lines on the display 110 of the handheld stepped-frequency sensor device 110 (e.g., the WPPDS). In some implementations, the located walls (or other barriers) may be transmitted from the WPPDS to a user who is remote from the scene.

The system 1700 also includes the processing module 1725, which includes the mover processing module 1730 and the stationary processing module 1740. The mover processing module 1730 processes data to detect moving targets (those targets that move among multiple spatial locations within a monitored space over a period of time), and the stationary processing module 1740 processes data to detect stationary targets (those targets that are substantially stationary over the period of time but have subtle movements, such as a still but breathing person). Stationary targets may be referred to as "breathers."

The sensor processing module 1710 provides the HRR output to the mover processing module 1730 and the stationary processing module 1740. The mover processing module 1730 and the stationary processing module 1740 provide simultaneous, or nearly simultaneous, detection and tracking of moving and near-stationary targets. The mover processing module 1730 may include processing a Doppler map (data that expresses range as a function of Doppler), a clutter map, and detection and tracking of targets. A high-pass filter or preset threshold may remove or reduce the effects of reflected radar signals that have a Doppler shift that is lower than a minimum threshold for moving targets. The stationary processing module 1740 may include selective range-bin motion compensation, analysis of a Doppler map, and detection and tracking of targets.

The WPPDS may use a multi-channel phase interferometer that processes a received signal to enable location of entities or targets within a given environment. For example, the interferometer may include three channels, with each channel including a receiver and a transmitter. In other examples, the interferometer may include more than three channels.

In one implementation, the multi-phase interferometer is a two-channel interferometer. The two-channel phase interferometer may include two receiver antennas and a transmitter. The two-channel phase interferometer includes a left channel and a right channel corresponding to a left and right receiver antenna, respectively. The mover processing module 1730 may create a range-Doppler map by performing a short-time Fourier Transform (STFT) on a predetermined number (e.g., sixteen) of HRR data received from the sensor processing module 1710 for each of a left and right channel of the two-channel phase interferometer. The number of HRR data sets is based on the number of frequency sweeps performed by the sensor processing module 1720 on the input IQ data pair. The left and right STFT outputs are then summed together to provide a final, composite range-Doppler map that is provided to a constant false alarm rate (CFAR) filter for target detection. FIG. 19 shows an example of a Range-Doppler map.

The CFAR filter may find targets by comparing the energy in each cell of the range-Doppler map with the average of its surrounding cells. At this stage, the relative signal amplitudes from the front and back channels for each target is determined. For example, targets behind the sensor, such as the user of the sensor, may be suppressed.

Clutter detections are detections that have Doppler shifts that do not correlate with their range rates. For example, windblown grass and trees (which may exhibit subtle motions but are stationary objects) are clutter, as are mechanical devices such as fans. A clutter mapping process may suppress detections that are identified as clutter. The clutter mapping process may use an M-of-N binary detector to filter out transient detections leaving those detections that persist. The detections that persist are more likely to be true targets and not systematic errors.

The stationary processing module 1740 analyzes the data from sensor module 1710 to detect stationary, or near-stationary targets. Such targets may be referred to as "breathers." In some implementations, the stationary processing module 1740 may use a signal integration period that is longer than the integration period used by the mover processing module 1730. In addition, the stationary processing module 1740 may use additional frequency sweeps as compared to the number of frequency sweeps used by the mover processing module 1730. The larger number of frequency sweeps may provide a greater processing gain. In addition, the larger quantity of frequency sweeps may allow the stationary processing module 1740 to detect the reflected signals and Doppler shifts of near-stationary targets, both of which are relatively small compared to the reflected signals and Doppler shifts of moving targets. The stationary processing module 1740 also may include motion compensation techniques to compensate for sensor-induced motion.

The mover processing module 1730 and the stationary processing module 1740 produce detections of moving objects and stationary objects, respectively. The detections may include, for example, the location of the detection, the time of the detection, and the strength of the detection. The mover processing module 1730 and the stationary processing module 1740 also may produce tracks that describe the motion of the objects over time. The mover processing module 1730 and the stationary processing module 1740 provide the detections and/or the tracks to the classifier module 1750.

The system 1700 also includes the classifier module 1750. The classifier module 1750 segregates detections that arise from moving objects of interest and near-stationary objects of interest from detections that arise from other phenomena. Detections that arise from moving objects of interest or stationary objects of interest are actual detections, and detections that arise from other phenomena are false alarms. The other phenomena may include multipath returns that may be modeled using the scene geometry generated by the scene module 1720. The classifier module 1750 may use the location of a wall provided by the model to reduce the false alarm rate. For example, during daylight hours, an operator may not be interested in objects that are on the same side of the wall as the sensor because those objects are visible to the operator. In this example, the classifier module 1750 may suppress detections that are associated with a range that indicates the target is on the same side of the wall as the sensor. In this example, the classifier module 1750 may provide the remaining targets (those that are on the other side of the wall from the sensor) for display to the user. As a result, fewer detections are displayed to the user, and the user may be able to understand and act on the data more quickly.

FIG. 18 is an illustration of an example space observed by a sensor 1850 at a time t1, and FIG. 19 is an illustration of a range-Doppler mapping of the space. Referring to FIG. 18, at a particular time (t=t1), the sensor 1850 (for example, a WPPDS) is positioned on a first side 1805 of a boundary 1860 and four targets 1810, 1820, 1830, and 1840 are on a second side 1807 of the boundary 1860 (e.g., in a room) that includes open space 1870. At time=t1, the targets 1810, 1820, and 1830 are at approximately the same range or distance from the sensor 1850. However, the targets 1810, 1820, and 1830 are positioned at a different angle relative to the sensor 1850. For example, the target 1820 is substantially in the direct line of sight from the sensor 1850, whereas the target 1830 is located at an angle θ (such as the angle 1880 shown in FIG. 18) relative to the line of sight of the sensor 1850. The angle θ may be used to determine that the target 1830 and the target 1820 are separate targets even though these two targets have the same range.

The sensor 1850 may include a SFCW radar that provides a continuous wave signal for use in determining the movement of a target. A user may hold the activated sensor 1850 directed towards the boundary 1860. The sensor 1850 may transmit stepped-frequency radar signals using, for example, one or more antennas (not shown) as transceivers. In another example, the sensor 1850 may transmit stepped-frequency radar signals using a separate transmitter. The signals from the sensor 1850 propagate outward as shown by the dotted lines in FIG. 18. The signals strike target 1820 and target 1830 at an angle of arrival θ. The signals are reflected back to the sensor 1850 by target 1820 and target 1830. The sensor 1850 receives the reflected signals from target 1820 and target 1830. The reflected signals exhibit a Doppler frequency shift proportional to the magnitude of the target's movement towards or away from the sensor 1850.

In the example illustrated in FIG. 18, the SFCW radar of the sensor 1850 provides a direct-path range 1890 to target 1820 and target 1830 at a time equal to $t_1$. The direct-range path 1890 may represent the location of target 1820 and target 1830 in the open space 1870 within the boundary 1860 at the time equal to $t_1$. A phase interferometer provides the angle of arrival θ for target 1820 and target 1830. For example, as described with reference to FIG. 17, a two-channel phase interferometer may be used to determine cross-range or azimuthal location of targets. The direct-path range 1890 may be calculated using an IFFT of the received SFCW radar pulse. The direct-path range 1890 may be represented by a "bin" in the form of an annular ring surrounding the sensor 1850 where the diameter of the annular ring is the radar range resolution. In some cases, dependent on the proximity of one target to another target, a target may straddle two range bins.

FIG. 19 is a diagram illustrating an example of a Range-Doppler map for the targets in FIG. 18. For example, FIG. 19 may be a range-Doppler map 1900 created by the mover processing module 1730 discussed in FIG. 17. The range-Doppler map 1900 includes cells (e.g., cell 1950), and a power level is associated with each cell. The power level may be represented by a numerical value. In some implementations, the range-Doppler map 1900 may be visually presented with a particular display style (such as colors or cross-hatching) representing the power level of a detection in a cell. For example, violet may represent low energy cells, and the represented energy level of a cell may increase as the color of the cell varies from violet through blue, green, yellow, orange and then to red. Cells in the range-Doppler map 1900 with a relatively high power level may represent a detected target. Cells in the range-Doppler map 1900 with a low power level (such as the cell 1950) may represent open space with no detected target.

Each detected target illustrated in FIG. 18 (target 1810, target 1820, target 1830 and target 1840) is shown on the range-Doppler map 1900. In addition, a region surrounding each detected target (region 1910, region 1920, region 1930, and region 1940 for target 1810, target 1820, target 1830 and target 1840, respectively) may include cells that may be at a higher energy level than outside surrounding cells but at a lower energy level than the detected target. For example, target 1830 is included in region 1930. Cells 1960*a*-*d* may be at a higher energy level than cells 1960*e*-*m* which may be at a higher energy level than the remaining surrounding cells (e.g., cell 1950). For example, the color used for each of cells 1960*a*-*d* may be orange to indicate the detection of target 1830 by the WPPDS. The cells 1960*e*-*m* included in the region 1930 may be yellow. The remaining surrounding cells (e.g., cell 1950) may be blue indicating low energy areas that represent open space with no detectable targets.

A vertical axis 1970 of the range-Doppler map 1900 indicates the direct-range path from the sensor to each target (e.g., the range from the sensor 1850 to each target). For example, an operator 1980 may be shown on the range-Doppler map 1900 at zero range at a midline 1990. The operator may be represented using a particular display style (such as the color orange). The operator 1980 may be holding the sensor 1850, directing the sensor 1850 towards the boundary 1860 that includes the targets. A horizontal axis 1990 of the range-Doppler map 1900 indicates a Doppler frequency shift of the return signal. For example, a target receding from the sensor 1850 may appear on the left side of the range-Doppler map 1900. A target advancing towards the sensor 1850 may appear on the right of the range-Doppler map 1900. As shown in FIG. 19, target 1830 is advancing towards the sensor 1850 while target 1810 is receding away from the sensor 1850. The speed at which the target is moving determines the Doppler frequency shift and consequently how far to the left or right of the midline 1990 of the range-Doppler map 1900 the target appears.

FIG. 20 is a flow chart of an example process 2000 to detect multiple objects. For example, the process 2000 may be performed by one or more processors included in the WPPDS. A processor may be integrated for use with stepped-frequency continuous wave (SFCW) radar and a phase interferometer included in the WPPDS. In some implementations, the SFCW radar and phase interferometer may each employ a processor where the processors are communicatively coupled to provide the functions of the WPPDS. In some implementations, the process 2000 may be performed by one or more processors included in the handheld stepped-frequency sensor device 110 described with reference to FIG. 1A.

A stepped-frequency radar signal is transmitted through a barrier (2010). A user may hold the WPPDS and direct it towards a barrier. For example, referring to FIG. 18, the user holds sensor 1850 and directs it towards the boundary 1860. The WPPDS may use SFCW radar and a two-channel phase interferometer that includes a signal generator to transmit the stepped-frequency radar signal. The signal generator provides the multiple frequency signals for transmission by the transmitter.

A signal that includes a reflection of the transmitted signal from a first object and a signal that includes a reflection of the transmitted signal from a second object is sensed (2020). For example, the SFCW radar of the WPPDS receives a reflection (echo) of the transmitted signal from a first object and a second object. The first and second objects are located within the boundary 1860 shown in FIG. 18. For example, the sensor 1850 receives a signal that includes the reflection of the transmitted signal from target 1820 and the reflection of the transmitted signal from target 1830. The magnitude of the received signal may be a function of the location of the target from the sensor 1850 at a specific time (e.g., range ($t_1$) in FIG. 18) and the path loss due to the transmission through the boundary 1860. The received signal phase corresponds to a phase shift of the reflected signal at a particular frequency. As discussed above, the transmitted signal includes multiple different frequencies (for example, 250 different frequencies). The phase shift at each of the different frequencies may be analyzed and the phase shift as a function of frequency corresponds to the range to the target and back.

The sensed signal is analyzed to determine that a first detection is associated with the first object and a second detection is associated with the second object (2030). For example, the sensor processing module 1710 may receive the IQ data pair from the mixer 350 included in the circuit 300 of FIG. 3. The sensor processing module 1710 performs a frequency sweep of the IQ data and provides HRR output for use by the scene module 1720, the mover processing module 1730 and the breather processing module 1740 in order to detect a target (object) from among walls and clutter. The first object and the second object may be discrete objects, and the characteristics of the first and second detections may be analyzed to determine that the first and second objects are discrete objects. For example, the first and second detections may have the same range (or distance) but different angle of arrivals, thus indicating that the first and second detections are associated with different objects. Additionally, or alternatively, Doppler may be used as a feature to distinguish among different objects.

Figure 21:
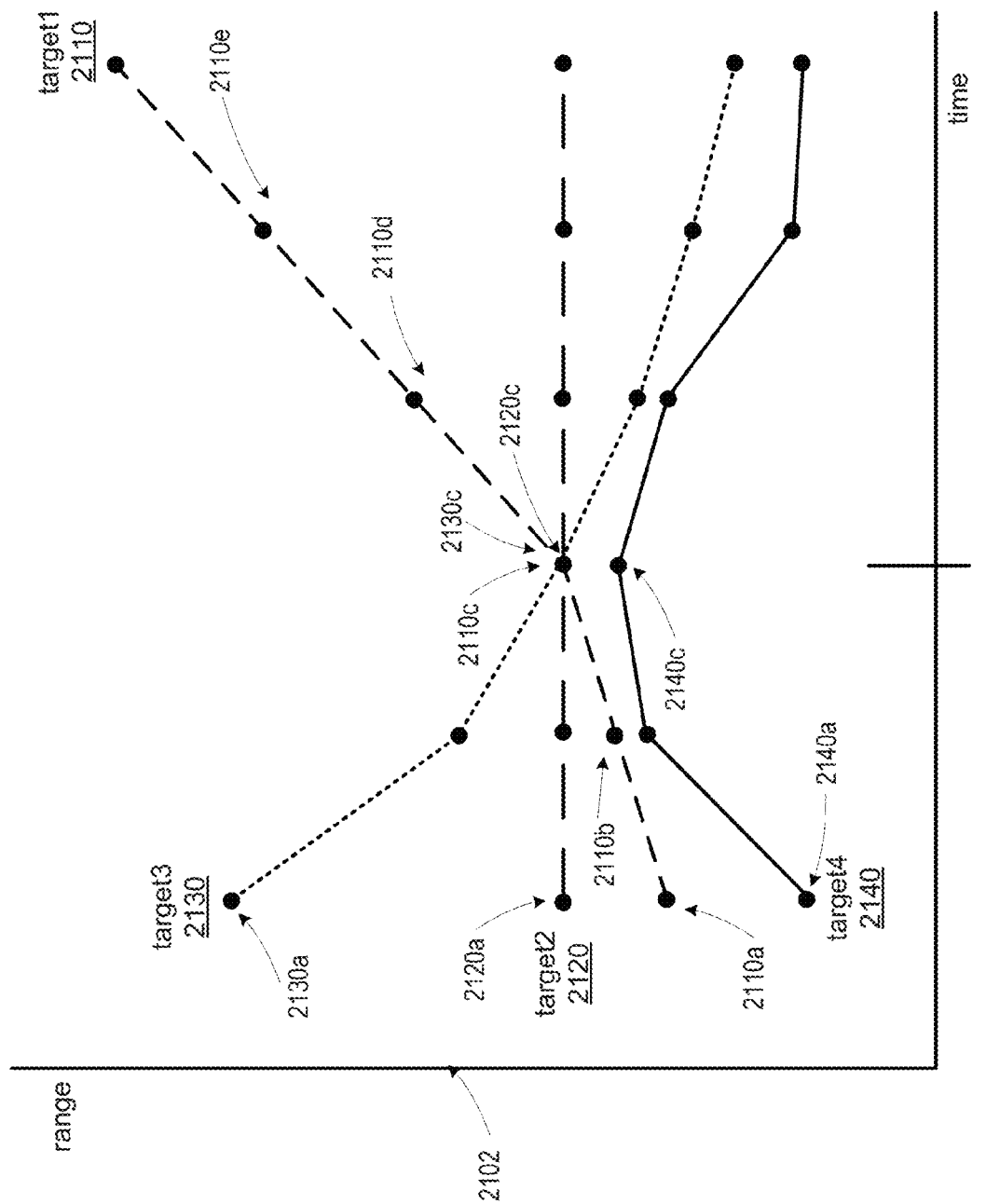
FIG. 21 is a diagram illustrating an example of tracking multiple targets over time.

FIG. 21 is a diagram illustrating an example of tracks associated with multiple targets over time. The tracks represent motion of a target over time. In the example of FIG. 21, a time equal to $t_1$ corresponds to the time represented in the scenario illustrated in FIG. 18. FIG. 21 shows range values (range value 2110c, range value 2120c, range value 2130c, and range value 2140c) determined by the sensor 1850 for each of the four targets (target 1810, target 1820, target 1830 and target 1840), respectively, at a time equal to $t_1$. The range value 2110c, range value 2130b, range value 2130c, and range value 2140c is included in a track 2110, track 2130 and track 2140, for target 1810, target 1820, target 1830 and target 1840, respectively. The track for each target shows determined ranges for each respective target detected at points in time before or after the time equal to $t_1$. For example, a user holds a WPPDS and directs it towards the boundary 1860. At multiple points in time, the sensor 1850 operates to transmit and receive returned reflected signals from the targets within the open space 1870 of the boundary 1860. The process of transmitting and receiving returned reflected signals was described with reference to FIG. 18.

The system 1700 (FIG. 17) may include a track processing subsystem (a tracker) 1760A, 1760B. At an initial time, for example, when the user first turns on the WPPDS and directs it towards the boundary 1860, range value 2110a, range value 2120a, range value 2130a, and range value 2140a are determined for target 1810, target 1820, target 1830, and target 1840, respectively. At a subsequent time after the first time, the WPPDS transmits signals that are again reflected by target 1810, target 1820, target 1830, and target 1840. The detections of the targets 1810, 1820, 1830, and 1840 are provided to the tracker 1760A, 1760B for association. For example, the tracker 1760A, 1760B would receive range value 2110a, range value 2120a, range value 2130a, and range value 2140a for target 1810, target 1820, target 1830, and target 1840, respectively. The tracker 1760A,1760B maintains a history of previous detections for a target and their range values. This allows the tracker 1760A, 1760B to track the movement of the target over time along a track (e.g., movement of target 1810 on track 2110). The tracker 1760A, 1760B may predict, using previous Doppler and range information, where a target should be at a future time. If a currently detected target falls within the association window of an existing track for the target, the currently detected target is associated with the track. The association window may include a range of values for an expected range, Doppler, and azimuth angle of arrival. In addition, the detected target is assumed to be the same target as was previously detected.

For example, the tracker 1760A maintains a history of range values 2110a-d for target 1810. When the tracker 1760A receives range value 2110e sometime after time $t_1$, the tracker 1760A determines if the range value 2110e falls within the association window of the existing track (track 2110) for the target 1810. As shown in FIG. 21, the range value 2110e does fall within the association window of the existing track 2110 and the range value 2110e is added to the existing track 2110 for target 1810. In addition, the range value 2110e is added to the existing history for the track 2110.

The tracks for each target provide information related to the distance from the sensor at which the target is located (the range value) and the movement of the target relative to the sensor over time. For example, the track 2110 for target 1810 shows that the target 1810 is moving away from the sensor 1825. In another example, the track 2120 shows that the target 1820 remains stationary (stays at the same range value) for each point in time of detection. The target 1820 may be a stationary object, such as a breathing person.

Detected targets that do not lie in the association window for an existing target are assumed to be new targets. The tracker 1760A, 1760B creates a new history for the new target that are compared to future target detections.

Referring to FIG. 21, at time=t1, the targets 1810, 1820, and 1830 have the same range, thus the respective tracks 2110, 2120, and 2130 cross through each other at time=t1. To reduce the possibility of one track being confused with another track, in some implementations, when a first track becomes close to a second track, as measured by, for example, the first and second tracks having a similar range at a particular time, the first and second track coast through each other. The tracks coast through each other by extrapolating the existing track without regard to the most recent detections. Thus, at the time t1, the tracks 2110, 2120, and 2130 may be assumed to continue to follow a path determined by times prior to the time t1.

Figure 22:
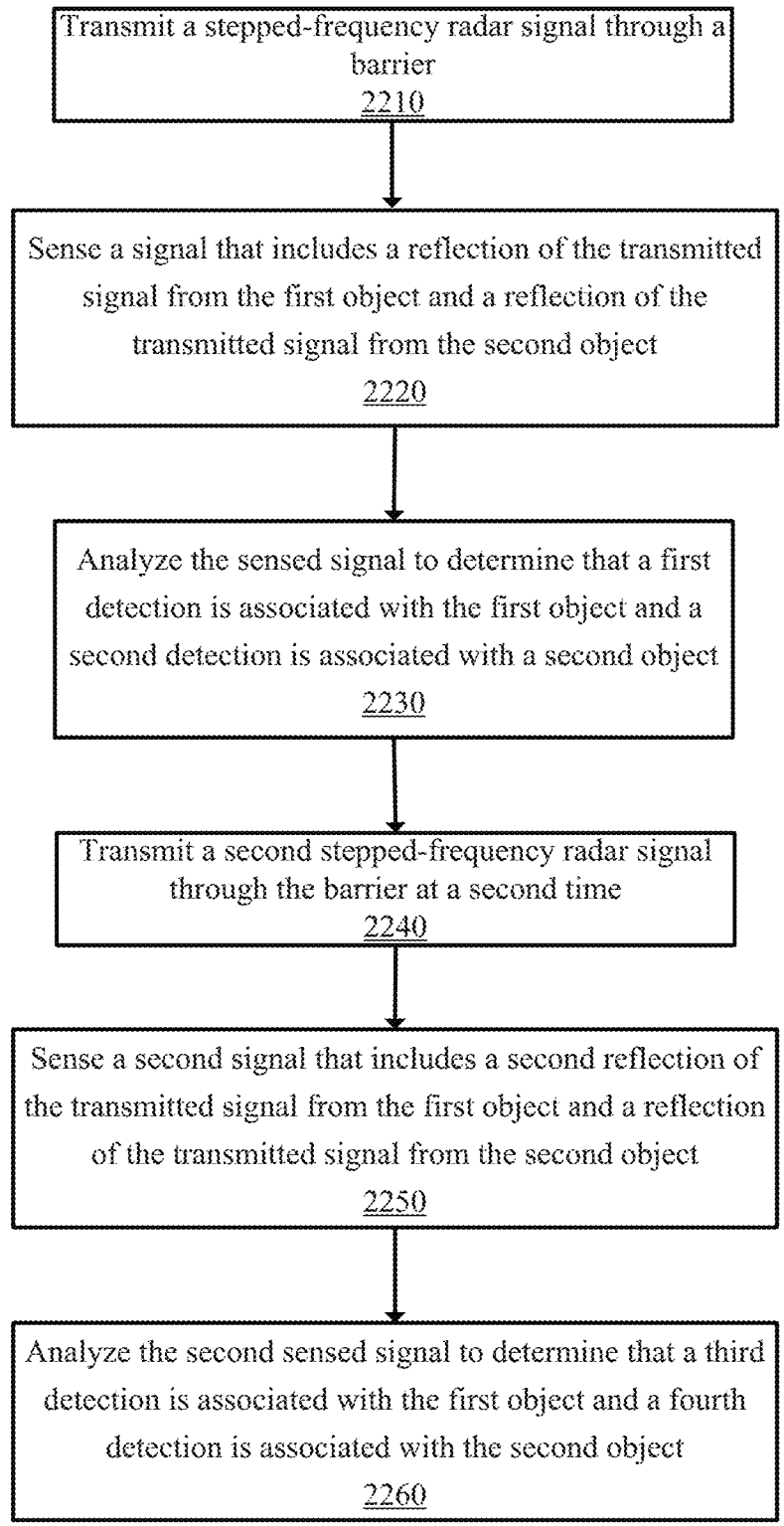
FIG. 22 is a flow chart of an example process for tracking multiple targets over time.

FIG. 22 is a flow chart of an example process 2200 for tracking multiple targets over time. The process 2200 may be performed by one or more processors included in the WPPDS or by one or more processors separate from but in communication with the WPPDS. A processor may be integrated for use with stepped-frequency continuous wave (SFCW) radar and a phase interferometer included in the WPPDS. In some implementations, the SFCW radar and phase interferometer may each employ a processor where the processors are communicatively coupled to provide the functions of the WPPDS. In some implementations, the process 2200 may be performed by one or more processors included in the handheld stepped-frequency sensor device 110 described with reference to FIG. 1A.

A stepped-frequency radar signal is transmitted through a barrier (2210). A user may hold the WPPDS and direct it towards a barrier. For example, referring to FIG. 18, the user holds sensor 1850 and directs it towards the boundary 1860. The WPPDS may use SFCW radar and a two-channel phase interferometer that includes a signal generator to transmit the stepped-frequency radar signal. The signal generator provides the multiple frequency signals for transmission by the transmitter.

A signal that includes a reflection of the transmitted signal from a first object and a signal that includes a reflection of the transmitted signal from a second object is sensed (2220). For example, the SFCW radar of the WPPDS receives a reflection (echo) of the transmitted signal from a first object and a second object. The first and second objects are located within the boundary 1860 shown in FIG. 18. For example, the sensor 1850 receives a signal that includes the reflection of the transmitted signal from target 1820 and the reflection of the transmitted signal from target 1830. The magnitude of the received signal may be a function of the location of the target from the sensor 1850 at a specific time (e.g., range $(t_1)$ in FIG. 18) and the path loss due to the transmission through the boundary 1860. The received signal phase corresponds to the range to the target and back in terms of the radio signal wavelength.

The sensed signal is analyzed to determine that a first detection is associated with the first object and a second detection is associated with the second object (2230). For example, the first object and the second object may be discrete objects, and the characteristics of the first and second detections may be analyzed to determined that the first and second objects are discrete objects. For example, the first and second detections may have the same range but different angle of arrivals, thus indicating that the first and second detections are associated with different objects. A second stepped-frequency radar signal is transmitted through the barrier at a second time (2240). Referring to FIG. 18, the user may continue to hold the sensor 1850 and direct it towards the boundary 1860. The SFCW radar included in the sensor 1850 will again transmit the stepped-frequency radar signal. A signal that includes a second reflection of the transmitted signal from the first object and a signal that includes a second reflection of the transmitted signal from the second object is sensed (2250).

The sensed signal is analyzed to determine that a third detection is associated with the first object and a fourth detection is associated with the second object (2230). For example, the mover processing module 1730 may determine a third range value and associate the third range value with the first object. The mover processing module 1730 may determine a fourth range value and associate the fourth range value with the second object. Characteristics or parameters of the third detection are compared to characteristics of the first detection of the first object and the second detection of the second object to determine whether the third detection is a detection of the first object or the second object. For example, the characteristics and parameters may include angle of arrival, range, target strength, Doppler shift, and range rate.

A tracker 1760A included in the mover processor module 1730 maintains a history of range values for each of the first object and the second object. The history of the range values for the first object includes a first range value and a third range value. The difference in the first range value and the third range value may indicate the movement (if any) of the first object either towards or away from the sensor 1850. In a similar manner, the history of the range values for the second object includes a second range value and a fourth range value. The difference in the second range value and the fourth range value may indicate the movement (if any) of the second object either towards or away from the sensor 1850. Additionally, the tracker may maintain a history of angle values and Doppler values for each of the first and second objects. For example, the difference in the second angle value and/or the Doppler value may indicate movement of the second object. The range, Doppler, and angle values may be used individually or together to determine characteristics of the first and second objects. In some implementations a Doppler signature known to be associated with a particular object or type of object may be stored in the tracker 1760A before monitoring begins. Doppler values observed during monitoring may be compared against the signature to identify the particular object associated with the stored Doppler signature.

Figure 23:
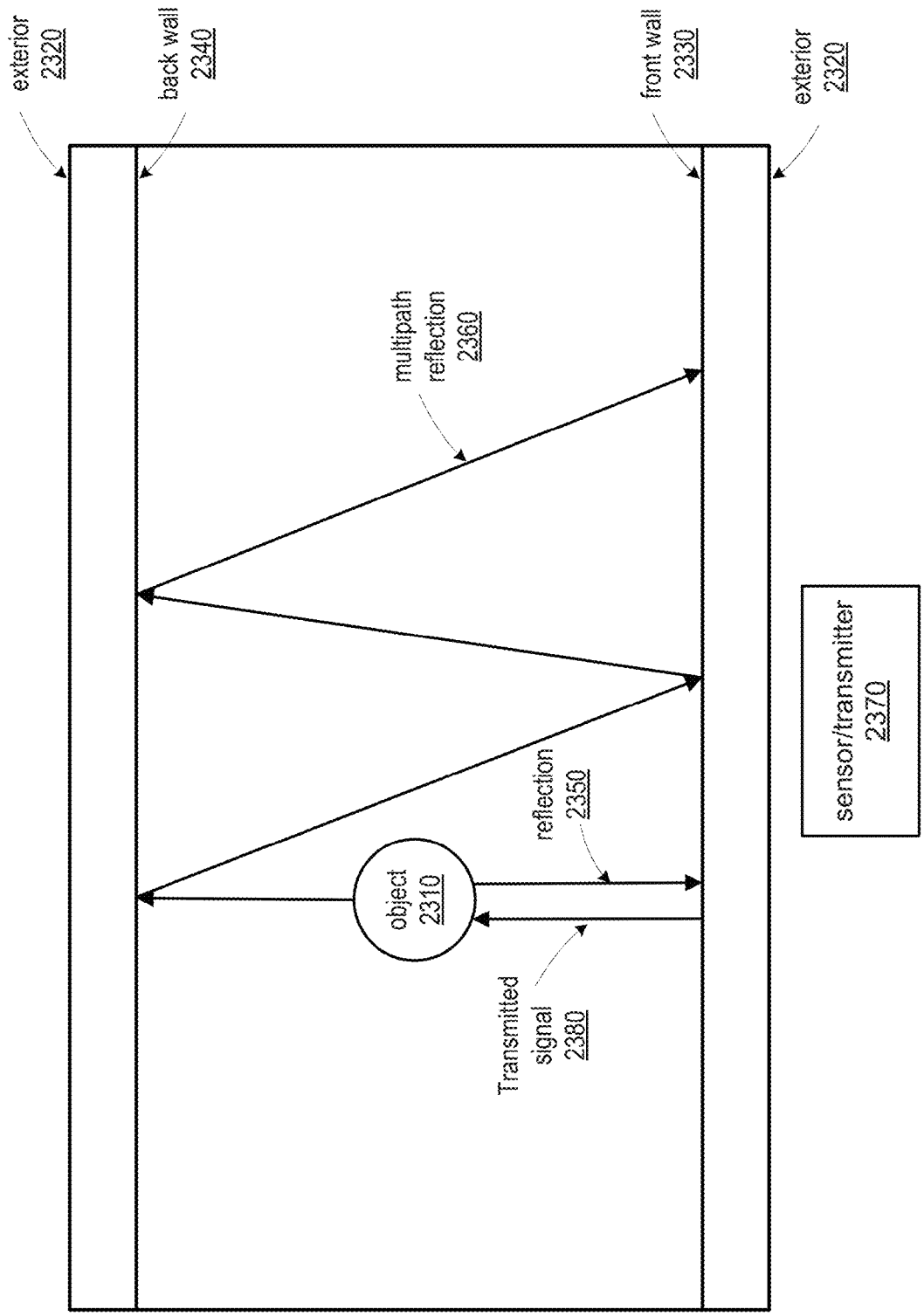
FIG. 23 is a diagram illustrating a reflection for an object between two walls and additional multipath reflections.

FIG. 23 is a diagram illustrating a model of a reflection 2350 for an object 2310 located between a front wall 2330 and a back wall 2340 of an exterior wall 2320. The model includes an additional multipath reflection 2360. The model of the reflection 2350 and the multipath reflection 2360 may be used in the classifier module 1750 to distinguish between detections that arise from actual targets, such as moving or stationary persons, and detections that arise from other phenomena, such as detections that result from the presence of multiple path reflections such as the multipath reflection 2360.

In the example of FIG. 23, a sensor/transmitter 2370 (e.g., a WPPDS) that includes SFCW radar transmits stepped-frequency radar signals using, for example, one or more antennas (not shown) as transceivers. A transmitted signal 2380 penetrates the exterior 2320 of the front wall 2330 and strikes the object 2310. A true reflection signal 2350 of the transmitted signal 2380 is reflected from the object 2320 back to the sensor/transmitter 2370. The reflected signal exhibits a Doppler frequency shift proportional to the magnitude of the movement of the object 2320 towards or away from the sensor/transmitter 2370. However, the interaction between the transmitted signal 2380 and the object 2320 also gives rise to the multipath reflection 2360, and the multipath reflection 2360 may be erroneously detected as a object separate from the object 2320.

Modeling the expected multi-path reflections arising from a particular placement of a movable object in a space modeled by, for example, the scene module 1720 discussed with respect to FIG. 17, allows for identification and rejection of false detections caused by the multipath reflection 2360. For example, characteristics of a detection predicted to occur due to the multipath reflection 2360 (such as the angle of arrival and the Doppler shift of the detection) may be predicted from the model. The characteristics of the detections from an actual scenario that is similar to the modeled scenario may be compared to the predicted characteristics of a detection arising from multi-path reflections. Actual detections that are similar to, or the same as, the predicted detection are classified as false alarms.

Figure 24:
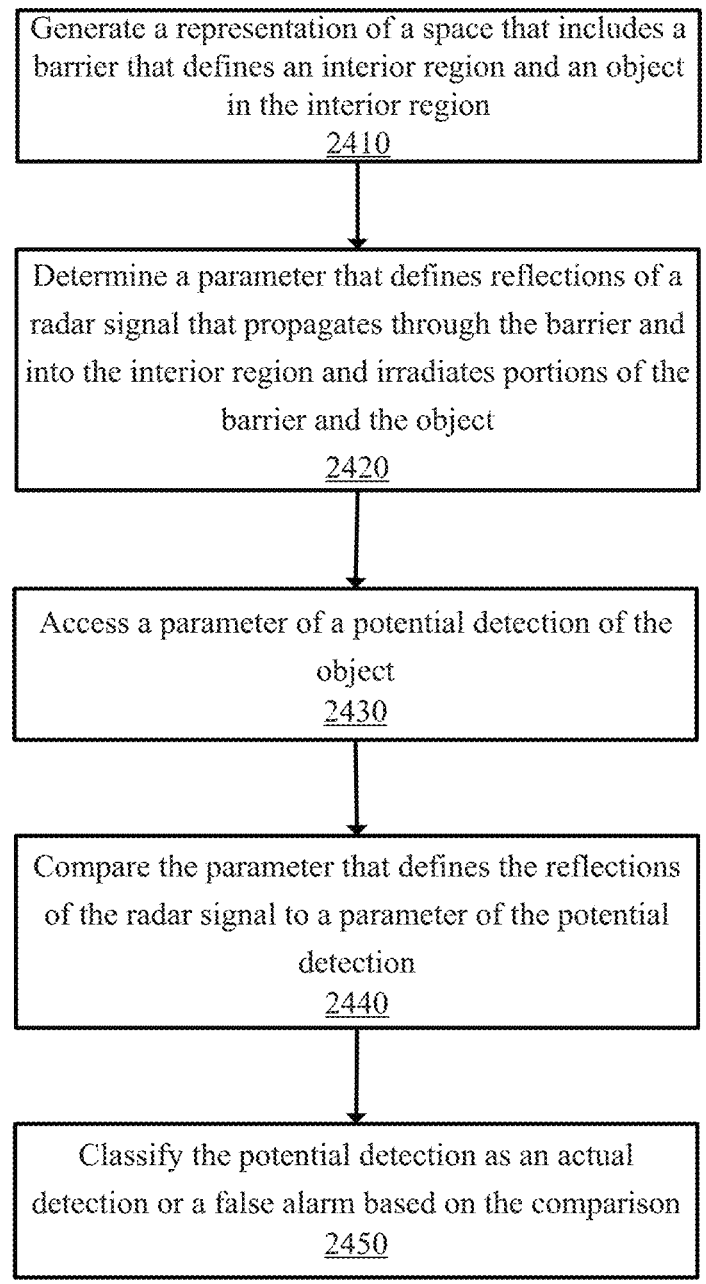
FIG. 24 is a flow chart of an example process for classifying a candidate detection.

FIG. 24 is a flow chart of an example process 2400 for classifying a potential detection. For example, the WPPDS may perform the process 2000. The process 2000 may be performed by or more processors included in the WPPDS. A processor may be integrated for use with stepped-frequency continuous wave (SFCW) radar and a phase interferometer included in the WPPDS. In some implementations, the SFCW radar and phase interferometer may each employ a processor where the processors are communicatively coupled to provide the functions of the WPPDS. In some implementations, the process 2400 may be performed by one or more processors included in the handheld stepped-frequency sensor device 110 described with reference to FIG. 1A. The classifier module 1750 may perform the process 2400.

A representation of a space that includes a barrier that defines an interior region and an object in the interior region is generated (2410). For example, and referring to FIG. 23, the scene module 1720 may model location of the front wall 2330 and the back wall 2340 relative to the object 2310 and/or the sensor 2370. A parameter that defines reflections of a radar signal that propagates through the barrier and into the interior region and irradiates portions of the barrier and the object is determined (2420). The parameter may be, for example, a Doppler shift, an angle of arrival or a range.

A parameter of a potential detection of the object is accessed (2430). The parameter may be, for example, a Doppler shift, an angle of arrival or a range. In some implementations, the classifier module 1750 may access a parameter of a potential detection of an object from information received from the mover processing module 1730. In some implementations, the parameter that defines the reflections of a radar signal and/or the parameter of the potential detection are accessed from an electronic storage separate from the mover processing module 1730.

The parameter that defines the reflections of the radar signal is compared to the parameter of the potential detection (2440), and the potential detection is classified as an actual detection or a false alarm based on the comparison (2450). For example, if the reflection of the radar signal includes the true reflection 2350, and the parameter that defines the reflections of the radar signal and the parameter of the potential detection are the same or substantially similar, then the potential detection is classified as an actual detection of the object 2330. If the reflection of the radar signal does not include the true reflection 2350 then the potential detection is classified as a false alarm. In instances in which the potential detection is classified as a false alarm, and other detections are classified as actual detections, the actual detections may be visually presented without the potential detection to reduce the amount of information and provide for simpler decision making by an operator.

Figure 25:
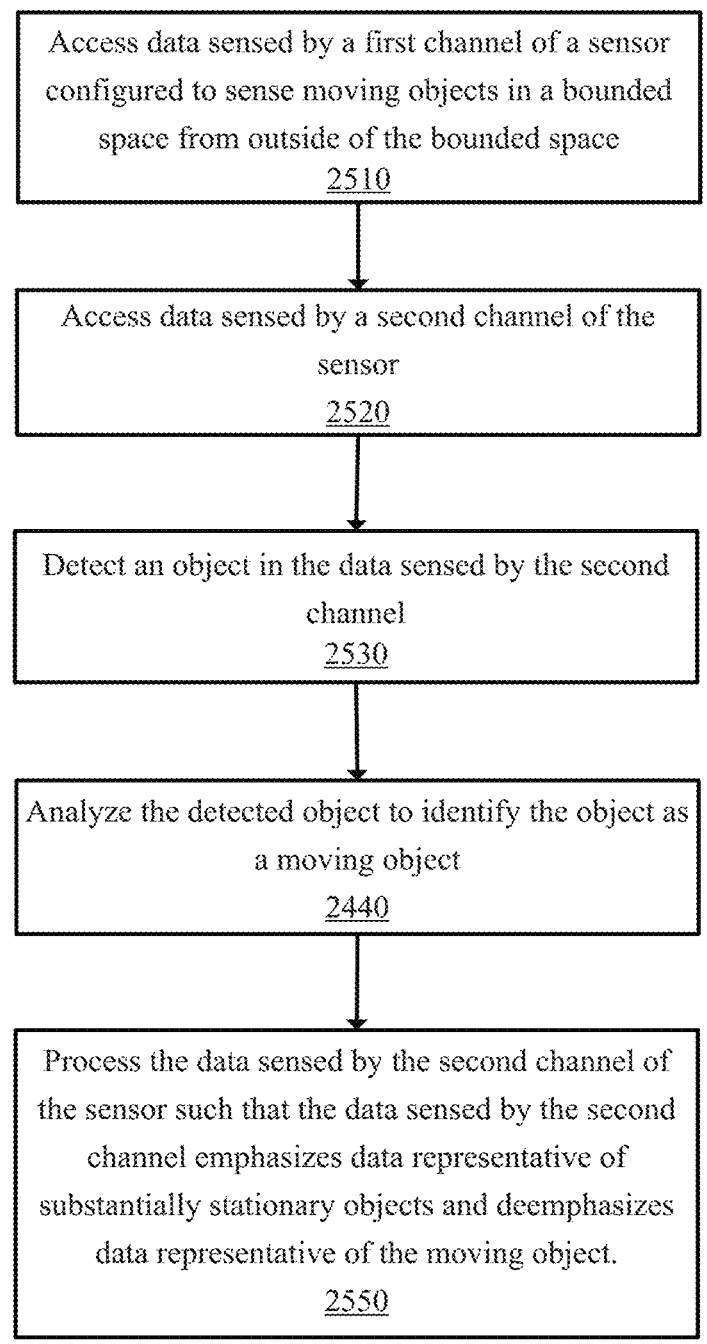
FIG. 25 is a flow chart of an example process for detecting motion of a detected object.

FIG. 25 is a flow chart of an example process 2500 for detecting motion of a detected object. The process 2500 may be used to reduce the effects of a moving target on the processing of data for stationary targets. The process 2500 may be performed by the by or more processors included in the WPPDS. A processor may be integrated for use with stepped-frequency continuous wave (SFCW) radar and a phase interferometer included in the WPPDS. In some implementations, the SFCW radar and phase interferometer may each employ a processor where the processors are communicatively coupled to provide the functions of the WPPDS. In some implementations, the process 2500 may be performed by one or more processors included in the handheld stepped-frequency sensor device 110 described with reference to FIG. 1A.

Data processed by a first channel of a sensor configured to sense moving objects in a bounded space from outside of the bounded space is accessed (2510). Data processed by a second channel is accessed (2520). The mover processing module 1730 may be the first data processing channel, and the stationary processing module 1740 may be the second data processing channel. An object is detected in the data processed by the second channel (2530). For example, the stationary processing module 1740 detects an object.

The detected object is analyzed and identified as a moving object (2540). For example, the mover processing module 1730 may analyze the HRR data received from the sensor processing module 1720, and the tracker may determine that the detected object is a moving object based on the history of the detected object. For example, if the detected object has been detected at a recent time at a different range and angle of arrival than the angle of arrival and range associated with the current detection, the detected object is determined to be a moving object.

The data processed by the second channel of the sensor is processed such that the data sensed by the second channel emphasizes data representative of substantially stationary objects and deemphasizes data representative of the moving object (2550). For example, the detected object identified as a moving object in (2540) may be removed from the data processed by the second channel. The classifier module 1750 receives the output of the detections of the mover processing module 1730 and the stationary processing module 1740. The classifier module 1750 segregates the moving objects from the stationary objects using the data provided by the mover processing module 1730 and the stationary processing module 1740.

Figure 26A:
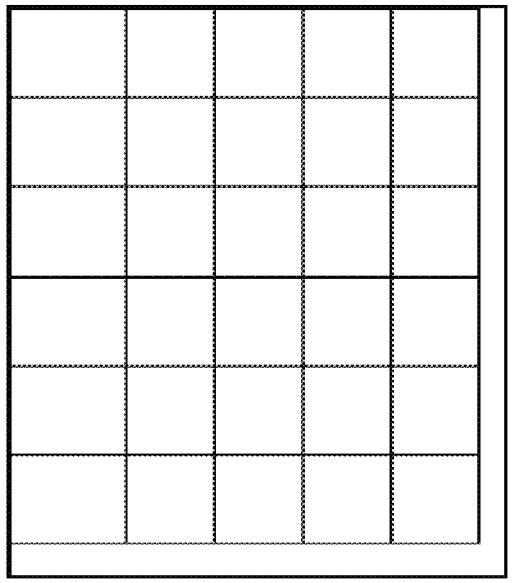
FIGS. 26A-26D is an example of a visual presentation shown to an operator.
Figure 26B:
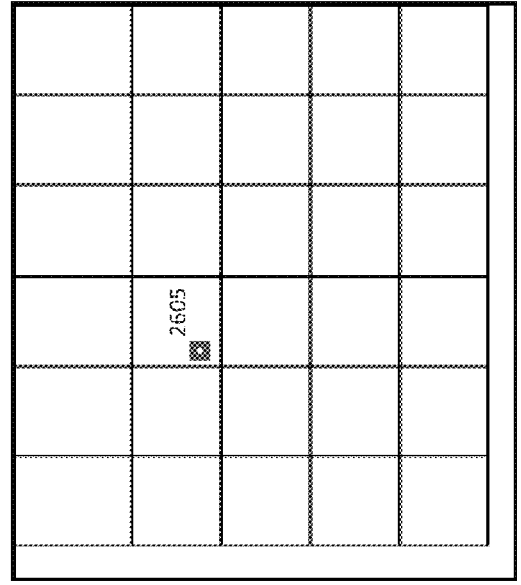

FIGS. 26A-26D show examples of a visual display presented by the WPPDS. The display may be presented on an LCD screen located on the WPPDS or a display remote from the WPPDS. FIG. 26A shows a polar grid with areas of constant range and rays of constant azimuth. FIG. 26B shows a rectangular horizontal lines of constant "down range" from the sensor and vertical lines of constant "cross range." In some implementations, both the polar grid and the rectangular grid may be simultaneously presented to an operator. In other examples, the operator may select to display only one style of grid (either the polar grid or the rectangular grid).

Figure 26C:
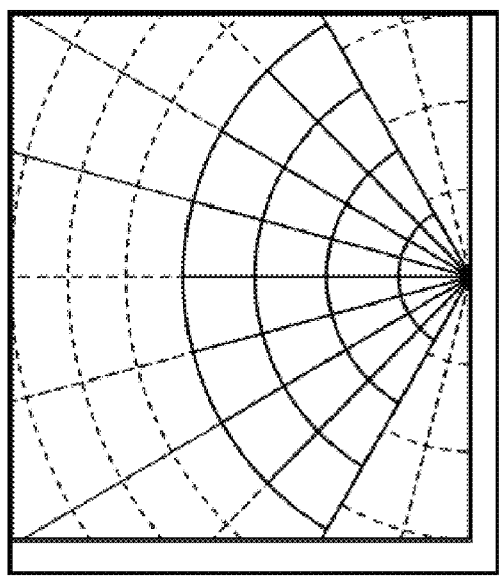
Figure 26D:
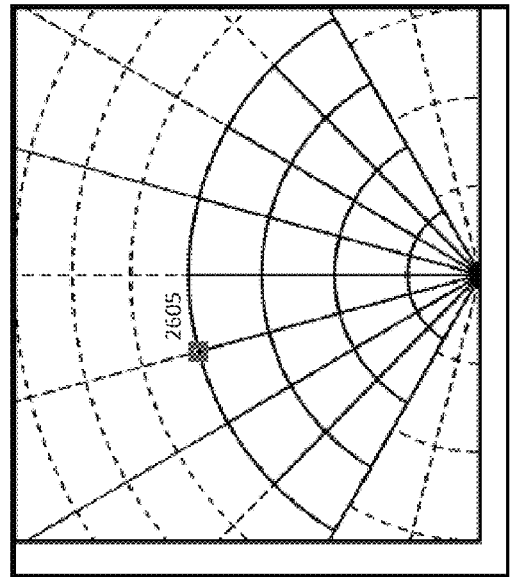

FIG. 26C and FIG. 26D shows an example of an actual detection 2605. For example, the detection 2605 may correspond to a detection of target1 discussed with respect to FIGS. 19 and 21. In the example shown in FIG. 26C and FIG. 26D, candidate detections that arise from artifacts are suppressed to reduce the amount of information presented to the operator or to an automated system for further action.

Figure 27:
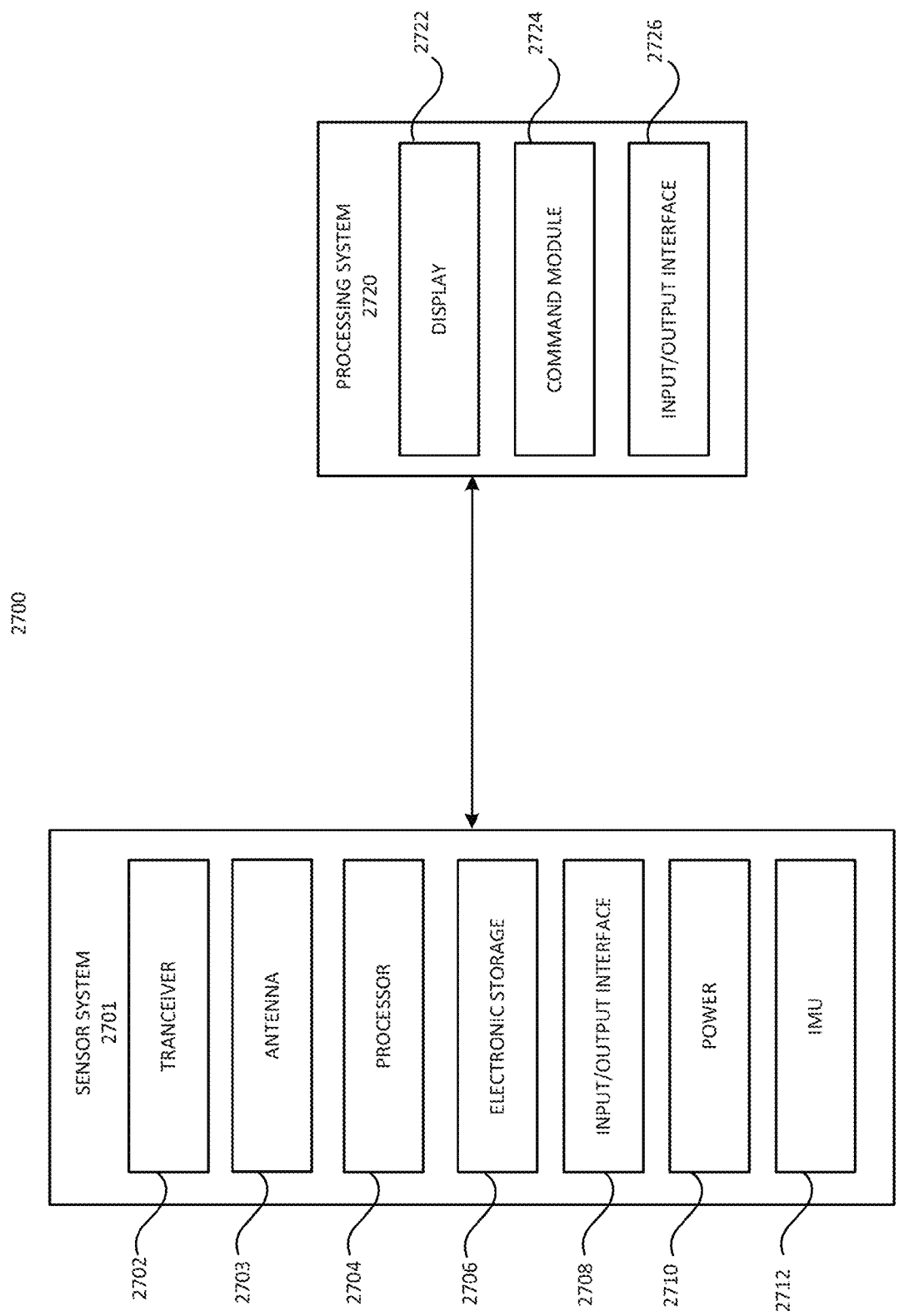
FIG. 27 is a block diagram of a detection system.

FIG. 27 is a block diagram of a detection system. The detection system includes a sensor system 2701 and a processing system 2720. The sensor system 2701 is a radar system that produces a radar signal capable of penetrating through walls of a building and receiving signals reflected off of moving objects or targets inside of or outside of the building. The reflected signals include information sufficient to determine the presence of moving, near-stationary, and/or stationary targets inside of or outside of the building, track the motion of such targets, and classify the targets as actual detections or false alarms. The sensor system 2701 may, for example, be held by a human operator, mounted on a vehicle (remotely controllable or human operable), placed on a platform, or placed on the ground.

The processing system 2720 receives and processes the reflected signals, or data representative of the reflected signals from the sensor system 2701. The processing system 2720 also may be configurable or programmed to control the sensor system 2701.

The processing system 2720 may be integrated into the sensor system 2701 or the processing system 2720 may be remote from, and in communication with, the sensor system 2720. The example shown in FIG. 27 is an implementation in which the sensor system 2701 and the processing system 2720 are separate from each other. For example, the sensor system 2701 may be located in a dangerous area (such as a chemical plant or an area under observation for possible criminal activity) and the processing system may be remotely located in an area of safety. Thus, the sensor system 2701 may be placed in a dangerous location and operated remotely.

The sensor system 2701 includes a transceiver 2702, an antenna 2703, a processor 2704, an electronic storage 2706, an input/output interface 2708, and a power module 2710. The transceiver 2702 generates transmitted signals and processes received signals. The signals may be transmitted and received by the antenna 2703. The sensor system 2701 also may include an inertial measurement unit 2712 to measure the motion of the sensor system 2701.

The transceiver 2702 may be coupled to any antenna that transmits and receives radar signals as discussed above. The transceiver 2702 may produce radar signals at multiple discrete frequencies (such as 250 different frequencies) and the transceiver 2702 processes received reflected signals at those frequencies. The sensor system 2701 also includes a processor 2704, an electronic storage 2706, and an input/output interface 2708. The electronic storage 2706 stores instructions, perhaps as a computer program, that, when executed, cause the processor 2704 to communicate with other components in the sensor system 2701 and to execute analysis such as the processes discussed in FIGS. 13F, 15D, 20, and 24. In other examples, the processor 2704 communicates with the input/output interface 2708 to cause data representative of the signals received by the antenna 2703 and processed by the transceiver 2702 to be transferred to the processing system 2720 for further processing and analysis.

The input/output interface 2708 provides an interface that allows data and/or commands to be input to the sensor system 2701 and/or read from the sensor system 2701. The input/output interface 2708 may receive data from a tactile device such as a keyboard, a mouse, a communications port, or a display. The display may present data such as the data shown in FIGS. 26A-26D or FIG. 19. However, this is not necessarily the case. In some implementations, only the processing system 2720 visually presents data. The input/output interface 2708 also may include software that allows communication between the sensor system 2701 and the processing system 2720 and/or between components of the sensor system 2701. The input/output interface 2708 may be a network connection (such as an Ethernet connection or a wireless communication interface) that connects the processing system 2720 and the sensor system 2701 such that the processing system 2720 may remotely communicate with and control the sensor system 2701.

The processing system 2720 includes a display 2722, a command module 2724, and an input/output interface 2726. The input/output interface 2726 receives and provides data to the sensor system 2701. The input/output interface 2726 also may receive and provide data to a human operator of the processing system 2720 or to an automated process. The display 2722 may visually present data such as that shown in FIGS. 19 and 26A-26D to an operator of the processing system 2720.

The command module 2724 includes an electronic processor and an electronic storage (not shown). In some implementations, the command module 2724 generates commands to control the sensor system 2724. For example, the commands may result in the sensor system 2724 being activated or turned off or moving a platform or vehicle on which the sensor system 2701 is mounted or placed to a different location. Thus, the command module 2724 allows remote operation and control of the sensor system 2701. The command module 2724 may encrypt the commands to protect the integrity of the operation of the sensor system 2701. In some instances, the command module 2724 analyzes data from the sensor system 2701 (perhaps from the transceivers 2702) using processes such as the processes discussed in FIGS. 13F, 15D, 20, and 24.

Although the techniques and concepts have generally been described in the context of a handheld stepped-frequency scanning device and/or WPPDS, other implementations are contemplated, such as a vehicle-mounted stepped-frequency device or a stepped-frequency device mounted on a fixed platform (such as a portal) through which persons pass. In some implementations, the device may be used to detect objects that are made of materials (such as metals, dielectric materials, and explosives) that reflect radar signals and are hidden on the body of a person.

Other implementations are within the scope of the following claims. For example, in some implementations, the antennas 114, 226, 505A, 510A-530A and/or the antenna 2703 may be adjustable conical spiral antennas that have a beam width that varies depending on the compression of a conductive element of the antenna.

What is claimed is:

1. A computer-implemented method comprising:
   obtaining, by a transceiver, multiple radar signals, each radar signal associated with a frequency;
   generating, by a processor, a representation of a space that comprises a barrier that defines an interior region and an object in the interior region, the generated representation being based on a known location and orientation of the barrier relative to the object;
   determining, by the processor and using the generated representation, a modeled parameter that defines reflections by the object of a radar signal that propagates through the barrier and into the interior region and irradiates at least a portion of the barrier and at least a portion of the object;
   accessing, by the processor, a parameter of a candidate detection of the object, wherein the parameter of the candidate detection is determined from the multiple radar signals received by the transceiver;
   comparing, by the processor, the modeled parameter that defines the reflections by the object of the radar signal to the accessed parameter of the candidate detection; and
   classifying, by the processor, the candidate detection as an actual detection or a false alarm based on the comparison.

2. The method of claim 1, wherein classifying the candidate detection as an actual detection or a false alarm based on the comparison comprises:
   determining based on the comparison that the modeled parameter that defines the reflections by the object of the radar signal matches the accessed parameter of the candidate detection; and
   in response to determining that the modeled parameter that defines the reflections by the object of the radar signal matches the accessed parameter of the candidate detection, classifying the candidate detection as a false alarm.

3. The method of claim 1, wherein classifying the candidate detection as an actual detection or a false alarm based on the comparison comprises:
   determining based on the comparison that the modeled parameter that defines the reflections by the object of the radar signal does not match the accessed parameter of the candidate detection; and
   in response to determining that the modeled parameter that defines the reflections by the object of the radar signal does not match the accessed parameter of the candidate detection, classifying the candidate detection as an actual detection.

4. The method of claim 1, further comprising presenting the candidate detection only when the candidate detection is classified as an actual detection.

5. The method of claim 1, further comprising:
   accessing a track that approximates a motion of an object;
   determining that the candidate detection is associated with the track; and
   determining that the candidate detection is an actual detection based on the association.

6. The method of claim 5, wherein determining that the candidate detection is an actual detection based on the association comprises:
   determining that the track associated with the candidate detection is not associated with stationary clutter; and
   in response to determining that the track associated with the candidate detection is not associated with stationary clutter, determining that the candidate detection is an actual detection.

7. The method of claim 1, wherein the parameter that defines the reflections of the radar signal comprises one or more of an angle of arrival of the reflection, a range of the reflection, and a Doppler of the reflection, and
   the parameter of the candidate detection comprises one or more of an angle of arrival of the candidate detection, a range of the candidate detection, and a Doppler of the candidate detection.

8. A device comprising:
   a transceiver configured to receive and transmit multiple radar signals, each radar signal associated with a frequency, through a barrier and into an interior region defined by the barrier;

a processor coupled to an electronic storage, the electronic storage storing instructions that, when executed, cause the processor to perform operations comprising:
    generating a representation of a space that comprises the barrier and an object in the interior region defined by the barrier, the generated representation being based on a known location and orientation of the barrier relative to the object;
    determining, using the generated representation, a modeled parameter that defines reflections by the object of a radar signal that propagates through the barrier and into the interior region and irradiates at least a portion of the barrier and at least a portion of the object;
    accessing a parameter of a candidate detection of the object;
    comparing the modeled parameter that defines the reflections by the object of the radar signal to the accessed parameter of the candidate detection; and
    classifying the candidate detection as an actual detection or a false alarm based on the comparison.

9. The device of claim 8, wherein classifying the candidate detection as an actual detection or a false alarm based on the comparison comprises:
    determining based on the comparison that the modeled parameter that defines the reflections by the object of the radar signal matches the accessed parameter of the candidate detection; and
    in response to determining that the modeled parameter that defines the reflections by the object of the radar signal matches the accessed parameter of the candidate detection, classifying the candidate detection as a false alarm.

10. The device of claim 8, wherein classifying the candidate detection as an actual detection or a false alarm based on the comparison comprises:
    determining based on the comparison that the modeled parameter that defines the reflections by the object of the radar signal does not match the accessed parameter of the candidate detection; and
    in response to determining that the modeled parameter that defines the reflections by the object of the radar signal does not match the accessed parameter of the candidate detection, classifying the candidate detection as an actual detection.

11. The device of claim 8, the operations further comprising presenting the candidate detection only when the candidate detection is classified as an actual detection.

12. The device of claim 8, the operations further comprising:
    accessing a track that approximates a motion of an object;
    determining that the candidate detection is associated with the track; and
    determining that the candidate detection is an actual detection based on the association.

13. The device of claim 12, wherein determining that the candidate detection is an actual detection based on the association comprises:
    determining that the track associated with the candidate detection is not associated with stationary clutter; and
    in response to determining that the track associated with the candidate detection is not associated with stationary clutter, determining that the candidate detection is an actual detection.

14. The device of claim 8, the operations further comprising presenting the potential target only when the candidate detection is classified as an actual target.

15. The device of claim 8, wherein the parameter that defines the reflections of the radar signal comprises one or more of an angle of arrival of the reflection, a range of the reflection, and a Doppler of the reflection, and
    the parameter of the candidate detection comprises one or more of an angle of arrival of the candidate detection, a range of the candidate detection, and a Doppler of the candidate detection.

16. A computer-implemented method comprising:
    transmitting, by a transmitter, a first stepped-frequency radar signal through a barrier, wherein the transmitter is on a first side of the barrier;
    sensing, by a receiver, a first signal comprising a reflection of the first transmitted signal from an object;
    analyzing, by a processor, the first sensed signal to identify a first detection of the object;
    transmitting, by the transmitter, a second stepped-frequency radar signal through the barrier;
    sensing, by the receiver, a second signal comprising a reflection of the second transmitted signal from an object located on a second side of the barrier;
    analyzing, by the processor, the second sensed signal to identify a second detection of the object;
    forming a track representative of a motion of the object through a region defined by a boundary based on the first detection and the second detection;
    transmitting, by the transmitter, a third stepped-frequency radar signal through the barrier;
    sensing, by the receiver, a third signal from the region;
    analyzing, by the processor, the third signal to identify a candidate detection;
    comparing, by the processor, a parameter of the candidate detection to a parameter of at least one of the first and second detections;
    determining, by the processor and based on the comparison, whether the candidate detection is a false alarm or an actual detection; and
    if the candidate detection is a false alarm, presenting the first and second detections without the candidate detection, and if the candidate detection is an actual detection, presenting the first and second detections with the candidate detection.

* * * * *